United States Patent
Yomdin et al.

(10) Patent No.: US 9,240,067 B2
(45) Date of Patent: Jan. 19, 2016

(54) ANIMATION OF PHOTO-IMAGES VIA FITTING OF COMBINED MODELS

(75) Inventors: Yosef Yomdin, Rehovot (IL); Grigory Dinkin, Qiryat Ekron (IL)

(73) Assignee: Yeda Research & Development Co. Ltd., Rehovot (IL)

(*) Notice: Subject to any disclaimer, the term of this patent is extended or adjusted under 35 U.S.C. 154(b) by 602 days.

(21) Appl. No.: 13/500,919

(22) PCT Filed: Oct. 14, 2010

(86) PCT No.: PCT/IB2010/054666
§ 371 (c)(1),
(2), (4) Date: May 14, 2012

(87) PCT Pub. No.: WO2011/045768
PCT Pub. Date: Apr. 21, 2011

(65) Prior Publication Data
US 2012/0218262 A1 Aug. 30, 2012

Related U.S. Application Data

(60) Provisional application No. 61/251,825, filed on Oct. 15, 2009.

(51) Int. Cl.
*G06T 13/80* (2011.01)
*G06T 13/40* (2011.01)

(52) U.S. Cl.
CPC ............... *G06T 13/80* (2013.01); *G06T 13/40* (2013.01)

(58) Field of Classification Search
CPC ............ G06K 2209/40; G06K 9/3216; G06K 9/6206; G06T 13/40; G06T 2207/10016; G06T 2207/30196; G06T 2207/30241; G06T 7/2033; G06T 17/20; G06T 19/20; G06T 2219/2021; G06T 17/00; G06T 7/2046; G06T 7/0044; G06T 15/205; G06T 13/00; G06T 13/20; G06T 13/80; G06T 19/00; G06T 2207/30008; G06T 7/0046; G06T 2207/20016; G06T 7/0089; G06T 11/001; G06F 3/011
USPC ......................................................... 345/473
See application file for complete search history.

(56) References Cited

U.S. PATENT DOCUMENTS

| | | | |
|---|---|---|---|
| 6,057,859 A * | 5/2000 | Handelman et al. | 345/474 |
| 2003/0128150 A1* | 7/2003 | McMakin et al. | 342/22 |
| 2003/0128210 A1* | 7/2003 | Muffler et al. | 345/428 |
| 2005/0063596 A1* | 3/2005 | Yomdin et al. | 382/232 |
| 2006/0258448 A1* | 11/2006 | Ishibashi et al. | 463/31 |
| 2007/0112673 A1* | 5/2007 | Protti | 705/44 |
| 2008/0136814 A1* | 6/2008 | Chu et al. | 345/419 |
| 2008/0309664 A1* | 12/2008 | Zhou et al. | 345/420 |

* cited by examiner

*Primary Examiner* — Haixia Du
(74) *Attorney, Agent, or Firm* — Eitan, Mehulal & Sadot

(57) ABSTRACT

An image animation method implementable in software includes: fitting a fitting model to at least an object in the image, and animating the object in accordance with a corresponding animation model, where the fitting model is at least as rigid as the animation model, and the animation model is no more rigid than the fitting model.

42 Claims, 49 Drawing Sheets

ANIMATION OF PHOTO-IMAGES VIA FITTING OF COMBINED MODELS

PRIOR APPLICATIONS DATA

This application is a National Phase filing of PCT International Application Number PCT/IB2010/054666, titled "ANIMATION OF PHOTO-IMAGES VIA FITTING OF COMBINED MODELS", having an International Filing Date of Oct. 14, 2010, published as International Publication Number WO 2011/045768; which in turn claims priority and benefit from United States Provisional Patent Application No. 61/251,825, filed on Oct. 15, 2009; both of which are incorporated herein by reference in their entirety.

CROSS-REFERENCE TO RELATED APPLICATIONS

This application claims benefit from U.S. Provisional Patent Application No. 61/251,825, filed Oct. 15, 2009, which is hereby incorporated in its entirety by reference.

FIELD OF THE INVENTION

The present invention relates to interactive photo-animation generally and to the fitting of combined models for photo-animation in particular.

BACKGROUND OF THE INVENTION

A variety of web-based interactive photo-animation applications are available on the Internet. There are several types of these applications, each purporting to provide one or more services such as: "Easy Animation", "On-Line Animation", "One-Touch Animation", "Make your own animation", "Creation of Avatars", "Photo-Realistic Animations", "Photo-Realistic Avatars." Existing web-based interactive photo-animation applications may be categorized as follows:

Facial cut out applications provide interactive options to cut out the face of a character on a photo uploaded by a user. This face is then inserted into a pre-prepared animation or video clip. Examples of such applications are available over the Internet from JibJab Media Inc. and Gizmoz Inc., both of the United States.

Redressing applications provide interactive options to customize a cartoon animated character. A user can create customizable characters by choosing eyes, hair, and skin tone as well as shirt, pants, shoes and other accessories. An example of such an application is "Zwinky", available from IAC Search and Media in the United States.

"Image-me" from the United States provides an online tool to generate a speaking myspace avatar from a face photo. "Sitepal" (http://www.sitepal.com/) provides customized (cartoon-like) speaking avatars to be inserted into commercial sites. With these applications the user can also choose eyes, hair, skin tone as well as shirt, pants, shoes and other accessories. In addition, photo images can also be transformed into speaking avatars.

A number of web-based applications are available for the production of limited animation clips. Such applications typically provide users with choices for the background and the addition of library characters and artifacts which can be interactively translated and rotated. Examples of such applications are "Fluxtime" (http://www.fluxtime.com/index.php) and "Animasher" (http://www.animasher.com).

There are also some Web tools for "morphing" and "merging". These tools allow the user to produce animation clips presenting the morphing of a character's face, or merging two faces or objects into a single image. Examples of such tools are "Fantamorph" (http://www.fantamorph.com/), "Funmorph" (http://www.funmorph.com/), and "FaceFun" (http://www.dolsoft.com/Product/DownloadFaceFun.htm). Some of these tools provide a limited control of facial expressions, for example, "Cartoon.Pho.to" (http://cartoon.pho.to/).

Interactive video-clip applications utilize pre-prepared combinations of video-clips in order to provide a user with interactive choices of actors, scenario, etc. For example, the site "KnickerPicker, online dressing room" (http://www.knickerpicker.com) proposes an online dressing room where the user can pick the most appropriate photo-model and then to "redress" her according to the selling suggestions.

PCT application IL2008/001205, assigned to the common assignees of the current invention, describes a system and method for the modelization of objects in images that provides solutions for automatic and interactive fitting of image objects with relatively complicated models such as typical human models.

SUMMARY OF THE INVENTION

There is provided an image animation method implementable in software including: fitting a fitting model to at least an object in the image, and animating the object in accordance with a corresponding animation model, where the fitting model is at least as rigid as the animation model, and the animation model is no more rigid than the fitting model.

Further, in accordance with a preferred embodiment of the present invention, at least one of the fitting model and the animation model is a rigid hierarchical model.

Still further, in accordance with a preferred embodiment of the present invention, the method also includes increasing rigidity of the fitting model by inserting the artificial bones.

Additionally, in accordance with a preferred embodiment of the present invention, the method also includes removing bones from the animation model to decrease rigidity.

Moreover, in accordance with a preferred embodiment of the present invention, the method also includes generating a flexible joint by adding at least one artificial joint to an existing joint.

Further, in accordance with a preferred embodiment of the present invention, the generating includes replacing at least one existing bone with at least two artificial bones, the artificial bones at least connected to each other by the at least one artificial joint.

Still further, in accordance with a preferred embodiment of the present invention, the method also includes replacing an existing joint with a compound joint formed by two the flexible joints, where the two compound joints are parallel to each other.

Additionally, in accordance with a preferred embodiment of the present invention, the generating is performed to reduce texture/contours distortion.

Moreover, in accordance with a preferred embodiment of the present invention, the method also includes replacing at least one layer attached at a joint with a combination of at least two layers to enable more complicated motion patterns.

Further, in accordance with a preferred embodiment of the present invention, the at least two layers are positioned to overlap to provide a visually smooth banding.

Still further, in accordance with a preferred embodiment of the present invention, the method also includes refining the animating by transforming the animation model to a second, more complicated the animation model.

Additionally, in accordance with a preferred embodiment of the present invention, the method also includes transforming a skeleton animation into a layer animation.

Moreover, in accordance with a preferred embodiment of the present invention, the transforming includes: sub-dividing original layers at each skeleton joint, and approximating skeleton-induced layer motion with that allowed in the targeted format layer motion to transform a skeleton scenario into a "layers motion scenario".

Further, in accordance with a preferred embodiment of the present invention, the method also includes employing 3D (three dimensional) enhancement to estimate anatomic proportions of a character and its 3D position in a 2D (two dimensional) image.

Still further, in accordance with a preferred embodiment of the present invention, the employing includes: fitting the fitting model to visible contours of the character, constructing an "M3-model" to approximate an original 3D character depicted on the 2D image, where visible contours of the M3-model are inherited from an initial 2D model.

Additionally, in accordance with a preferred embodiment of the present invention, the constructing includes: defining skeleton S of Skeleton S as three-dimensional object S, where S' possesses identical bones and joints as S while being positioned in a 3D space according to a 3D structure for the characters, and associating a 3D-shape L_b to each bone "b" of skeleton S', where "b" is the axis for L_b, and where L_b may be predefined in accordance with assumptions for the 3D structure for the characters.

Moreover, in accordance with a preferred embodiment of the present invention, the method also includes: determining initial assumptions regarding the character and adapting parameters of an initial M3 model in accordance with the assumptions, computing a 3D depth for each the bone "b" of the M3-model as d=D(w\W), where "d" is a 3D depth of a point of the bone, "D" is a standard position depth, "w" is a visible width at each the point and "W" is a width of a visible the bone in a standard position, recalculating visible lengths of all the bones "b" in the fitting model in accordance with the computing, and repeating the determining, computing and recalculating until a required accuracy is achieved.

Further, in accordance with a preferred embodiment of the present invention, the method also includes reconciling at least one of a pose and proportions of the animation model to an initial pose required for an animation.

Still further, in accordance with a preferred embodiment of the present invention, the reconciling includes at least one of restoring at least some angles between skeleton bones as in the initial pose and adapting their lengths and layer widths in accordance with known anatomic parameters, transforming a skeleton and texture layers of the fitting model in exact accordance to the initial pose, adding a motion sequence to have the character move to the initial pose at the beginning of the animation, and leaving the pose and proportions of the animation model as is.

Additionally, in accordance with a preferred embodiment of the present invention, the method also includes re-computing a relative motion for different objects in accordance with changes in the anatomic proportions.

Moreover, in accordance with a preferred embodiment of the present invention, the method also includes constructing a "combined model", where a point in a texture layer associated with the object is connected with a bone of the character.

Further, in accordance with a preferred embodiment of the present invention, the point is not visible in the fitting model and is visible in the animation model.

Still further, in accordance with a preferred embodiment of the present invention, multiple texture layers are prepared for the object and each is connected to a different the bone in the animation model.

Additionally, in accordance with a preferred embodiment of the present invention, the different bones are associated with multiple the characters.

Moreover, in accordance with a preferred embodiment of the present invention, the method also includes: enabling interactive fitting by a user, automatically completing the fitting by a user, estimating a quality for a result of the automatic completing in terms of a discrepancy from a pre-defined quality threshold, and repeating the automatically completing and estimating until the discrepancy is less than the quality threshold.

Further, in accordance with a preferred embodiment of the present invention, the repeating also includes performing the automatically completing and estimating up to one hierarchy level higher than a level at which the user initiated the automatic completion.

Still further, in accordance with a preferred embodiment of the present invention, the method also includes suggesting to the user that the automatically completing be performed instead of the interactive fitting for "fine scale" fitting of model contours.

Additionally, in accordance with a preferred embodiment of the present invention, the enabling is performed after the automatic completing, estimating and repeating have been performed and the discrepancy is lower than the quality threshold.

Moreover, in accordance with a preferred embodiment of the present invention, the method also includes: requesting the user to confirm a result of the automatic fitting, and if the user does not confirm the result, iteratively showing earlier results in order of next best the discrepancy until the user does confirm.

Further, in accordance with a preferred embodiment of the present invention, the method also includes inscribing a body model (BM) into a character's clothing for fitting at least unseen portions of a photo-character's actual body, where the BM includes "proportion parameters" based on standard human body measurements.

Still further, in accordance with a preferred embodiment of the present invention, the method also includes assigning assign a penalty function for the fitting for situations where contours of the BM extend beyond contours of the clothing of the photo-character.

Additionally, in accordance with a preferred embodiment of the present invention, the BM is at least one of generic and associated with the photo-character.

Moreover, in accordance with a preferred embodiment of the present invention, the method also includes constructing a "combined model", where a clothing model may be merged with a character model as at least one additional layer, and the additional layer is kinematically connected to an appropriate part of the character model.

Further, in accordance with a preferred embodiment of the present invention, the method also includes: specifying a clothing type for the photo-character, selecting a combined clothing model CM in accordance with the clothing type, fitting a simple model M to visible contours of the photo-character, inscribing a BM into the model M, positioning the model CM on the image in accordance with a position of the inscribed BM, fitting clothing layers of the CM according to visible contours of the photo-character, cutting clothing texture out from the image in accordance with the fitting clothing layers, and automatically completing texture of at least partially occluded layers, where the texture is derived from at least one of generating a synthetic texture similar to the texture in areas adjacent to the at least partially occluded areas, copying non-occluded texture on at least one other image of the photo-character, and selecting a substitute texture from a pre-prepared library texture in accordance with non-occluded body parts on the image.

Still further, in accordance with a preferred embodiment of the present invention, the method also includes: defining high resolution feature (HRF) sub-models for specific features of the character, and kinematically subordinating the HRF sub-models to the animation model to the main model.

Additionally, in accordance with a preferred embodiment of the present invention, the method also includes inserting the HRF sub-models and their associated texture from a pre-prepared HRF sub-models library, where the HRF sub-models represent features that require high resolution but are of generic nature.

Moreover, in accordance with a preferred embodiment of the present invention, the method also includes: enabling a user to choose a final animation clip, displaying at least part of the chosen animation clip to user for confirmation, where the characters available for replacement are indicated, enabling the user to choose the character, receiving a selected actor" from the user, where the selected actor is at least one of uploaded or selected from an available library by the user, displaying a fitting model for the selected actor, and fitting the fitting model to the selected actor.

There is also provided, in accordance with a preferred embodiment of the present invention, an animation model transformer including a bone inserter to insert bones into a an animation skeleton and a skeleton refiner in invoke the bone inserter to modify rigidity/flexibility of the animation skeleton, a layers refiner to add/replace layers of an animation model to facilitate smoother motion, and an animation refiner to transform an animation from an initial simple model to a more complex model, where the more complex model was produced by applying at least one of the bone inserter, skeleton refiner and layers refiner to the initial simple model.

Further, in accordance with a preferred embodiment of the present invention, the transformer also includes an anatomic proportioner to employ 3D enhancement to estimate anatomic proportions of a character and its 3D position in a 2D image.

Still further, in accordance with a preferred embodiment of the present invention, the transformer also includes a pose transformer to transform a pose and proportions for the animation model to an initial pose required by the animation in accordance with the estimated anatomic proportions of the character and its 3D position.

Additionally, in accordance with a preferred embodiment of the present invention, the transformer also includes an automated fitting completion unit to facilitate automated fitting completion at any stage of interactive fitting by the user.

There is also provided, in accordance with a preferred embodiment of the present invention, a menu based animation utility implementable in software, including: a photo/video clip input option to enable a user to select a base environment for an animation to be produced, a cast builder to assemble a cast of actors for the animation, the cast of actors including at least one of a character, character part, and object, where the actors are taken from at least one of the base environment and a prep-prepared library, an animation template selector to enable the user to select an animation template from among a list of possible animation templates for use with the animation, the list based at least on a cast type of at least one of the cast of actors, an animation template rearranger to enable the user to rearrange the template animations for each given the cast type in accordance with actual positions, sizes and proportions of the actors cut out from the base environment, an animation modifier to enable the user to at least modify speed and sharpness of movements by the cast of actors, a local commands processor to enable the user to enter "local" movement commands for the cast of actors where the local commands do not conflict with a general scenario for the animation, and an interface to enable the user to use other animation tools with the animation.

Further, in accordance with a preferred embodiment of the present invention, the utility is implemented on a mobile communications device.

There is also provided a method implementable in software for the production of high-quality 3D animations in 2D formats, the method including: selecting an actor from an animation in a motions database bringing the actor in the animation to a standard, predetermined pose, producing a standard 2D animation based on a 2D model for the actor, recalculating pose/proportions according to visible lengths of all bones b in a fitting model according to their 3D position, transforming free 3D motions into 2D animation, adding additional limbs to decrease rigidity of the 2D animation, simulating 3D texture transformation with additional layers, and hiding problematic 3D positions.

Further, in accordance with a preferred embodiment of the present invention, the transforming includes: if necessary, adapting a "standard proportions" M3-model skeleton and its corresponding limbs to a skeleton used in the motion data base, producing a 3D animation A of the M3-model as per a standard skeleton animation chosen from the motion data base, where for each control frame F of A and for each limb L of the M3-model, transformation T is computed for visible contour of L in a first frame to a visible contour of L in frame F, approximating T by a projective transformation TP, refining a 2D layer model according to a skeleton of the M3-model, positioning the layers of the 2D model for each frame F, according to the transformation TP (TA) from their position in the first frame, where their relative depth is dynamically updated according to a relative depth of limbs in the M3-model.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
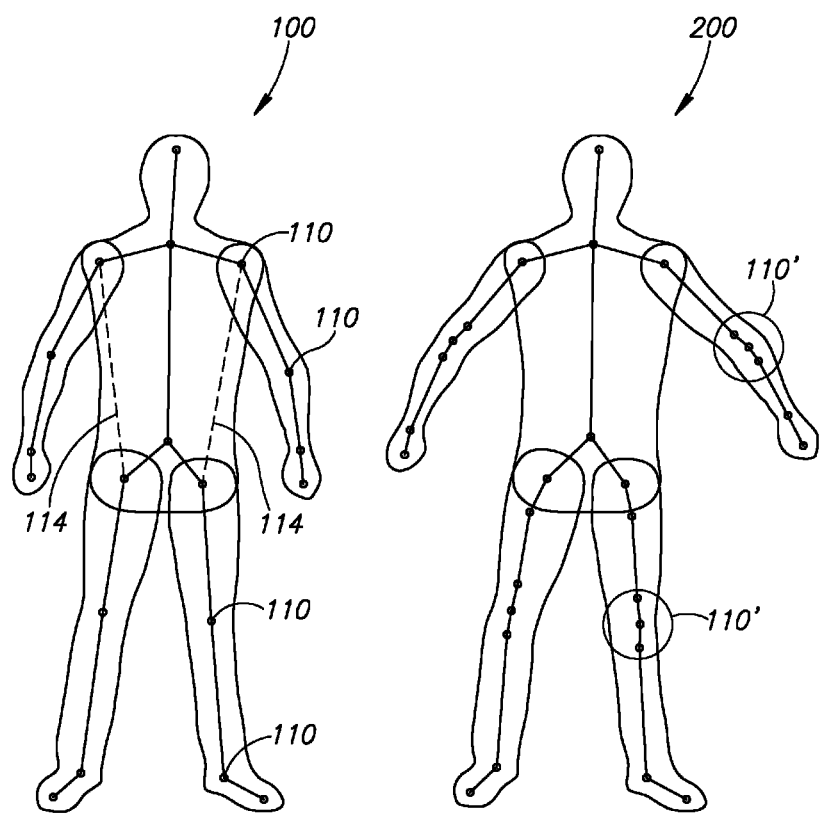
FIG. 1 is a schematic illustration of two different types of models for a human body.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

As disclosed hereinabove, the prior art includes examples of web-based applications for Model-Based Photo-Animation in which pre-prepared models are fitted to an object or character on a photo-image, cutting out this object from the image, and animating the cut-out object via a pre-prepared animation of the model. The animation is typically restricted to a few specific cases, such as the facial animation provided by JibJab Media Inc. However, as more demanding tasks are considered (for example, animation of a human character, of a pet, etc.) this approach may encounter significant difficulties:

Manual, as well as automatic, fitting of complicated models (such as a human being) to the image characters may turn out to be too difficult for a non-sophisticated user. Even if a fitting may be achieved, and the object (character) cut out from the image, the visual quality of the resulting animations may turn out to be insufficient because of the anatomic distortions in the process of the fitting of the model. Furthermore, there are "weight restrictions" on web-based applications; work station based software may not be adapted for use in a web environment because it may be too large or sluggish to run over the Internet.

PCT patent application PCT/IL2008/001205, assigned to the common assignees of the present invention and included herein in its entirety by reference, addresses these issues and discloses the use of hierarchically rigid models with methods for automated and interactive fitting to provide model based photo animation. However, the use of hierarchically rigid models alone may be overly complicated and may not always provide a quality result if the object or character in the photo appears in a free pose against a complicated background and/or has loose fitting clothing.

Applicants have realized that a combined models method may allow for easier animation of complicated objects and characters while also significantly improving the visual quality of the resulting animations. Such an approach may entail the use of one model for the fitting process and a different model for animation. Preferably the models used in the present invention may be hierarchically rigid models as disclosed in patent application PCT/IL2008/001205. However, it will be appreciated that the elements of the present invention may be basically applicable to other types of models as well.

Reference is now made to FIG. 1, which illustrates two exemplary models constructed and operative in accordance with a preferred embodiment of the present invention. Fitting model 100 may represent a typical fitting model for a human object, and animation model 200 may represent a corresponding animation model to be used to animate objects that have been fitted with fitting model 100.

Fitting model 100 may allow for easy interactive and/or automatic fitting of the chosen object on the image. It may therefore be relatively simplistic, in order to simplify a user's fitting task. In particular, it will be appreciated that each of rotation joints 110 of an implied, underlying skeleton have simple anatomic and visual interpretations, in order to simplify the user the positioning of rotation joints 110 on the image. It is also important to maintain a high rigidity for fitting model 100, and a limited fitting hierarchy, in order to simplify the user's fitting task.

On the other hand, the main requirement for animation model 200 may be to provide high quality animation. This may require, in particular, a finer subdivision of the implied underlying skeleton in order to more accurately capture the body's motion. Accordingly, whereas fitting model 100 may require a high degree of rigidity, a similar degree of rigidity may be undesirable for animation model 200 since it may tend to reduce an animator's freedom.

Figure 2:
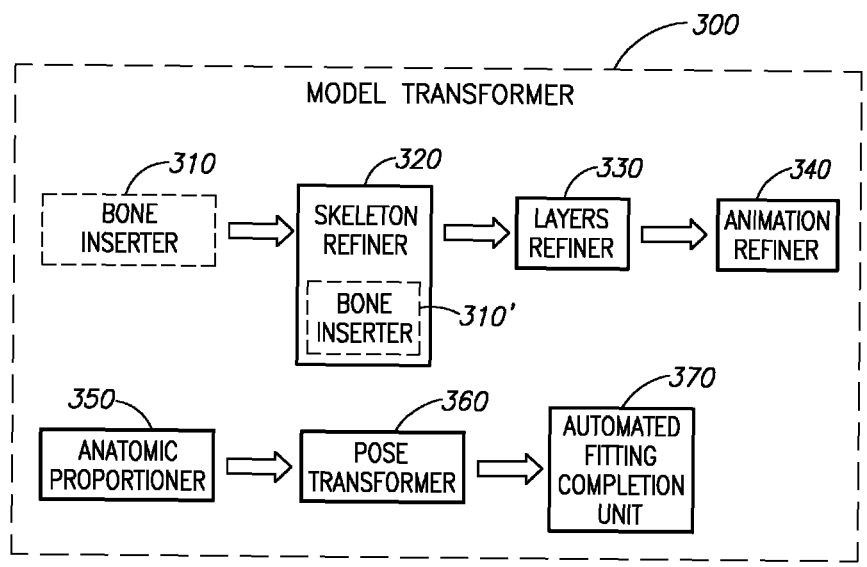
FIG. 2 is a schematic illustration of a novel model transformer to transform and manipulate the models of FIG. 1, constructed and operative in accordance with a preferred embodiment of the present invention.
Figure 3A:
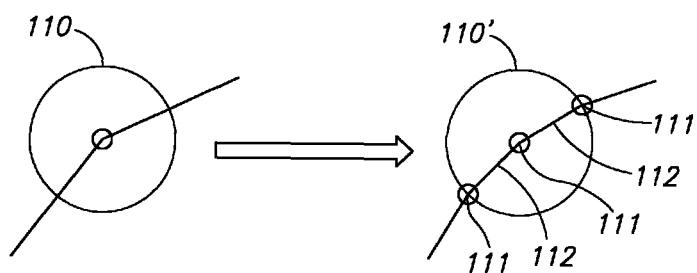
FIGS. 3-13, 15, 21, 27, 44 and 45 are schematic illustrations of particular sections of exemplary instances of the models of FIG. 1.

Reference is now made to FIG. 2. In accordance with a preferred embodiment of the present invention, a model transformer 300 may be used to subdivide the underlying skeleton of fitting model 100 in a prescribed manner, in order to provide a better kinematical quality for animation model 200. Model transformer 300 may comprise bone inserter 310, skeleton refiner 320, layers refiner 330, animation refiner 340, anatomic proportioner 350 and pose transformer 360. For example, using fitting model 100, model transformer 300 may isolate a rotation joint 110 as depicted in FIG. 3A, to which reference is now made. Bone inserter 310 may then insert new artificial "bones" as needed to generate flexible joint 110' with three rotation joints 111 instead of the original rotation joint 110. The hierarchy of the new bones may be defined in accordance with the hierarchy of the original ones.

Figure 3B:
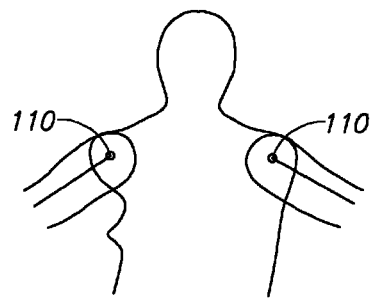

Model transformer 300 may also use bone inserter 310 to insert bones to fitting model 100 to provide additional rigidity. For example, additional bones 114 may be inserted (FIG. 1). Additional bones 114 may strongly simplify the fitting task. As illustrated in FIG. 3B, to which reference is now made, in their absence moving shoulder rotation joints 110 may lead to hard to control situations such as that depicted in the figure, where the integrity of the object may be compromised. It will be appreciated, however, that additional bones 114 may remain invisible to the user during the fitting process.

On the other hand, the additional rigidity provided by the additional bones 114 may not be desirable in animations. Accordingly, additional bones 114 may be removed for animation model 200 as shown in FIG. 1.

Model transformer 300 may improve the motion quality of animation models 200 in several ways. For example, a typical skeleton animation application such as Anime Studio (available from Smith Micro Software, Inc. USA) may suffer from a number of quality problems as may be seen in FIGS. 4A-C, to which reference is now made.

Figure 4A:
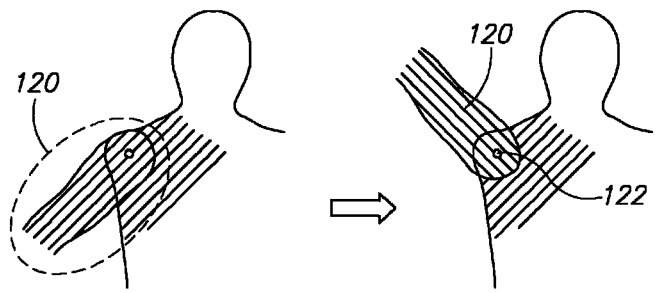

FIG. 4A illustrates "broken texture" caused by layer rotation. This may occur when an occluding layer such as arm layer 120 may rotate together with the texture, while the texture on an occluded layer such as armpit layer 122 remains unmoved. This may creates a "texture discontinuity" line between these layers, which may strongly reduce the visual quality of the animation.

Figure 4B:
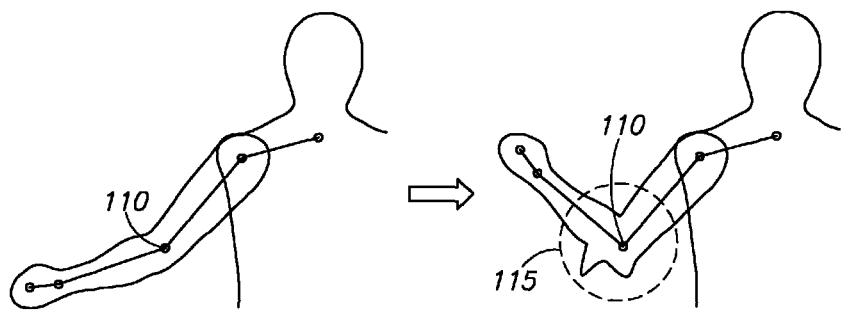

FIG. 4B illustrates texture and contours distortion at rotation joints 110. The specific skeleton kinematics may tend to create geometric distortion 115 at rotation joints 110, particularly as the rotation angle of the bones connected at rotation joint 110 increases as depicted in FIG. 4B.

Figure 4C:
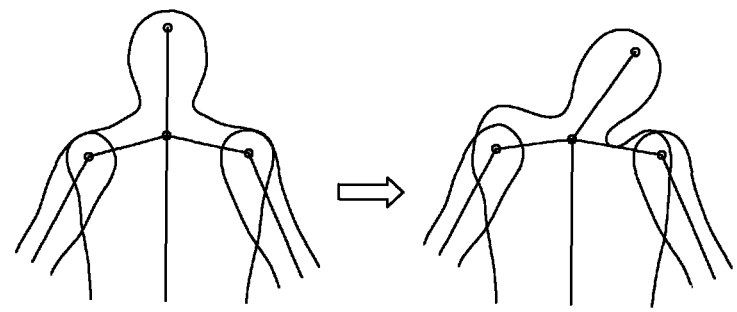

FIG. 4C illustrates possible incorrect motion of some of the model parts. The specific skeleton kinematics may tend to create geometric distortions at some parts of the model such as the human neck portrayed in FIG. 4C.

In general, such animation applications tend to suffer from oversimplified, unrealistic motion patterns produced by simple layers and skeletons. For example, it may be very difficult to represent a motion of an octopus's tentacles without a very complicated skeleton and/or partition into layers.

Figures 5A, 5B:
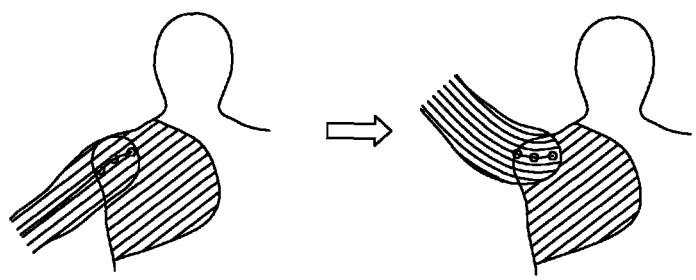
Figure 6A:
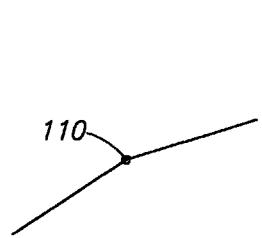
Figure 6B:
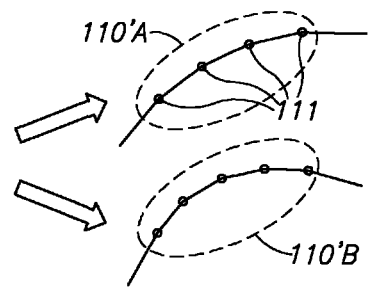

Returning to FIG. 2, skeleton refiner 320 and layers refiner 330 may address these issues. Skeleton refiner 320 may invoke bone inserter 310 or may alternatively comprise a bone inserter 310' with similar functionality. Skeleton refiner 320 may use bone inserter 310 to replace a chosen rotation joint 110 in the skeleton with a combination of bones 112 and rotation joints 111, as described hereinabove, to enable more complicated motion patterns. As shown in FIGS. 5A and 5B, to which reference is now made, skeleton refiner 320 may thusly address the issues of "broken texture", texture and contours distortion at rotation joints 110. Further examples of skeleton refinement may also be illustrated in FIGS. 6A and 6B, to which reference is now also made. A single rotation joint 110 may be expanded into a rotation joint 110'A with multiple rotation joints 111. Similarly, new rotation joint 110'A may also be extrapolated into a second, general parallel rotation joint 110'B.

Figures 7A, 7B:
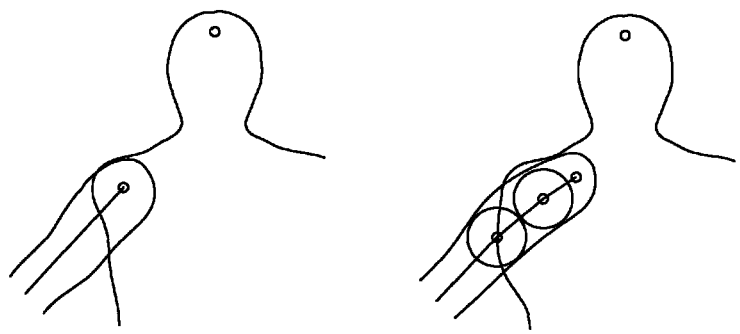
Figure 8:
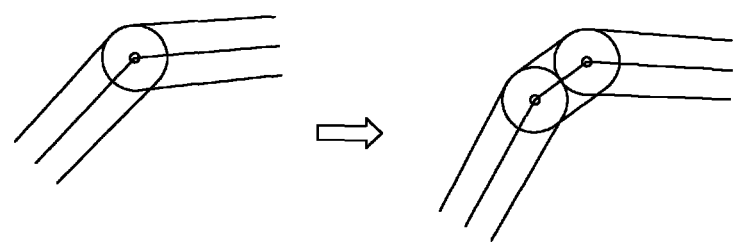
Figures 9, 10A:
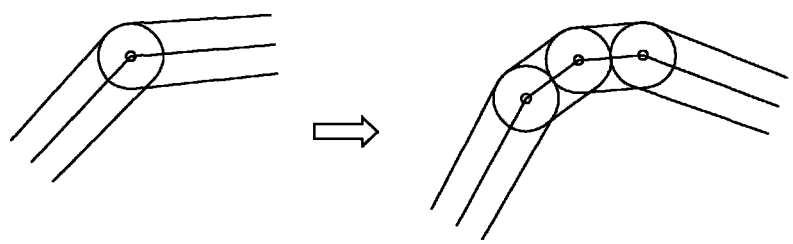

Layers refiner 330 (FIG. 2) may also replace layers attached at a chosen joint in the skeleton with a combination of layers allowing for more complicated motion patterns. FIGS. 7A and 7B, to which reference is now made, illustrate the input and output images from layers refiner 330. Reference is now made to FIG. 8. Layers refiner 330 may work as follows: two layers A and B may be initially attached at joint z. Refiner 330 may insert an additional layer D and additional joints z_1 and Z_2. More than one additional layer may be inserted to provide a smooth motion at the joint as shown in FIG. 9, to which reference is now made. Reference is now made to FIG. 10A. The resulting partition of the model into layers as shown in FIG. 10A may resemble the overlapping nature of the construction of medieval armor. It will be appreciated that the layers in the model partition may have the shape of a rectangle with half circular disks attached at the ends. The layers may be attached to one another in such a way that the centers of the subsequent half-disks may coincide. This may provide a visually smooth banding of the model. The lengths of the rectangular parts of the layers may vary, thus determining the density of the layers in the chain.

It will be appreciated that while the functionality described hereinabove for layers refiner 330 may assume the existence of skeleton refiner 320, layer refinement may also be used without a skeleton, in any suitable layer animation mode which may be available, for example, in Anime Studio and Flash animations formats.

Interactive construction of animation models with complicated skeletons and/or layers may be a difficult task even for a professional animator. Model transformer 330 may generate high quality layer and/or skeleton models automatically from a relatively simple model. It will therefore be appreciated that model transformer 330 may be used by professional animators in order to simplify models preparation.

It will also be appreciated that it may be equally and even more difficult to animate models with complicated skeletons and/or layers, since in a typical animation mode of the tools like Flash and Anime Studio each bone (layer) must be manually positioned in each key frame. This issue may be resolved as follows: an animator may use a simplified model, similar to fitting model 100, for an initial animation. Animation of such a model may be relatively easy since it has only a few bones (layers). However, as detailed hereinabove, the motion quality may be insufficient. In order to compensate, the animator may use skeleton refiner 320 and/or layers refiner 330 to produce a new, more complicated model. In accordance with a preferred embodiment of the present invention animation refiner 340 may be used by an animator to transform an animation from the initial simple model to the new, more complex one.

The animation improvement as performed by animation refiner 340 may be subordinated to the model improvement previously performed by the other components of model transformer 300. Such animation improvement may consist of translating the motion of the bones (layers) in the initial model to the motion of the bones (layers) in the improved one. This translation may not be defined uniquely, since the chain of the bones (layers) in the improved model may typically have more degrees of freedom than the initial one. So the translation must be chosen in such a way that the resulting motion looks natural.

Figure 10B:
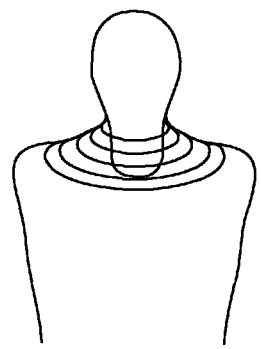

The present invention proposes for this purpose "joint motion models". These models can be prepared for various types of joints. FIG. 10B, to which reference is now made, illustrates another typical output of animation refiner 340: a layered neck joint of a human model that may resemble "medieval armor" layers aggregation: several deformed rings each rotating around a common center.

It will be appreciated that at each stage the animator may manually correct or improve the models and animation produced.

It will be appreciated that many animation formats (such as Flash earlier versions, SVG, etc.) do not allow for skeleton animation. Most formats do however support affine and even 3D layer motions. Accordingly, it may often be required to transform a skeleton animation into a layer one in order to play the animation on many available "player" applications.

In accordance with a preferred embodiment of the present invention skeleton/layer animation refiner 340 may be used to transform a skeleton animation into a layer animation. Animation refiner 340 may use layer refiner 330 to sub-divide original layers at each skeleton joint, resulting in the "armor structure" as described hereinabove. The "skeleton scenario" of the animation may then be transformed into the "layers motion scenario". This may be accomplished by approximating the skeleton-induced layer motion with that allowed in the targeted format layer motion. It will be appreciated that since the new layers are generally small at the skeleton joints, the accuracy of such approximation may be sufficient for a high quality visual reconstruction of the skeleton-induced motion.

In accordance with a preferred embodiment of the present invention, a 3D enhancement method may be employed to estimate the anatomic proportions of the character and its 3D position, starting with an accurate fitting of the fitting model to the visible contours of a photo-character.

It will be appreciated that a number of assumptions must be made regarding this process. It may be assumed that the photo-character has tightly fitting clothing, so the visible contours of the character on the photo closely approximate the contours of the body. It may also be assumed that in the process of the model fitting (interactive or automatic) not only the character's contours, but also the skeleton and its joints have been correctly positioned on the image. The fitting method disclosed in IL2008/001205 may be employed. Alternatively, any suitable fitting method may be used for the required positioning of the skeleton and its joints.

It will be appreciated that no 3D information may be available prior to this process. The model and its skeleton, as they appear to the user, may be two-dimensional and lay in the image plane. All the operations the user may perform with the model's contours and skeleton may be guided solely by the object contours in the image, and accordingly may not require any 3D interpretation. It will be appreciated that ordinarily 3D visual processing may be fairly difficult; the present invention may therefore successfully provide "easy animation" with a minimum of effort by an animator.

In accordance with a preferred embodiment of the present invention, anatomic proportioner 350 (FIG. 2) may use 2D contours and skeletons to provide the base information necessary to "read out" the anatomic proportions of a character and its 3D positions. This "read out" method may be based on an approximation of the original 3D character depicted on the 2D image with a special 3D-model (henceforth: "M3-model"). It is appreciated that it is well known that the problem of a 3D reconstruction from just one image is basically unsolvable. To overcome this difficulty, some specific assumptions regarding the geometry of the character may be used along with a fitting algorithm to derive a skeleton position (invisible in the actual image), Generally, an M3-model corresponding to a fitting model M may be a three-dimensional model whose "visible contours" may be taken from an initial 2D model M such as that depicted in FIG. 1. An associated three-dimensional M3-model M' may be constructed as follows:

Skeleton S of M may now be considered as a three-dimensional object S'. Accordingly, S' may possess the same bones and joints as S, but S' may be positioned in the 3D space, according to a typical 3D structure for the characters to be captured. For example, for the fitting model M shown on FIG. 1, the skeleton S' is a standard human skeleton which is well known in 3D imaging.

Figure 11:
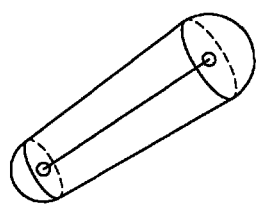

To each bone b of skeleton S', a 3D-shape L_b may be associated. b may be the axis for L_b; it may have variable elliptic sections by the planes orthogonal to b. More specifically, the shapes L_b associated with the bones of the arms and legs of the model M' may be formed by parts of circular cones along the axis b, and by parts of spheres at the ends. The shapes corresponding to the torso bones may have elliptic sections and may be closed at the endpoints by parts of ellipsoids. FIG. 11, to which reference is now made, shows an exemplary shape L_b.

Figure 12:
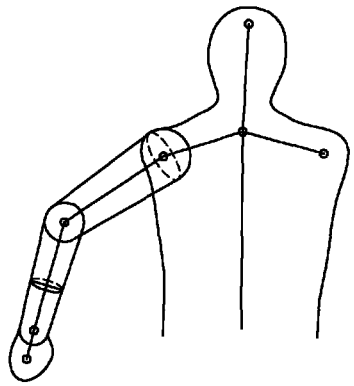
Figure 13:
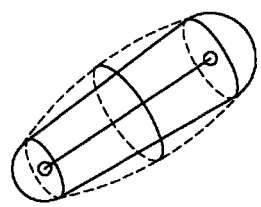

As shown in FIG. 12, to which reference is now made, shapes L_b as positioned around all bones b of skeleton S' may form a three-dimensional M3-model M' associated with model M. It will be appreciated that additional shape parameters may be added to the M3-model. In particular, the circular conic shape of L_b from FIG. 11 may be replaced by a shape with parabolically changing width of the sections as shown in FIG. 13, to which reference is now made.

Figure 14:
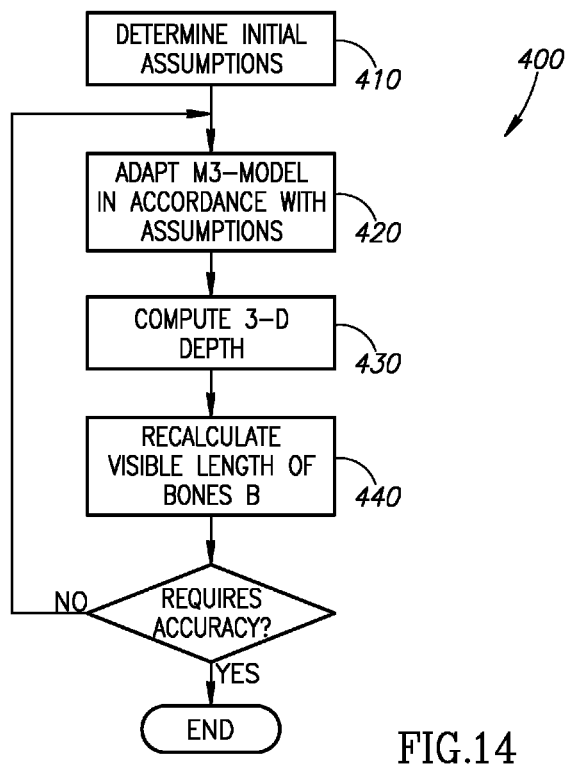
FIGS. 14, 25, 37 and 39, 40, 43 and 46 are block diagrams illustrating novel processes for the preparation of animations based on the models of FIG. 1, constructed and operative in accordance with a preferred embodiment of the present invention.

Since both affect the visible contours of the character in a similar way, it may be preferred to derive anatomic proportions and the 3D position of the character simultaneously. FIG. 14, to which reference is now made, illustrates a process 400 for this derivation.

Initial assumption regarding the character may be determined (step 410). Certain of these assumptions regarding the anatomic proportions of the character may be fixed. If no specific information in this regard may be available, the average proportions may be taken. However, a user may provide some basic information on the character (age, gender, body-type, etc.) which may also be used to determine the initial assumptions in part or in full.

Figure 15:
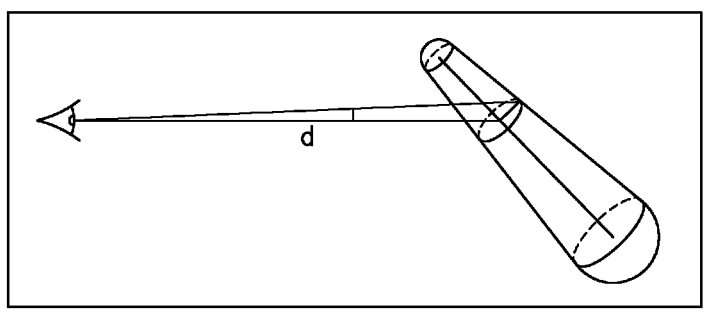

Anatomic proportioner 350 may adapt (step 420) the parameters of the M3-model in accordance to the initial assumptions determined in step 410. For each bone b, its 3D depth may be computed (step 430) from the width of the corresponding layer in the direction orthogonal to the bone. The mathematical formula for this computation may be as follows: $d=D(w\backslash W)$ where d may be the 3D depth of the bone's point, D may be the depth in the standard position, w may be the visible width at each point and W may be the visible bone's width in the standard position. FIG. 15, to which reference is now made, illustrates the variables used in this computation.

Anatomic proportioner 350 may recalculate (step 440) the visible lengths of all the bones b in the fitting model according to their 3D position as estimated in step 430. The visible widths of the layers may also be corrected in the same manner. On this base, a new and more accurate estimate of the anatomic proportions of the character may be formed (including the true width of the arms, legs, etc.). Comparison of the right and left hands and legs provides additional constraints in these estimations.

It will be appreciated that in the process of computing the 3D position of the M3 model, anatomic proportioner 350 may force the location of joints to satisfy known anatomical restrictions of the joints of a human body. This may be accomplished, for example, by assuming that the joints to belong to a known data base of 3D motions, for example, the Carnegie Mellon University open data base CMU Graphics Lab Motion Capture Database, as it appears on the site http://mocap.cs.cmu.edu. One application of this data base is described in the paper "Character Animation from 2D Pictures and 3D Motion Data", by Alexander Hornung, Ellen Dekkers, Leif Kobbelt: ACM Transactions on Graphics (TOG), vol. 26(1), 2007.

However, the process as described by this paper does not take into account the body's proportions, presenting a serious difficulty for pose reconstruction. Accordingly, anatomic proportioner 350 may rescale the joints positions for the standard body as depicted in the reference database according to the proportions estimates found as described hereinabove. The procedure may be repeated as necessary. The unknown (but typically standard) camera position may be estimated via known methods (see, for example, Aachen paper).

Steps 420, 430 and 440 may be repeated until a required accuracy may be achieved. This accuracy can be estimated either visually by the user or via some pre-determined thresholds. It will be appreciated that the fitting of the M3-model described in this procedure may be used in order to reconstruct a textured 3D-model of a photo-character. Alternatively, the M3-model obtained may be replaced with a geometrically similar model in a standard 3D format, and to fit the corresponding texture (cut out by the fitting model) accordingly, via well known procedures. The resulting 3D model in standard 3D formats can be used in popular 3D games, virtual meeting places, etc.

In accordance with a preferred embodiment of the present invention, pose transformer 360 (FIG. 2) may be used to transform the pose and proportions of the animation model to an initial pose required by the animation, taking into account the estimated anatomic proportions of the character and its 3D position.

Figure 16A:
FIGS. 16-20, 22-24, 26, 28-36, 38, 41, 42 and 47 are images that illustrate exemplary processing of the models of FIG. 1 within the embodiments of FIGS. 2, 14, 25, 37 and 39, 40, 43 and 46.
Figure 16B:
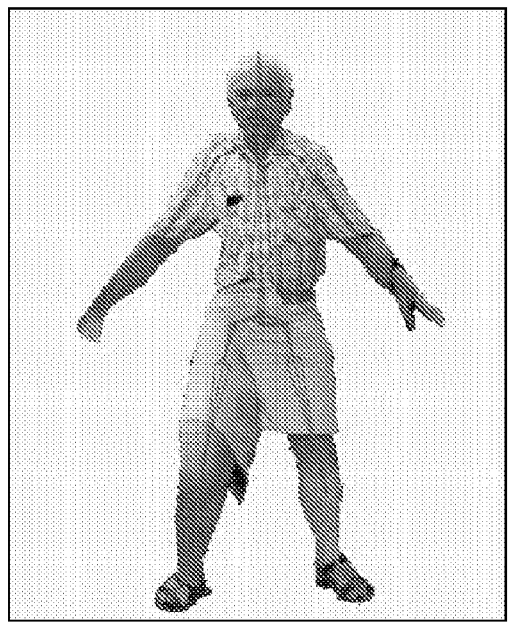

Such a transformation may be necessary since after a fitting to the actual character on the photo the pose and proportions of the model may change. Therefore the original animation scenario prepared for the original pose may produce visible motion problems. For example, FIG. 16A, to which reference is now made, a shows photo of a human character in a non-standard pose, together with the fitting model fitted to the character. FIG. 16B, to which reference is now also made, shows a result of a straightforward pose transformation to the standard enface pose, where all the skeleton bones may be rescaled and rotated to fit the standard model position (as shown in FIG. 1), while the layers may be rescaled in the same way as their bones. This transformation may present serious visual distortions.

There may be many approaches to perform a certain pose adjustment. It may typically be combined with animation adjustment as will be described hereinbelow. The present invention may include several alternative approaches as may be described hereinbelow:

One basic approach may be to leave the model in the exact position of the photo-character, as it has been fitted to it; no model transformation may be performed after fitting. This approach usually works well if the poses of the photo-character and the initial model position in the animation scenario are relatively similar. It may typically work well for "small motion" animations as disclosed in PCT application IL2008/001205. The advantage of this solution may be that initially the animated character may look exactly as on the photo. A serious disadvantage may be that the motion patterns of "large motion" animations may be seriously distorted.

At the opposing end of the spectrum, an opposite "extreme solution approach" may be that the skeleton of the fitting model may be transformed to the exact initial position of the skeleton of the animation model, while the texture layers are transformed to exactly fit the layers of the model in the in the model's initial position. The advantage of this approach may be that the motion quality of the animation may be completely preserved. However, the proportions of the character may be significantly distorted, and it may be difficult to recognize this character after a transformation. Still, this transformation may be useful, for example, in a "caricature animation".

An "intermediate approach" may be to restore the angles between the skeleton bones as in the initial position of the animation model, while adapting their lengths and the layer widths to the anatomic parameters estimated as described hereinabove. A modification of this approach may entail the restoring of only some of the angles while preserving others. In particular, in the human model M as shown in FIG. 1, only the angles between the bones of the arms and legs may be restored, while the angles between the interior bones of the body may be left untouched. This approach may usually preserve animation quality while providing a maximal resemblance with the photo-character. It will be appreciated that various combinations of these options can be used.

In some skeleton animation formats, like Anime Studio file.anme, the animations may be represented and stored via the angles increments between the bones. Consequently, the angular motion of the skeleton bones may remain basically correct for the extreme solution and intermediate approaches described hereinabove. However, in the basic approach with no model transformation after fitting, skeleton motion changes may lead to visual distortions. One way to solve this problem may be to bring the animation model from the photo-character pose to the initial pose of the animation via a short initial motion.

An additional problem may be that changes to the model's proportions may cause a lack of coordination between the motions of different animated characters. For example, a player may miss the ball; a walking character may lose contact with the ground, etc. These problems may sometimes be solved by mathematically re-computing a relative motion of different objects. For example, if the legs of a walking character become shorter, the speed of the ground motion may be reduced accordingly.

Another solution may be to construct a special "Combined model" in which, for example, the ball may be kinematically connected to the player's hand. In the Anime Studio format this can be accomplished by connecting certain points in the "ball" texture layer with the palm bone of the player. The ball may not be visible in the fitting model, but after the fitting has been completed and the animation model has been formed, it may reappear in this model.

More complicated effects may be achieved with a combined model. For example, in an animation presenting two players playing a ball, two different "ball" texture layers may be prepared and connected to the palms of the respective players. In the process of the animation, when the ball reaches the middle position, one copy may replace another. This arrangement may guarantee that even after the proportions of the player's models may have been altered, the ball may still correctly touch the palms of the players.

Figure 17A:
Figure 17B:
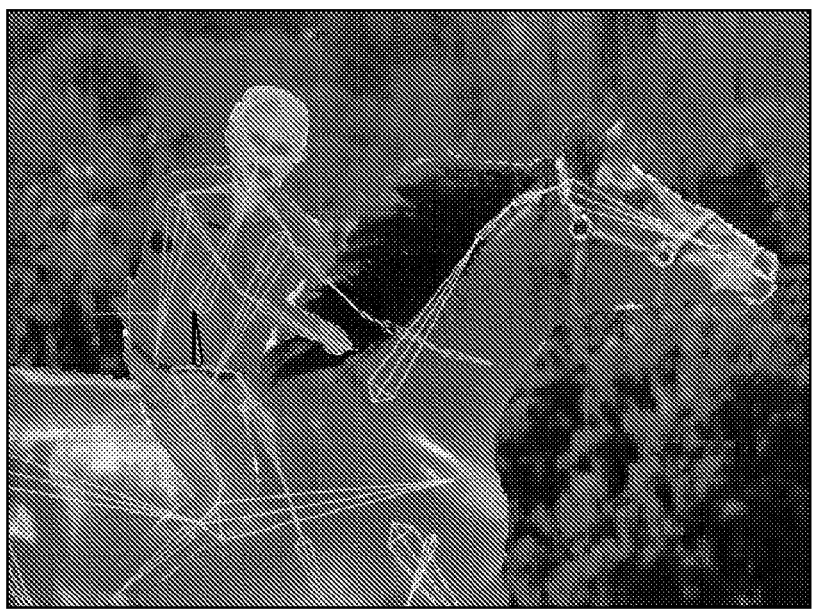

Many other situations may be treated this way. One example is presented in FIGS. 17A and 17B, to which reference is now made. In FIG. 17A an appropriate point of the beer mug's layer is associated to the endpoint of the palm bone of the skeleton. In such manner the coordination between the actor's palm and the mug may be preserved as the proportions of the actor change. Another example is shown in FIG. 17B. In this example, the appropriate bone of the human character (marked in black) is associated to the corresponding bones and layers of the horse sub-model. In addition, the horse sub-model may be rescaled according to the estimated height of the human actor. Accordingly the coordination between the actor's and the horse's position and proportions may be preserved even as the proportions of the actor may change.

It will be appreciated that the association of some texture layers with certain skeleton bones may just one example of how "Combined models" may work. Other examples of combined models, including clothing layers, as well as some special "Detailed sub-models" may be described hereinbelow.

"Computer assisted fitting" may provide a very easy interactive fitting of models to the photo-image objects. The hierarchically rigid models and their hierarchical interactive and automatic fitting, as described in the PCT application IL2008/001205, may provide a strong and convenient fitting tool. In particular, a separation of the interactive fitting into steps according to the model hierarchy may make an interactive fitting feasible and easy in many complicated situations. However, the interactive fitting may be still rather difficult, especially at the last step which may require an accurate fitting of the model contours at a fine scale.

In many cases automatic completion of the fitting may save the user a lot of work in fine scales. However, if the user asks for an automating fitting before the required initial approximation has been achieved, the resulting fitting may have serious faults. In such cases the user can correct these faults interactively. However automatic fitting errors typically occur in finer scales, and since they may comprise unexpected jumps and may also not be subordinate to the general image shape it may be difficult to correct them interactively. In such cases it may be preferable to just start the interactive fitting process over again from the beginning.

In accordance with a preferred embodiment of the present invention, an automated fitting completion unit 370 may also be provided. A user may employ automated fitting completion unit 370 to initiate automated fitting completion at any stage of interactive fitting. However, before the results may be presented to the user, unit 370 may estimate the quality of the fitting achieved according to the methods disclosed in PCT application IL2008/001205. If the fitting discrepancy as estimated may be larger than a preset threshold, the automatic fitting completion process may be repeated until the estimated discrepancy may be lower than the threshold. However, it will be appreciated that the automatic fitting completion process may be repeated only up to the fitting hierarchy level at which the user asked for the automatic completion. The results of the iterative automatic completion process may then be presented to the user. It will be appreciated that if there may have been errors in this process, their interactive correction may likely not be any more difficult than the fitting the user had already done because the errors may be at the scale already processed by the user.

In accordance with an alternative preferred embodiment of the present invention, in order to provide a finer fitting accuracy, the automatic fitting may be repeated up to one hierarchy level higher than the level at which the user asked for the automatic completion. In order to implement this functionality within the present invention, the user interfaces may be designed in such a way such that they encourage the user to perform the initial easy fitting steps interactively and then to request automatic completion on higher steps. FIGS. 18A-18F, to which reference is now made, illustrate exemplary inputs and outputs of the process performed by unit 370. It will be appreciated that they also represent an exemplary arrangement of the user interface for the interactive-automatic fitting process.

Figure 18A:
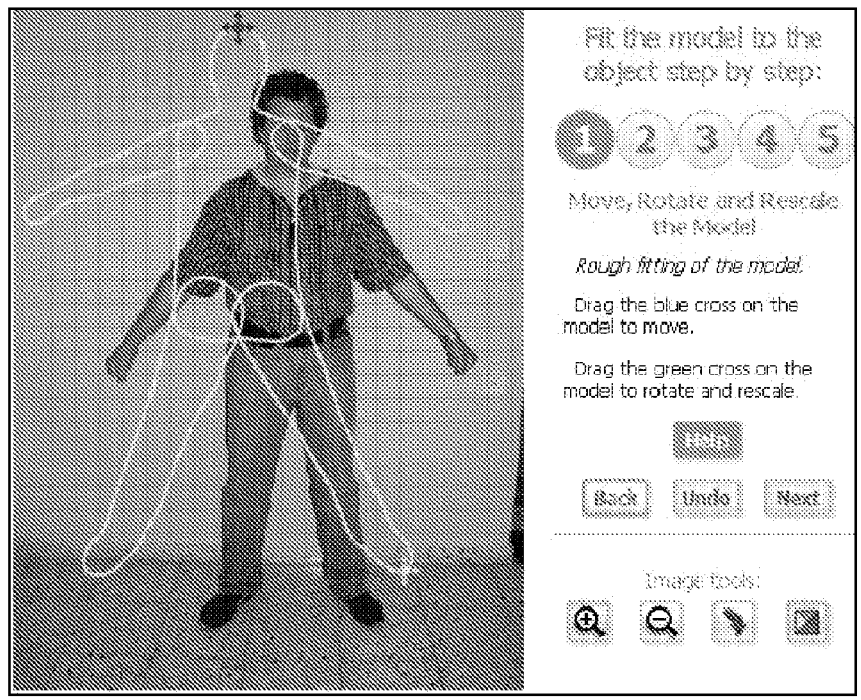
Figure 18B:
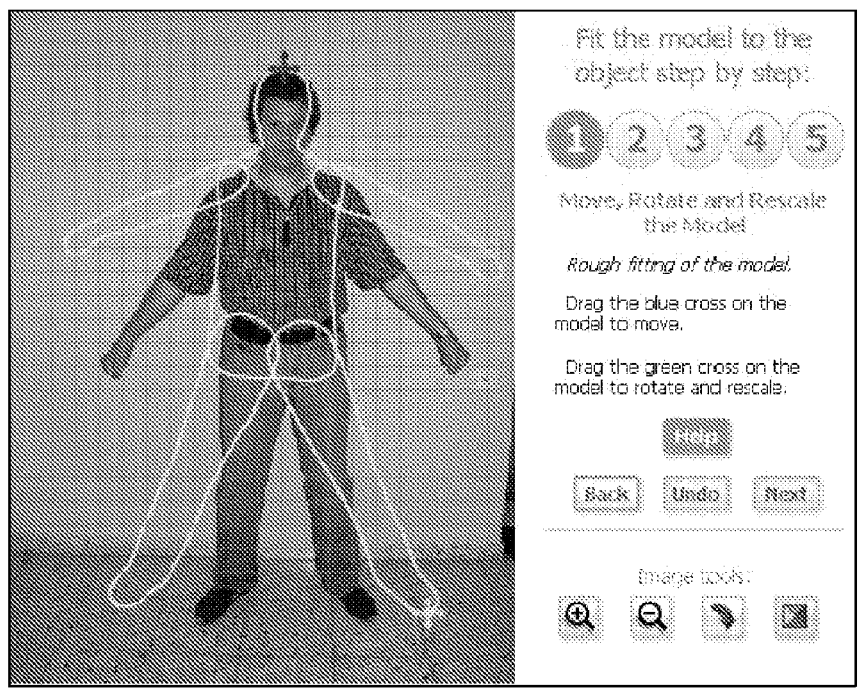
Figure 18C:
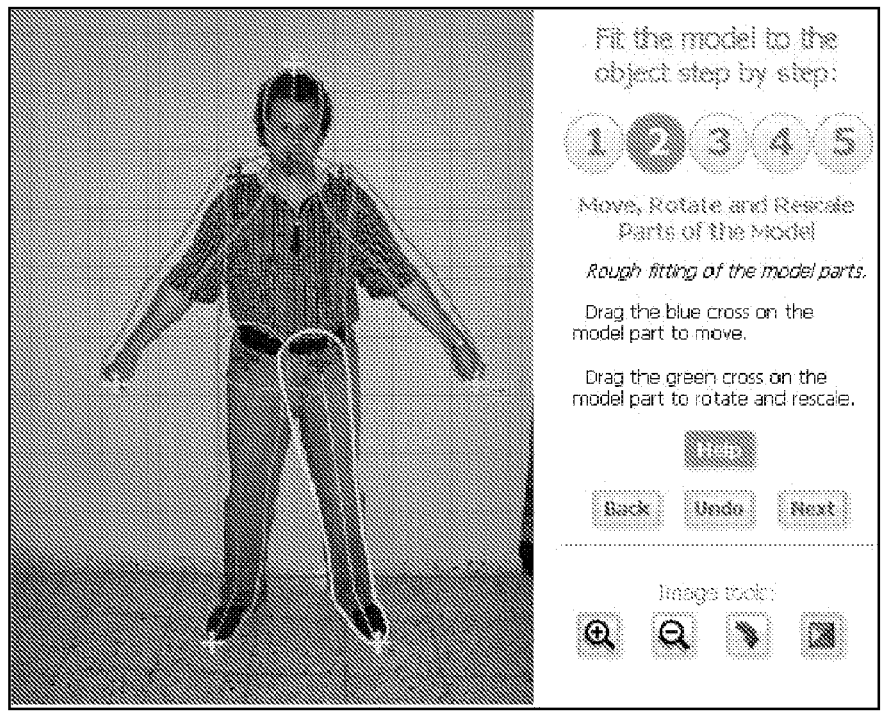

FIG. 18A shows a photo-character and the model to be fitted to it. The first step of the fitting may typically be performed by the user manually. It may be restricted only to the translation and rotation of the model, and usually it may be very easy and fast to complete. An exemplary result of this initial fitting is shown in FIG. 18B.

The next step may be restricted to the translation and rotation of the main model layers (hand and legs) and it may also be relatively easy for a non sophisticated user. An exemplary result of this step is shown on FIG. 18C.

Figure 18D:
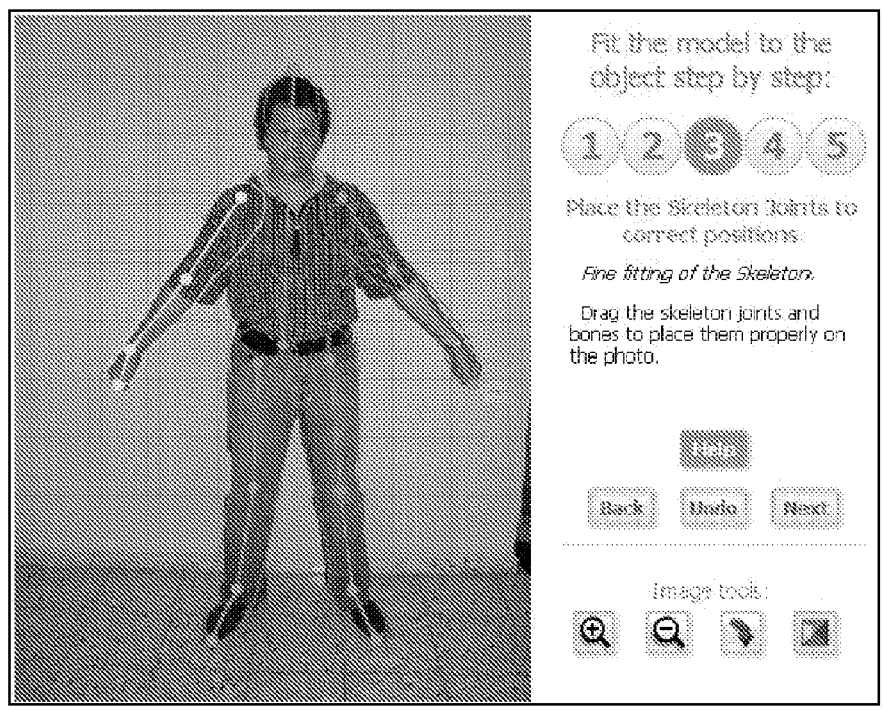

The user may then attempt to accurately position the joints and bones of the skeleton. This task may be more demanding, since in some situations it may not be clear to the user where exactly to put these skeleton elements. Also the number of the skeleton joints may be quite large (in the example of FIG. 18 there are 14 joints) and their processing may take time. However, it will be appreciated that this task may still usually be performed within seconds. An exemplary result is shown in FIG. 18D.

Figure 18E:
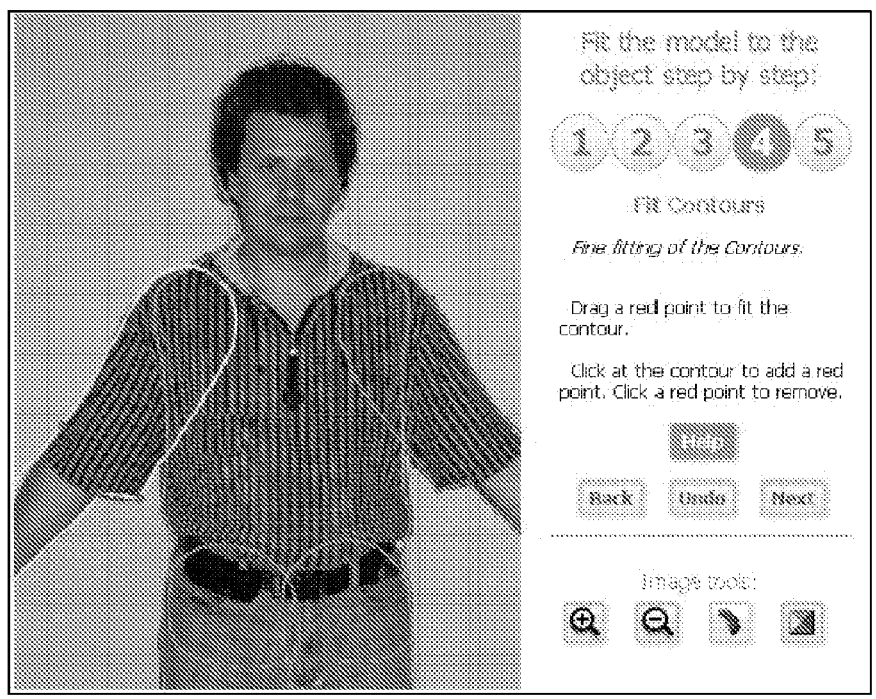

The final step may require the user accurately fit the models contours in a "fine scale" of a few pixels. This may typically be the most time consuming part of the fitting process since it requires typically fitting of tens of contour points. Accordingly, in accordance with a preferred embodiment of the present invention, the user may perform only a few "key" contour adjustments manually; for example, marking the sleeves corners and roughly adjusting the face contours. An exemplary result of such key adjustments is shown in FIG. 18E.

Figure 18F:
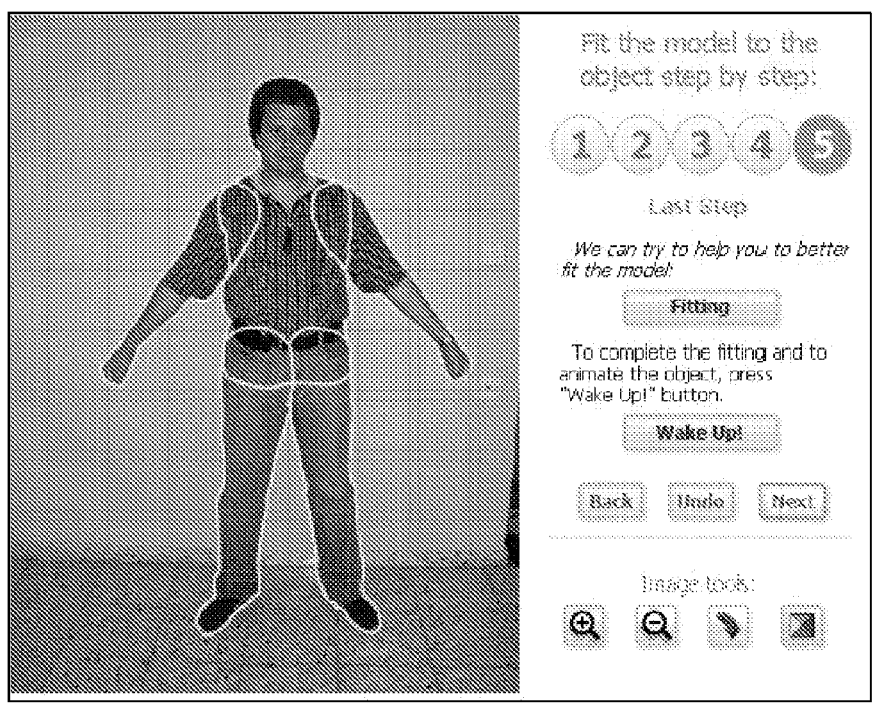

At this point, unit 370 may suggest that the user elect to apply an automatic completion of the fitting. FIG. 18F, shows an exemplary result of such fitting based on the previous manual fitting steps performed by the user. It will be appreciated that unit 370 may complete the interactive process by producing a very accurate fine-scale fitting of the contours.

It will be appreciated that it may be preferable to perform as much of the fitting task as possible in an automated process. This may be especially important for implementations on wireless devices where the screen size and controls of cellular devices strongly restrict the user's interactive possibilities. Accordingly, unit 370 may also provide a method of automatic-interactive fitting where the automatic option is used to its full capacity. The automatic-interactive option may perform as follows:

Automatic fitting as described in PCT application IL2008/001205 may first be performed to its full extent, without even showing the user the model to be fitted. Before the results of the automated fitting may be presented to the user, the quality of the fitting achieved is estimated according to the method of PCT application IL2008/001205. If the estimated fitting discrepancy may be larger than a preset threshold, the automatic fitting process may be repeated up to the hierarchy stage before highest stage fitted in the previous iteration. This step may be repeated until the fitting quality exceeds the threshold set for the corresponding hierarchy level.

The fitted model may then be displayed for the user in the position achieved at the last iteration of automated fitting (i.e. at the highest level where the estimated error does not exceed the predefined threshold). The user may then be prompted to continue interactively—automatically, as described hereinabove. In the event that the required fitting accuracy has not been achieved at any hierarchy level, the user may be prompted to perform the entire process interactively—automatically as described hereinabove.

It will be appreciated that automatic-interactive fitting may also start with a hint from the user regarding the position of the character. This may, for example, be a rough indication of the character's visible contours, or an approximate "painting" the character with the "brush", etc. It will also be appreciated that the use of the methods of PCT application IL2008/001205 may have been exemplary. Any other suitable methods for automated fitting and/or accuracy estimation may also be used instead of, or in addition to, those discussed within the context of the process.

In some implementations of the present invention, the user's options for intervening in the fitting process may be limited to just "pressing buttons". For example, cellular phones may have relatively small screens and restricted interface options. The present invention may also provide a method for a completely automatic fitting even where the user's intervention may be restricted to only accepting or declining the fitting results. It will be appreciated that when using the automatic fitting method described by PCT application IL2008/001205, observed errors may most frequently be caused by a lack of exact correspondence between the correct fitting and the global minimum of the fitting discrepancy. Instead, the correct fitting may correspond to some of the local minima. Because the image data may typically be incomplete, it may happen that the correct fitting of the model may not provide the absolute minimum to this discrepancy, while the incorrect fitting does. For example, a certain edge near the true object contour may appear much longer than the edges of the true contour, which may lead to such an error. With this in mind, the automatic fitting under a user's control may be performed basically as described hereinabove, with the following difference: if the user declines the fitting result, the algorithm may show him the fitting corresponding to the second best discrepancy minimum, and so on. In such manner, the correct fitting may usually be achieved after relatively few attempts. In this mode, unit 370 may not prompt for an interactive user's fitting, but rather for just accepting or declining the results.

In animation of "large pictures" (or "Live Photo") as described in PCT application IL2008/001205, the completely automatic model fitting may be arranged as follows: first the user specifies the types of characters appearing on the photo (human, pets, etc.). The corresponding models are selected from the library automatically. Then for each of the models an initial fitting to the image objects is applied, as described in PCT application IL2008/001205. The successful fitting results (estimated as described in PCT application IL2008/001205) are presented to the user for a final confirmation.

It will be appreciated that when the character to be animated has complicated clothing all the operations described above become more difficult. This may be of particular concern when estimating the character's anatomic proportions as described hereinabove. It will be appreciated that the description included hereinabove was, for illustrative purposes, predicated upon the assumption that the clothing of the character accurately fit the body. However, applicants have realized that the present invention may be expanded to provide inscription of a character's body into clothing.

It is well known in the art that such inscription of a character's body into available "dressed" photos is problematic. A review of relevant issues may be found in the paper: "The Naked Truth Estimating Body Shape Under Clothing, by Alexandru O. Balan and Michael J. Black, Department of Computer Science, Brown University, Providence, R.I. 02912, USA, that appeared in "D. Forsyth, P. Torr, and A. Zisserman (Eds.): ECCV 2008, Part II", LNCS 5303, pp. 15-29, 2008 Springer-Verlag Berlin Heidelberg 2008. The problem of body inscription into clothing may not allow for an easy interactive solution; the body's contours may not appear on the image, and a non sophisticated user may not be expected to be able to identify these contours. Accordingly, the present invention may include the following method for automatic and\or interactive body inscription into a dressed character's photo.

The body model (BM) as described hereinbelow may be used independently of any other model. However, typically a body model BM may be associated with a general model M, such as, for example, the human enface model of FIG. 1. A body model BM may have a skeleton identical to the skeleton of the associated model M. The layers of BM may similarly have the same topology as the layers of M, and their shape may represent a typical body of the character to be animated.

In addition to the skeleton controls described in PCT application IL2008/001205, a model BM may also have additional "proportion parameters", such as: shoulders width, hands width, legs width and other standard human body measurements well known to those familiar with human anatomy and/or dressing industry professionals. It may also have the contour control parameters described in PCT application IL2008/001205, with the exception of fine scale controls. Specifically, for a human model built according to the methods PCT application IL2008/001205, the finest scale of the control parameters in the body model is the scale of the contour controls with the basic contour segments comparable with the length of the model's arms and legs. This reflects the fact that the body contours may typically have more rigidity in the fine scale geometry than the clothing contours.

Figure 19A:
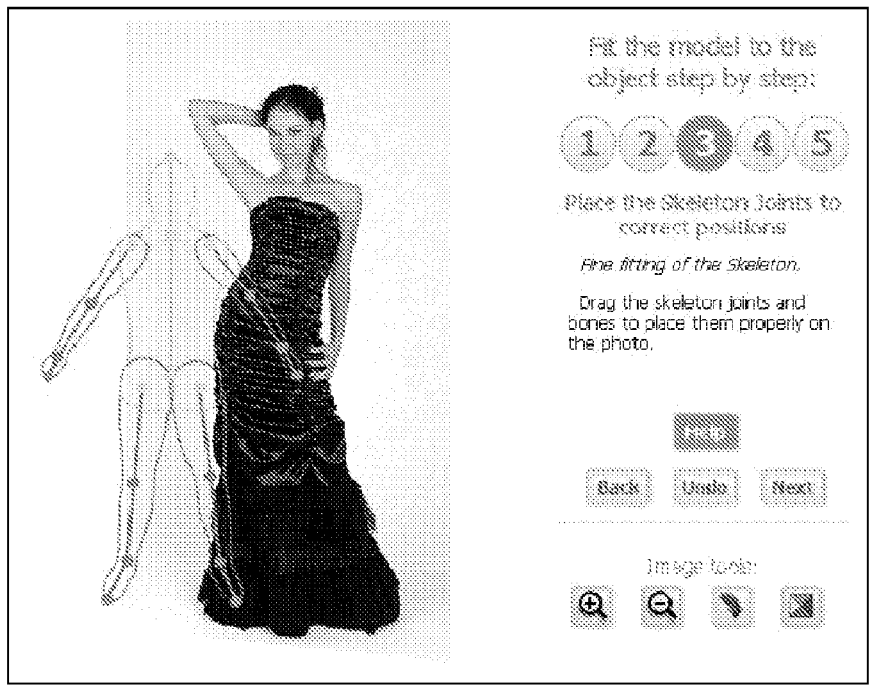
Figure 19B:

In accordance with an exemplary embodiment of the present invention, it may be assumed that the body model BM may not be associated with a specific general model M. In such a case, "body inscription" may be performed in the same steps as model fitting as described in PCT application IL2008/001205, with the following distinctions:

The body model's "proportion parameters", as described hereinabove, may be used in the fitting process, at the same hierarchy level as the skeleton parameters, in addition to them. Furthermore, a "body penalty" function as described in PCT application IL2008/001205 may be added to the fitting objective function. This may assign a very high penalty for a situation where the contours of the body model BM may extend beyond the "clothing contours" of the photo-character. Lastly, fine scale contours fitting may not be used. The "body inscription" steps may be performed either interactively or automatically, or in a combined mode, as described for the previous embodiments. FIGS. 19A and 19B, to which reference is now made, illustrate an exemplary body model BM and a character to which it may be fitted by the described process. FIG. 19A may show the body model BM next to the character; FIG. 19B shows the body model fitted to the character, effectively "inscribing" the body model within the clothing of the character.

Figure 20A:
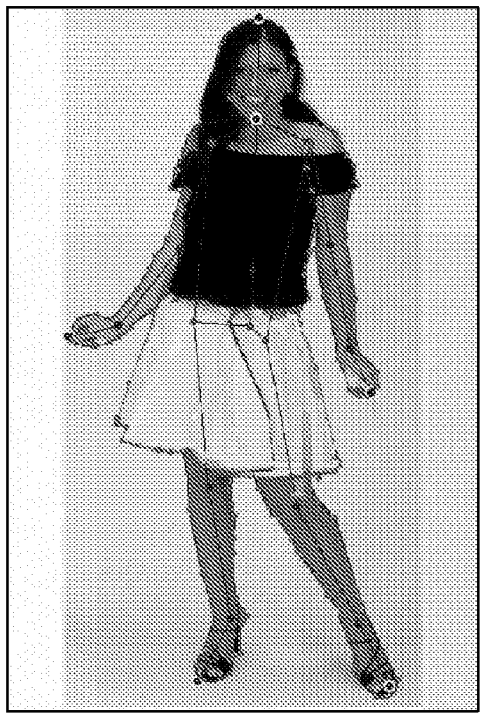

In accordance with a preferred embodiment of the present invention, body model BM may be associated with a model M to form a combined model for body inscription. In such a case, a general character's model M may be fitted to the visible (clothing) contours. This may be done either automatically, or in an interactive-automatic procedure as described hereinabove and/or in PCT application IL2008/001205. FIG. 20A, to which reference is now made, shows an exemplary result of this step, the contours and the skeleton of the fitted model M.

A Body model BM associated to the general model M may be automatically inscribed into the contours of the model M (which may have already been fitted to the visible character's contours). It will be appreciated that in this procedure the user may typically not even see the model BM. This inscription may be performed in the same manner as the general model fitting described in PCT application IL2008/001205, with the following distinctions: The initial position of the skeleton of BM may be provided by the skeleton of M. Accordingly, the skeleton controls are not applied (in the first fitting iteration). The proportions parameters as described hereinabove may be applied instead. A "body penalty" function may be added to the fitting objective function as described hereinabove. Similarly, fine scale contours fitting may not be applied.

Figure 20B:
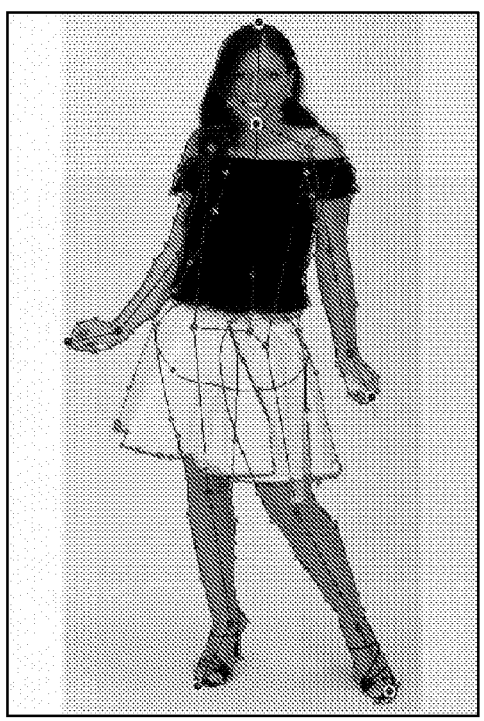

If necessary, further iterations of the fitting may be performed. Each iteration may start with the application of the skeleton controls group, as described in PCT application IL2008/001205. However, the scanning ranges of the skeleton controls may be set to be relatively small. Then the "proportions" controls and other control groups may be applied as described hereinabove. This step may be necessary because in some cases the initial skeleton position provided by the "clothing fitting" may be not accurate enough. FIG. 20B, to which reference is now made, shows an exemplary result of this step, body model BM "inscribed into model M".

It will be appreciated that automatic body inscription may be the preferred method for achieving the required result. However, the present invention may also provide the user with all the necessary tools for an interactive or automatic-interactive body inscription. These variant methods may be performed in generally the same manner as the general automatic interactive model fitting described hereinabove.

Figure 21A:
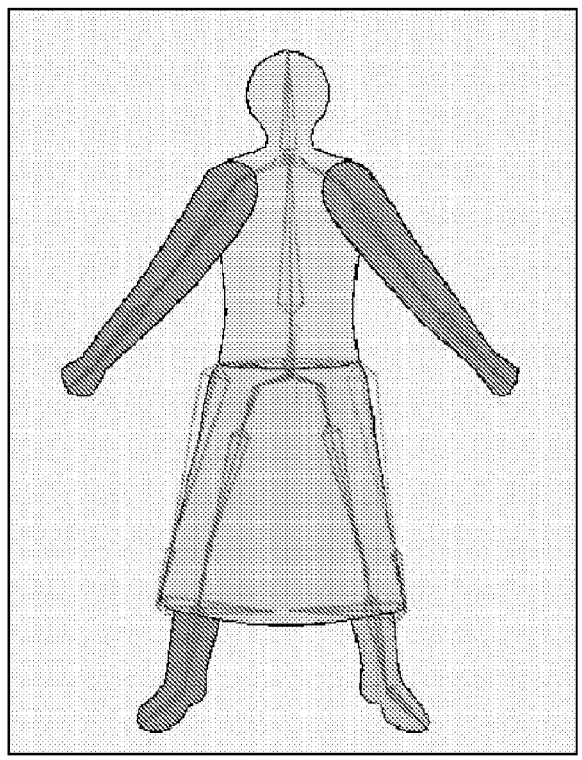
Figure 21B:
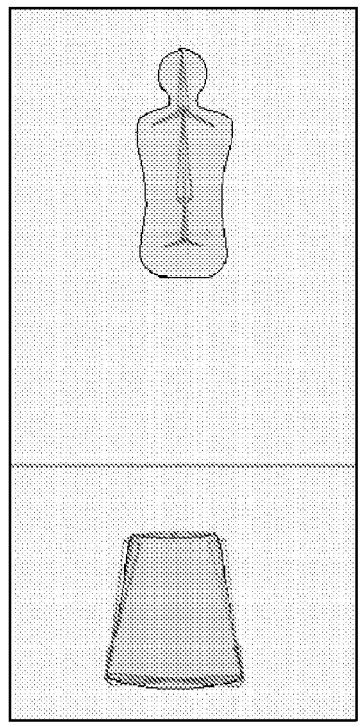
Figure 21C:
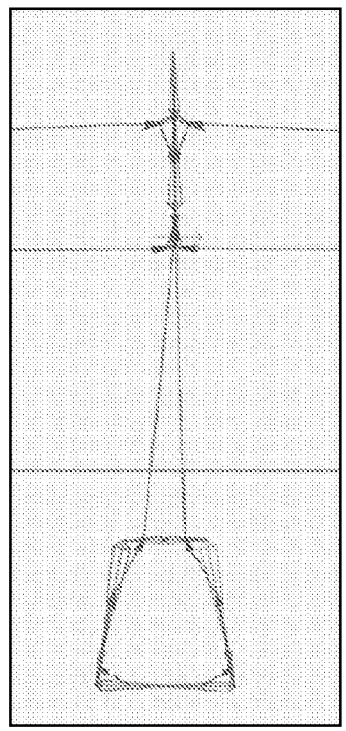
Figure 21D:
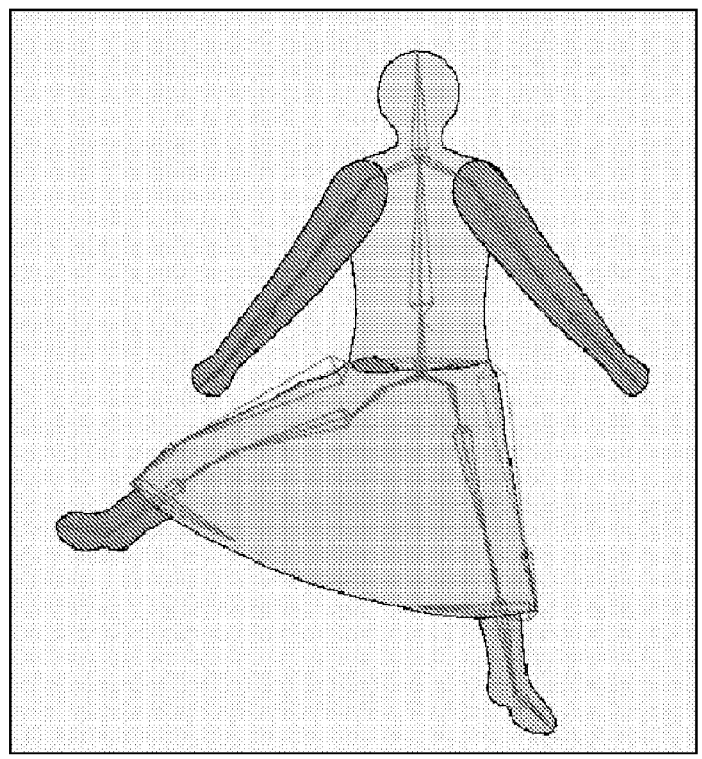

In accordance with a preferred embodiment of the present invention, clothing models may be merged with character models as additional layers. It will be appreciated that it may be problematic to provide clothing layers a relative freedom in animations while still subordinating their motion to the motion of the character's body. However, by using a "combined model" as described hereinabove, the new clothing layer may be kinematically connected to the appropriate part of the character's model. For example, a sleeve may be connected to an arm. In the Anime Studio format this may be done via connecting certain points in the clothing texture layer with a certain bone of the character. Reference is now made to FIGS. 21A-D which together illustrate an example of how clothing layers may be represented in combined models in the Anime Studio format. FIG. 21A shows a general body model combined with a skirt model. FIG. 21B shows the separate torso and skirt layers. It will be appreciated that, depending on the tools used, there may be more than one way to combine clothing and character methods. FIG. 21C shows an example based on another method to combine clothing and character models in the context of the Anime Studio format. Instead of matching points in a clothing layer to a body part, the bones of the clothing layer may be subordinated to the appropriate bones of the character. For example, as shown in FIG. 21C, the skirt bones of the clothing layer may be subordinated to the torso bones of the body model. FIG. 21D shows the subordinated skirt model following the body model in animation.

In accordance with a preferred embodiment of the present invention, automatic, interactive or combined fitting of combined models may be performed in generally the same manner as for simple models. It will, however, be appreciated that there may be some difference in the processing. The first group of control parameters may be formed by the body controls. In contrast, the clothing layers in the initial fitting may just follow the body via their kinematical subordination, as described hereinabove. The clothing contours may also be accorded greater weight than the body contours in the fitting objective function (since the body contours are normally occluded in the image). Also, the "body inscription" objective function (as described hereinabove) may be added to the fitting objective function. This serves to achieve in the fitting of a combined model both an accurate fitting of the visible image character's contours by the clothing contours, as well as an accurate inscription of the body into the clothing.

Interactive and automatic-interactive fitting may follow the same hierarchy: first the body controls may be applied to fit the visible contours of the characters, after which finer scale fitting for the clothing contours may be performed, and lastly body inscription into the clothing may be improved. If necessary, these steps may be repeated iteratively.

Figure 22A:
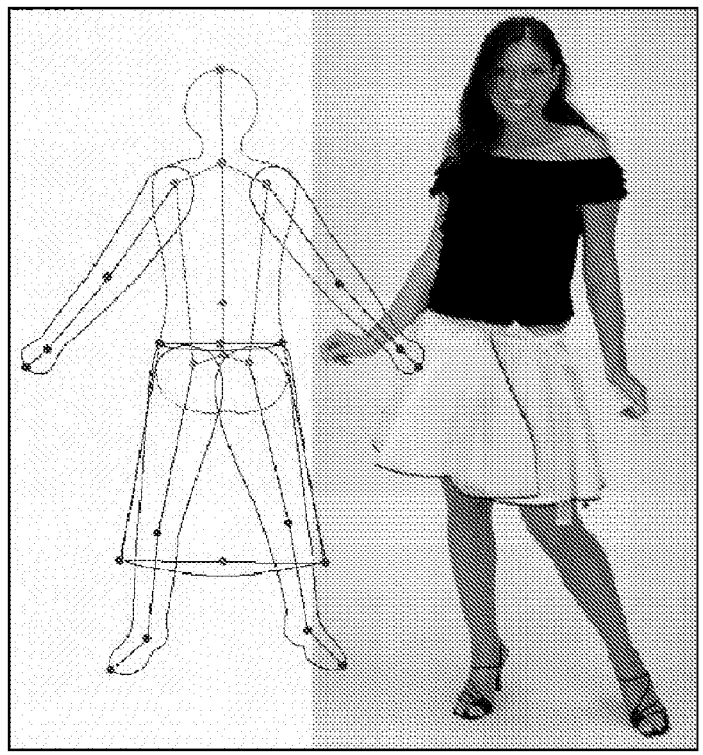
Figure 22B:
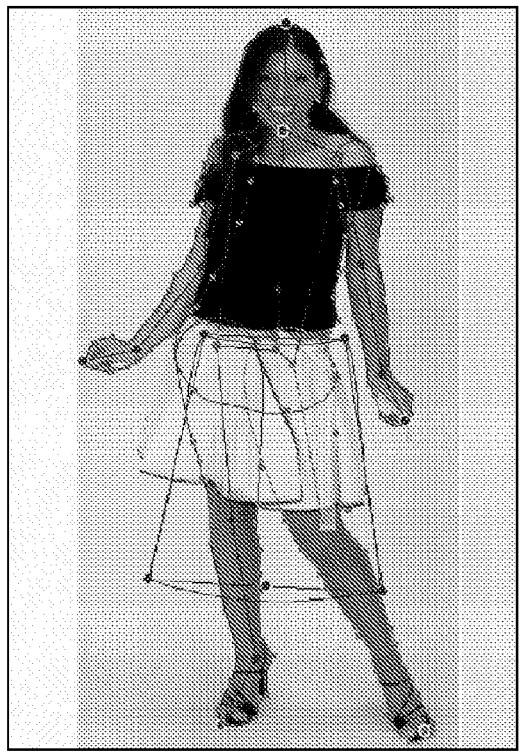
Figure 22C:
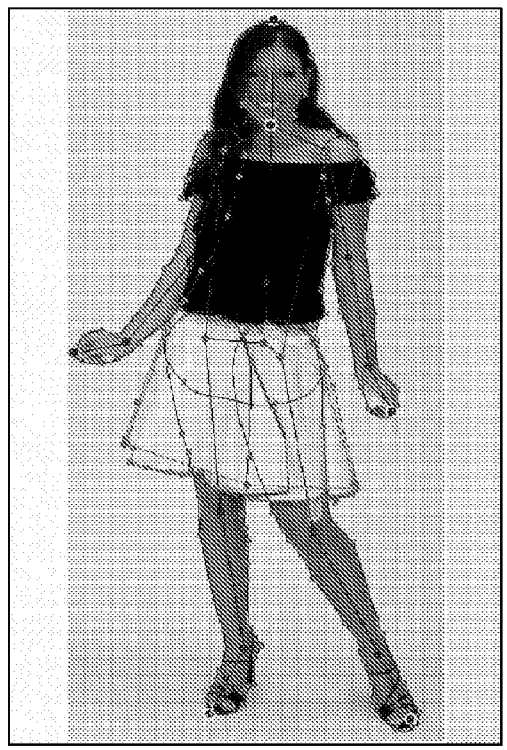

Reference is now made to FIGS. 22A-C which together illustrate the stages of an exemplary fitting of combined models. FIG. 22A shows a fitting combined model and a fitted photo-character. It will be appreciated that the fitting model as appears to the user may be much simpler than an animation model such as shown in FIG. 21A. Transformation of fitting models into animation models and back may be performed as described hereinabove. FIG. 22B shows a fitting of the body model where the skirt model may not yet have been fitted. FIG. 22C shows a final fitting of the combined model.

Figure 23A:
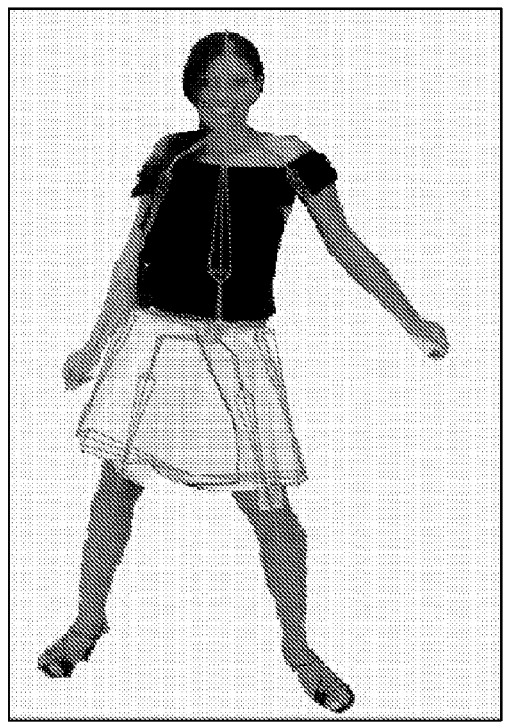
Figure 23B:
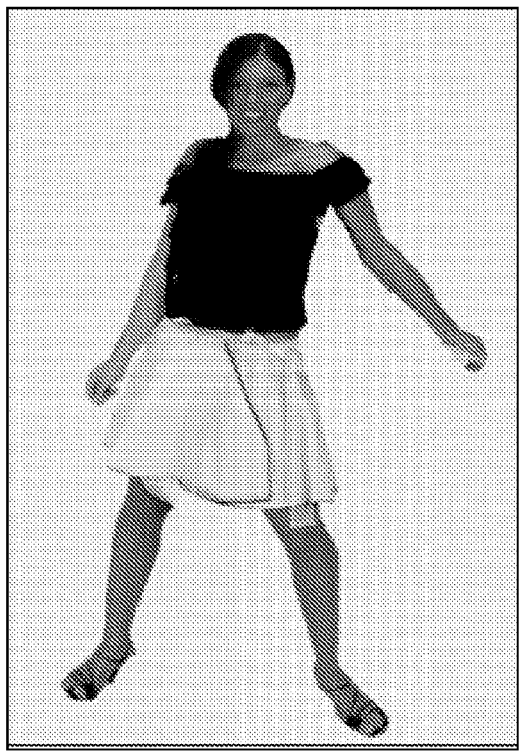
Figure 24A:
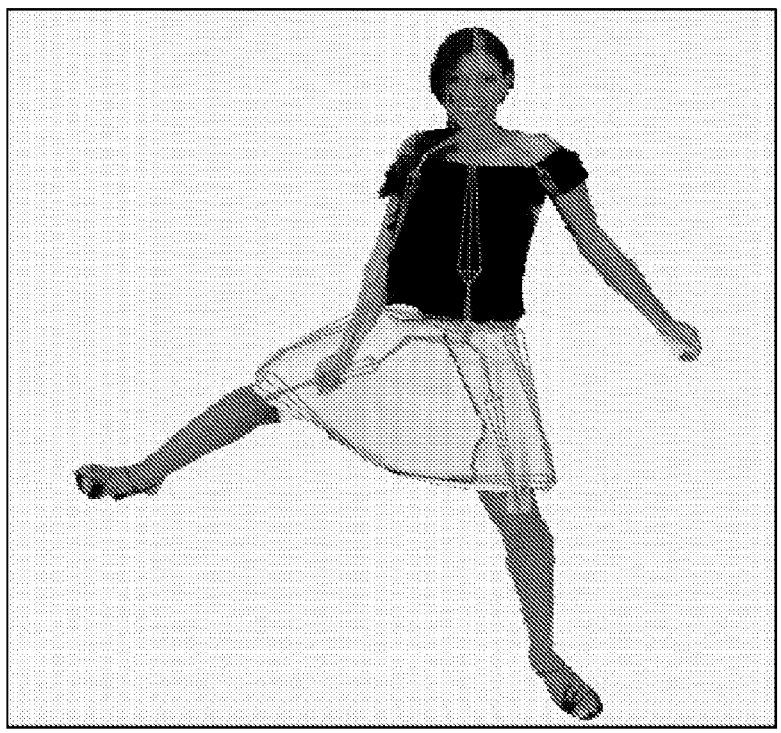
Figure 24B:

FIGS. 23A and 24A, to which reference is now made, represent "before" images of the results of cut-out and transformation to the initial frame of a typical animation (in the Anime Studio format). FIGS. 23B and 24B, to which reference is now made, show final rendering results of the frame. It will be appreciated that FIG. 24 may represent a more advanced frame of the animation.

Interactive model fitting may be particularly challenging for complicated models containing various layers with separate bones and joints. While fitting a combined model containing the character's body and additional clothing layers with their subordinated bones may be possible and sometimes advantageous in the framework of the present invention, such a fitting may present a difficult task for a non-sophisticated user. In accordance with a preferred embodiment of the present invention, a "clothing transformer" may be employed to simplify the task by splitting it into two stages. First, the user may interactively (or automatically-interactively, as described above) fit a relatively simple model, such as model M in FIG. 1. The user may then use a special "Clothing transformer" to automatically transform this fitted model into a Combined Animation model.

Figure 25:
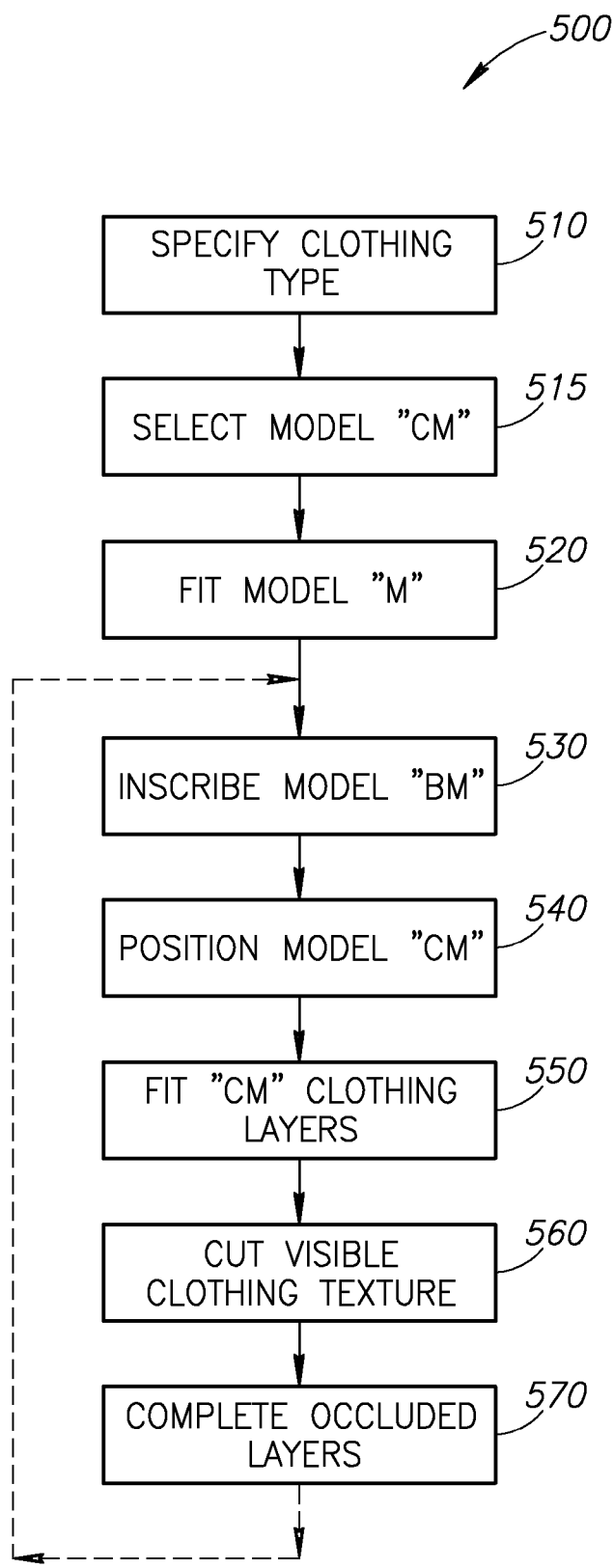
Figure 26A:
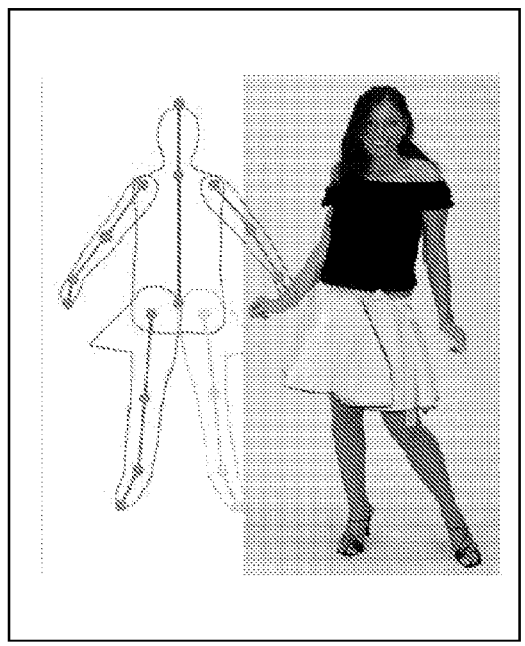

FIG. 25, to which reference is now made, shows a novel process 500 for such interactive fitting. The user may specify (step 510) the "clothing type" of the character to be animated (for example, "shirt and trousers"). The corresponding Combined Clothing model CM may then be selected (step 515)—either automatically or interactively—from a model library. CM may have an associated simplified fitting model M which may also be selected from the library at the same time. It will be appreciated that while model M may have standard skeleton and layers structure, its contours may hint to the clothing type and which may serve to simplify the user's fitting task. FIG. 26A, to which reference is now briefly made, shows an exemplary simplified fitting model M associated to the skirt combined model CM of FIG. 21A.

Figure 26B:
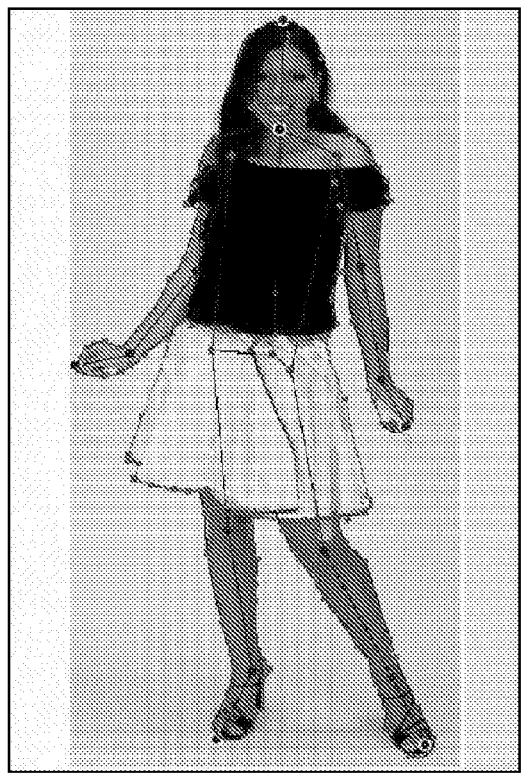
Figure 26C:
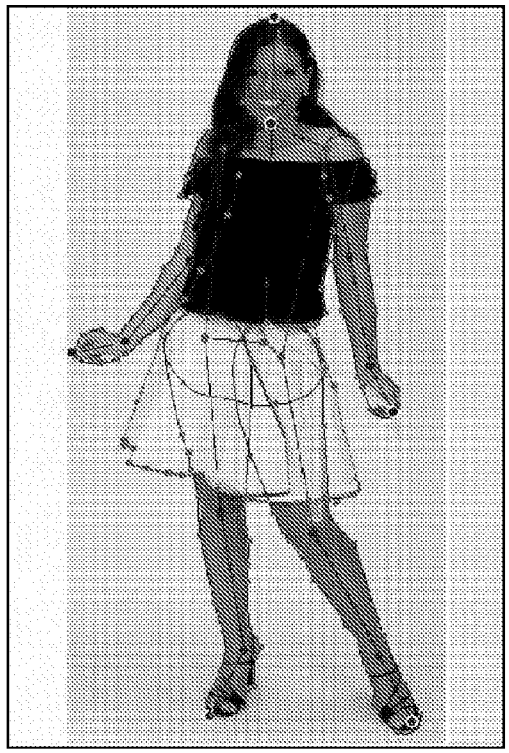

Simple model M may be fitted (step 520) to the visible (clothing) contours according to any of the methods described hereinabove. FIG. 26B, to which reference is now briefly made, shows an exemplary result of step 520. A body model BM (having previously been defined as part of CM) may be automatically inscribed (step 530) into the fitted contours described hereinabove. FIG. 26C, to which reference is now briefly made, shows an exemplary result of step 530.

A complete Combined Clothing model CM may then be automatically positioned (step 540) on the image according to the position of the inscribed body model. This may be achieved without additional processing since the clothing layers of the combined model CM may be subordinated to the body model BM as described hereinabove.

Figure 26D:
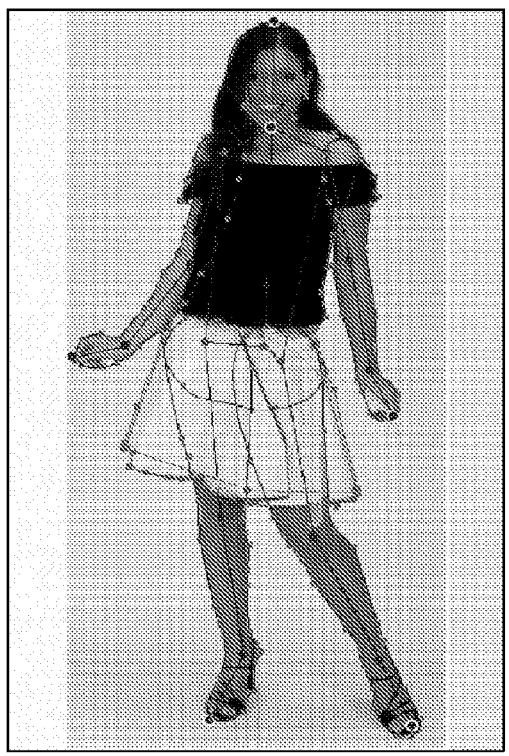

Clothing layers of CM may be automatically fitted (step 550) to the visible contours of the character as described in PCT application IL2008/001205. The initial layers positions for this fitting may be provided by step 540. FIG. 26D, to which reference is now briefly made, shows an exemplary result of the fitting of a skirt layer.

The (visible) clothing texture may be cut (step 560) out from the image by the fitted clothing layers. The occluded texture of the partially and/or completely occluded layers may be completed (step 570) automatically. This step may be discussed in further detail hereinbelow.

It will be appreciated that steps 530-570 may be performed completely automatically. In such an implementation they may be "invisible" to the user. It will similarly be appreciated that the user may also choose to perform and/or correct each of the above steps interactively.

It will also be appreciated that as the Model transformation procedures described hereinabove may be applied to the resulting Combined Clothing model, the clothing layers may be transformed in generally the same manner as the body layers. This may ensure that as the proportions of the character's model may be altered, the clothing may still correctly fit the character's body.

It will be appreciated that completion of the occluded parts may be one of the most demanding parts in the process of transforming a fitting model into a final animation model. The body texture, as well as the texture of the underwear, may be typically almost completely occluded by the exterior parts of the clothing. When only one photo of the character may be available; there may be no perfect solution to this problem. However, in accordance with a preferred embodiment of the present invention, the following completion method may provide a practical solution that may be satisfactory for the uses of a common non sophisticated user.

The occluded texture parts may be filled (step 572) in with a synthetic texture similar to the texture in the areas adjacent to the occluded ones. Several procedures for the creation of synthetic texture are known in the art. For example, a suitable procedure may be disclosed by Andrew Witkin and Michael Kass, in their article: "Reaction-diffusion textures, ACM SIGGRAPH Computer Graphics, v.25 n.4, p. 299-308, July 1991."

Figure 27:
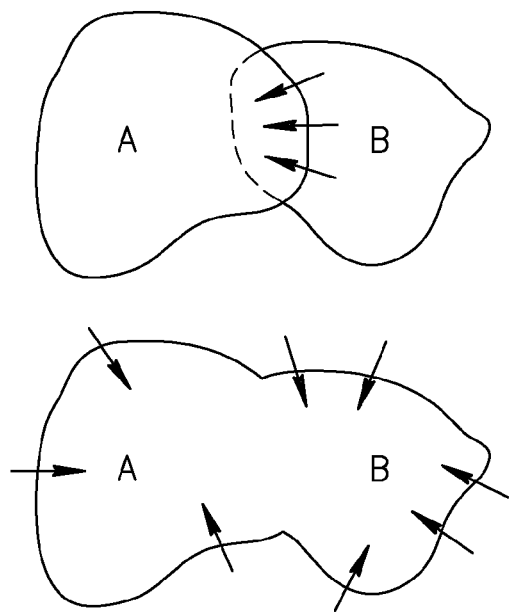

Any suitable procedure may be used in the context of step 572. FIG. 27, to which reference is now made, shows an exemplary image with occluded parts; layer A partially overlaps layer B. The completion of the occluded texture in layer B may be performed as follows: First the texture of the visible part of B may be completed to the part of B overlapped by A. Next both layers A and B may be "cut out" and the texture of the remaining part of the background may be completed to the cut out area. This completion can be applied also using "small motion animation" as described in PCT application IL2008/001205.

Returning to FIG. 25, the newly created texture may be subordinated (step 574) to the contours of the body model (or of the appropriate clothing models). While rather universal, this method may significantly reduce the texture's quality, as all known methods synthetic texture creation may significantly reduce image quality. It may therefore work best in cases where only very small parts of the occluded textures have to be shown in the animation process. The synthetic completion is performed according to the relative layer's depth: the occluded parts of a certain layer are completed only from this layer and the deeper ones.

More than one photo of the character may be used to capture (576) the occluded textures. Accordingly, this step may only be relevant in cases where the user may be expected to provide multiple images photographs in prescribed poses and clothes, in order to improve the animation quality and realism.

"Library textures" may be used to complete (step 578) the occluded texture parts. It will be appreciated that this may not provide the true textures of the character, but relatively similar ones instead. The end result may be high quality animation models which, do not, however, accurately represent the "true picture" of the occluded parts of the character. Accordingly, this method may be appropriate for solving the problem of reconstructing occluded parts in applications where the visual identity of the Animation model with the original is not particularly crucial; for example, in entertainment applications.

It will be appreciated that in order to minimize the differences in textures, the body texture may be selected from a pre-arranged texture library according to its level of correspondence to the not-occluded body parts on the image. This body texture may be stored in the "Texture library" in a form of the texture layers, or as an entire body texture cut out from a certain photo-image. The proportions of these layers (or of an entire body texture) may be adjusted to the corrected Body model as described above. The same approach may be applied to the occluded parts of the underwear models, or to other occluded parts of the animated object. Accordingly, in this approach the combined animation model may be constructed from the upper clothing and non-occluded body parts of the character on the image, and from the body of another character (with properly adjusted proportions) as the replacement for the occluded body texture.

It will be appreciated that in the interests of preserving an overall animation quality, it may be preferable for some details of animated objects and/or characters to appear with a higher resolution than that of the entire object. Such details may be referred to as "High resolutions features" or HRF's. For a human character this may apply, for example, first of all to the face. However, other body parts, such as the palms of the hands, shoes and some other clothing elements may also typically require a higher resolution. It will be appreciated that because of the need to fit generally finer details, accurate model fittings for HRF's may be particularly difficult.

In accordance with a preferred embodiment of the present invention, special "HRF Combined Models" containing high resolution sub-models for the required HRF's may provide high resolution modelization of HRF's without dramatically increasing the complexity of the model fitting. These sub-models may be kinematically subordinated to the main model in generally the same manner as the clothing models in the combined clothing models described hereinabove. The fitting and transformations of HRF combined models may be performed generally as described hereinabove, with the following distinction: the fitting of the HRF sub-models may be performed with a higher resolution than the rest of the character. For example, the fitting of general character model may be performed with the image of a certain specific resolution. The fitting of a component face HRF sub-model may be performed with the appropriate part of the image taken with two or three times finer resolution. It will be appreciated that today's state of art digital cameras may be capable of producing input images with a relatively high degree of resolution which may allows for adaptive processing such as described hereinabove.

It will be appreciated that some HRFs may be absolutely character-specific and must be taken from the input photo; for example, the character's face. On the other hand, some other HRF's may be essentially generic. For example, the palms of the hands, the shoes and many other high resolution clothing elements do not need to be completely individualized for most animation purposes. Accordingly, in such case the corresponding HRF sub-models may be taken, together with their texture, from a "HRF sub-models library" generally as described for the textures library hereinabove.

It will be appreciated that a good proportion of typical album photos may be taken from a close distance, and they may present only the upper part of the character. The same may be true for most of the images of popular characters on the Internet. It may be important, therefore, to extend the applicability of the photo-animation process to photo-characters that are only partially captured by the photo. In accordance with a preferred embodiment of the present invention, two complementary methods may be employed to derive high quality photo-animations starting with such partial photos.

Figure 28:
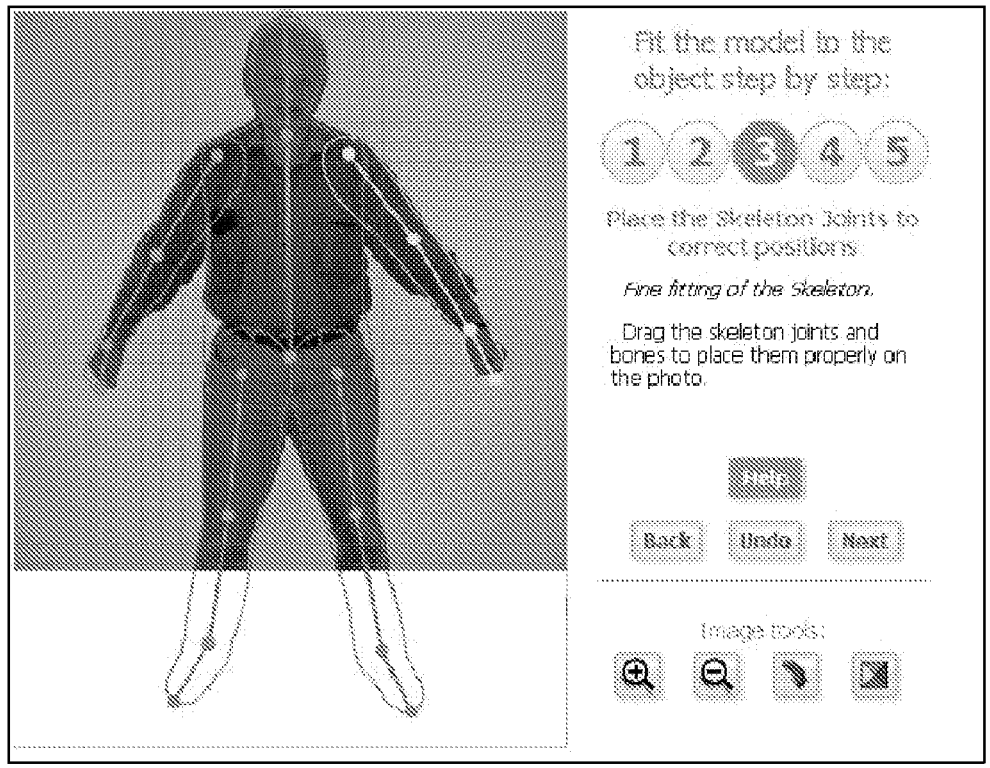

The first method may be to use model-guided texture completion. This approach may entail the user fitting a full fitting model to a partial image in an automatic or interactive way as described hereinabove. Although the contours present on the photo may be fitted accurately, the rest of the model may be kept in a desirable (and anatomically natural) pose. FIG. 28, to which reference is now made, shows an example of such a fitting. It will be appreciated that because of the rigidity of the models, any sufficiently large part of the character's photo may essentially define the entire model's contours uniquely, even if the fitting may not be completely accurate, as in the case of FIG. 28. It will be appreciated there may now be texture (which may or may not be accurate) on the parts of the model which may not be covered by the photo-character. However, the texture may be completed (separately for each layer of the model) generally as described hereinabove.

Figure 29:
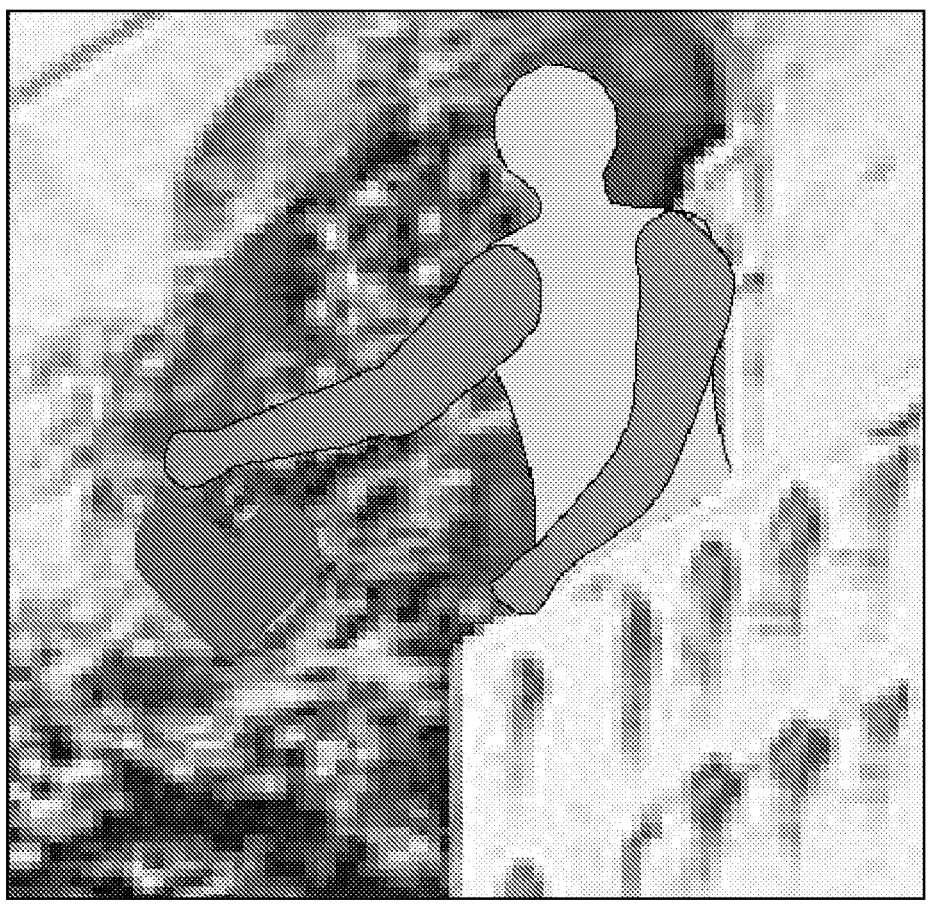

Another method to use partial photo-characters may be to prepare library animations where these characters appear only as seen on the photo. For example, an actor may appear in an animation as partially occluded by some objects or other characters. FIG. 29, to which reference is now made, shows an exemplary frame from such an animation. It will be appreciated that this method may be used instead of, or in addition to the previous method.

2D animation tools, such as Flash, Anime Studio etc., may allow for the production of high quality "cartoon-like" animations. However, as applied to the photo-animation of realistic photo-characters, the lack of 3D motions may severely reduce the quality of the animation. Applicants have realized that 2D tools for skeleton animation may be used to produce high-quality 3D-motion visual effects. It will be appreciated that these effects may be restricted to relatively small 3D transformations, but their application may still dramatically improve the overall quality of the animation.

In accordance with a preferred embodiment of the present invention, M3-models such as those described hereinabove may be used to produce small 3D transformations with 2D tools for skeleton animation. For example, an M3-model corresponding to a fitting model M may be a three-dimensional model whose "visible contours" form the initial 2D model M. It follows that any 3D motion of the M3-model may define a corresponding contour motion of the 2D model M. Furthermore, an M3-model may be defined such that the corresponding contour motions of an associated 2D model M—as derived from the 3D motion of the M3-model—essentially define a skeleton motion for the model M.

Accordingly, high-quality 3D-motion visual effects may be produced with 2D skeleton animation tools by the following process: First, a desired 3D motion of an M3-model may be produced using 3D animation standard tools. In particular, motion data bases, such as that of CMU mentioned hereinabove, may be used at this stage. This motion may then be automatically translated into a skeleton motion (animation) of the 2D model M. The resulting skeleton motion (animation) of M may be applied to a character cut out from a photo by the model M, thus producing the visual effects of the desired 3D motion.

Figure 30A:
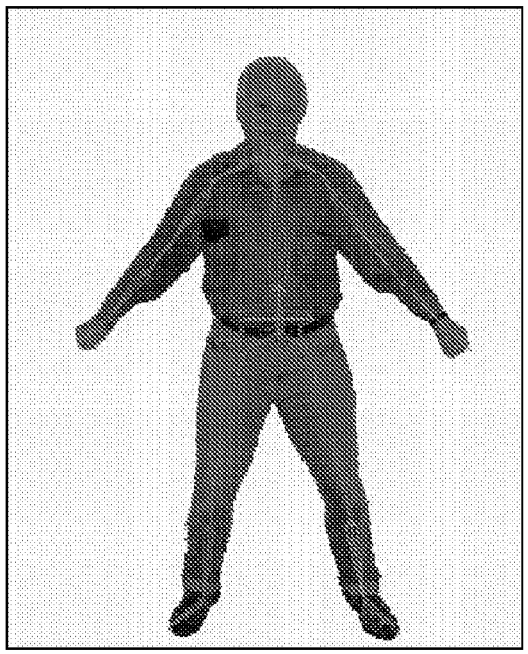
Figure 30B:
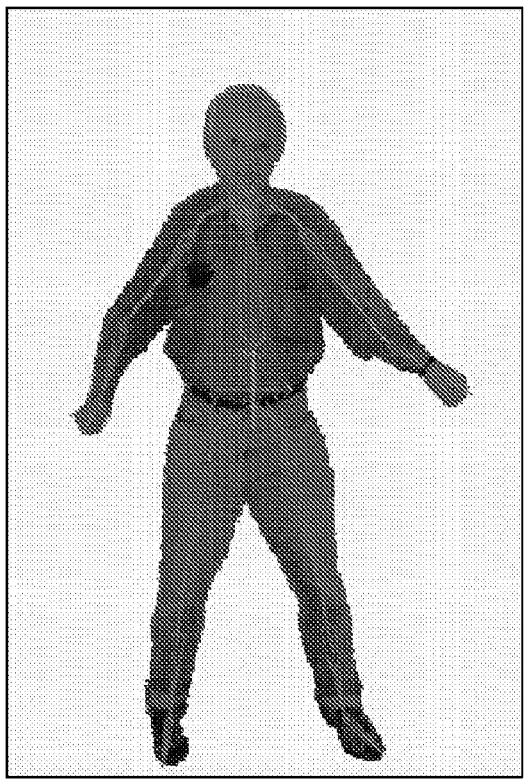
Figure 31A:
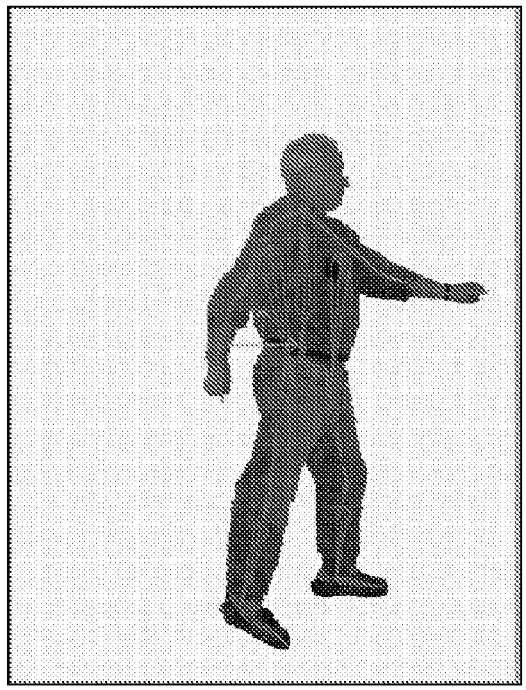
Figure 31B:
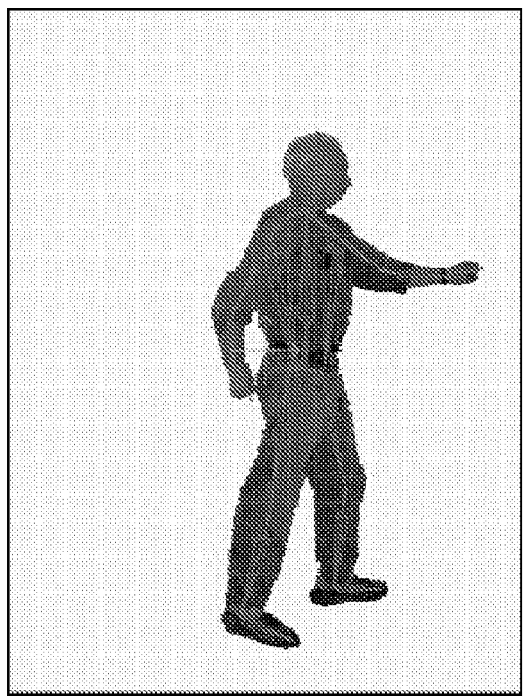
Figure 32A:
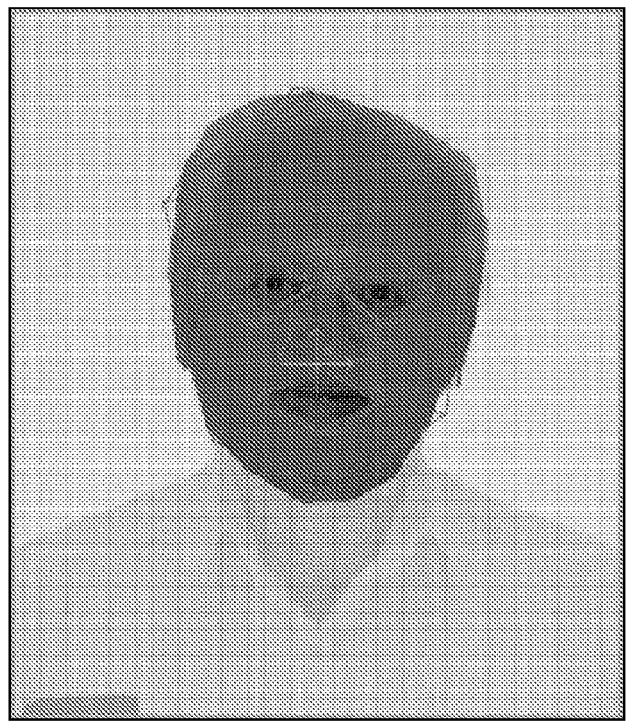
Figure 32B:
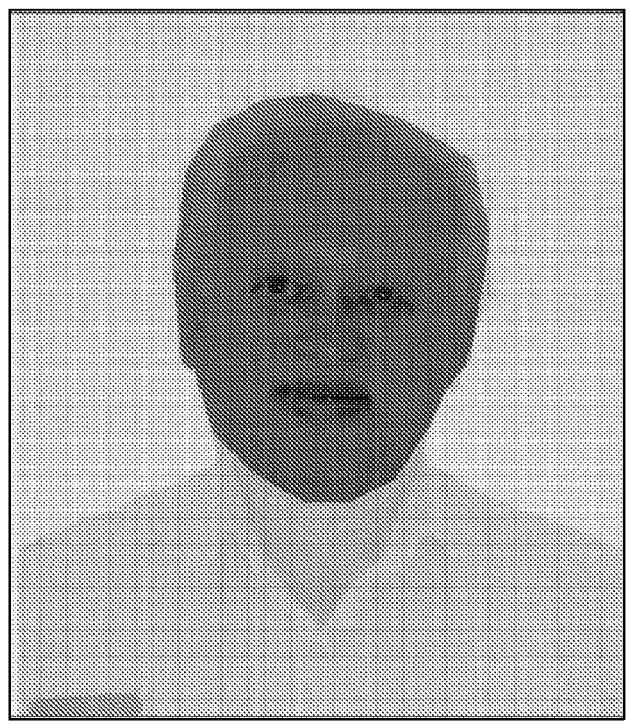
Figure 32C:
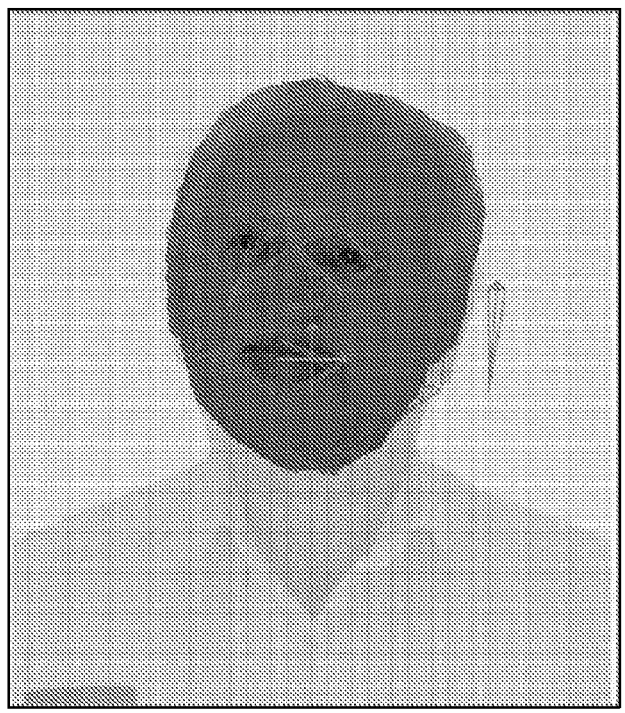
Figure 32D:
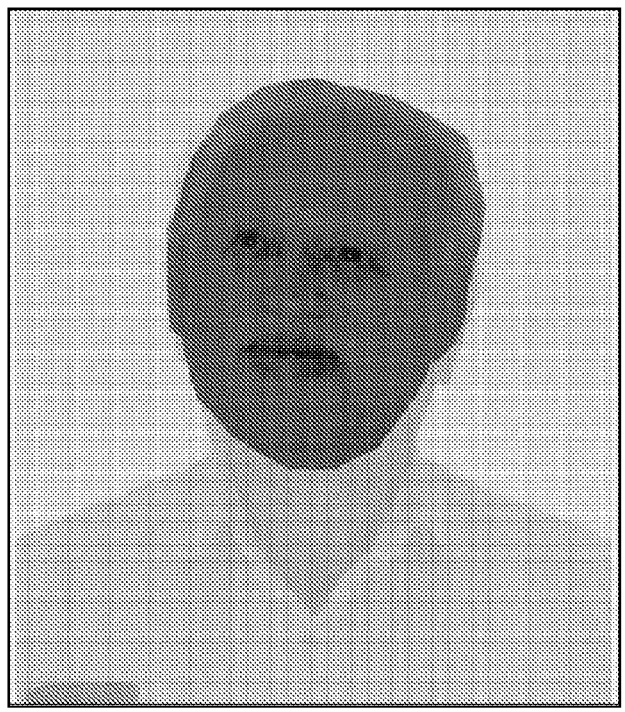
Figure 32E:
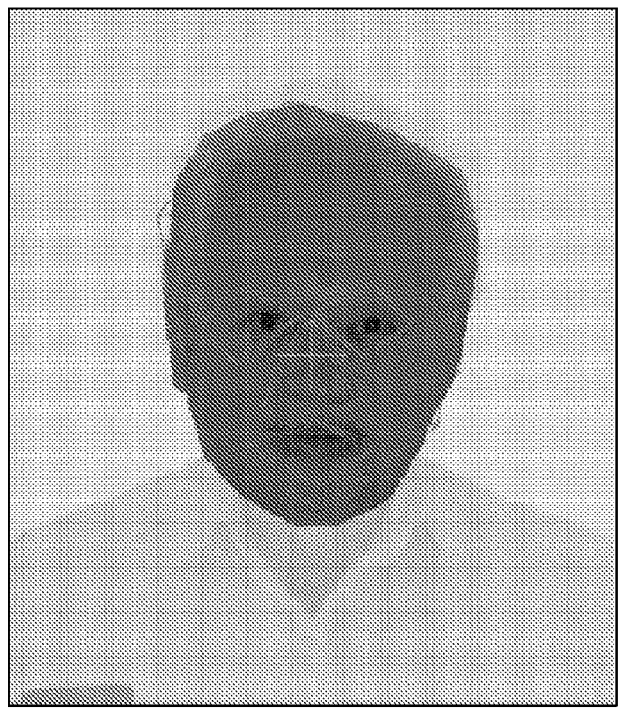
Figure 32F:
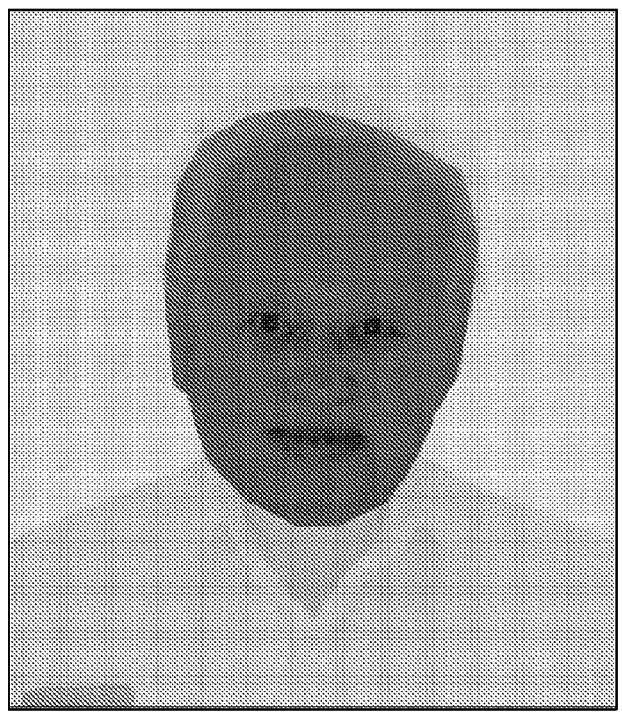

Reference is now made to FIGS. 30-32 which illustrate exemplary inputs and outputs from the described process. FIGS. 30A and 30B together illustrate a "turning effect" produced on an enface character by an enface model M. FIGS. 31A and 31B together illustrate a "turning effect" produced on a profile character by a profile model M. FIG. 32A shows an exemplary model FM of a human face with its skeleton. FIG. 32B represents a rendering of this model (without any skeleton motion). FIGS. 32C-32F, represent examples of how the "turning effect" from FIGS. 30 and 31 may be reproduced on a face of a photo-character by applying the appropriate skeleton motion from the face model FM.

In accordance with an alternate embodiment of the present invention, an animator may produce the 3D effects as described hereinabove "manually". The animator may use a few "prototype" 3D skeleton animation patterns produced as described hereinabove, in order to directly construct the required skeleton motions, thus producing the desired visual 3D effects. The resulting skeleton animations may be then used as "animation scripts". It will, however, be appreciated that it may be preferable to use M3 models as described hereinabove, at least initially.

Figure 33A:
Figure 33B:
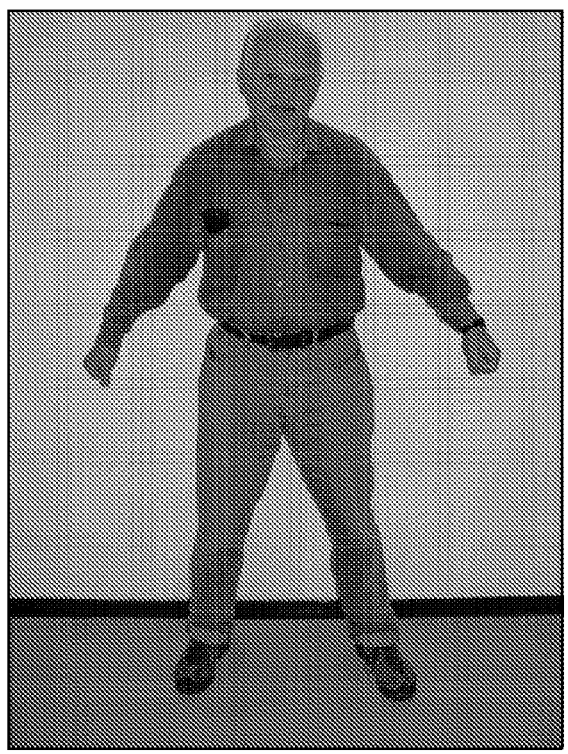
Figure 33C:
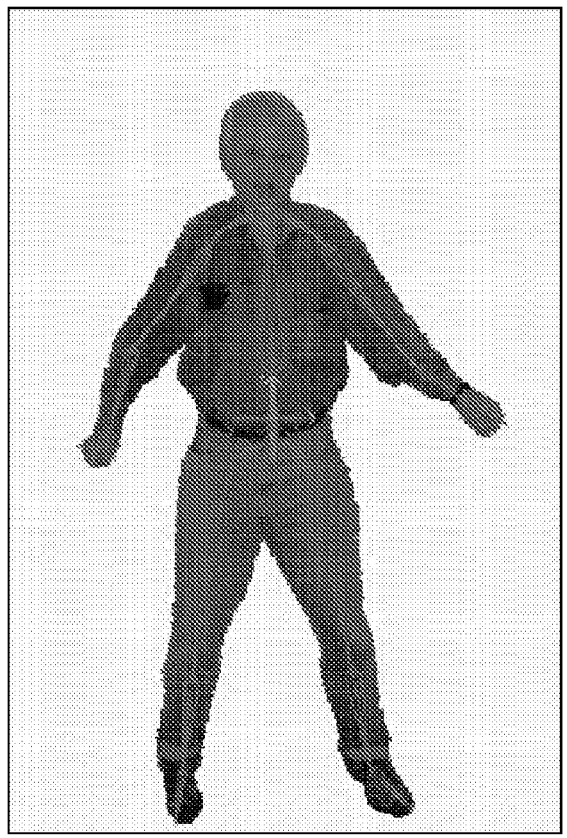
Figure 33D:
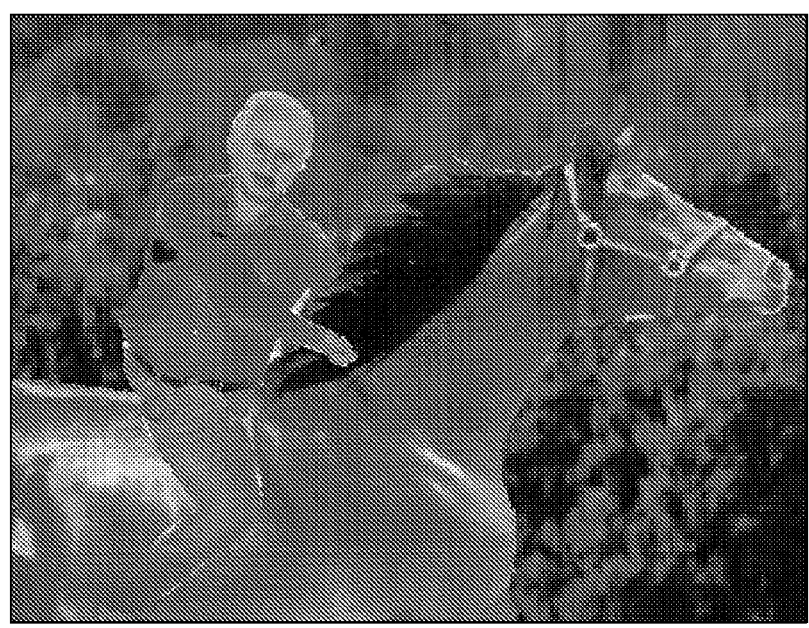

It will be appreciated that by using 2D skeleton animation to produce certain 3D effects the range of photographs that may be used as input for the photo-animation process may be significantly extended. As discussed hereinabove, in many cases it may be difficult to find an image of a desired character in a position exactly fitting the requirements of a certain specific animation. 2D skeleton animation may be used to adjust the position of the character as required for the animation. Reference is now made to FIGS. 33A and 33B which respectively represent a character in a desired pose and the same character in a different pose. For example, the animation scenario may require the actor to be represented in profile as FIG. 33A, while the only available image of the character may show the actor enface (FIG. 33B). In accordance with a preferred embodiment of the present invention, enface model M may be fitted to the photo-character. The character may be "turned" as described hereinabove. FIG. 33C, to which reference is now made, may illustrate an exemplary result of the character of FIG. 33B "turned" to generally match the pose of the character in FIG. 33A. As shown in FIG. 33D, to which reference is now made, the turned actor may be used in the desired animation.

Applicants have realized that the same process may be adapted to enable the reproduction of "secondary" (or "small") motions with 2D skeleton animation tools. Such motions may include, for example, face mimics, body gestures, respiration, etc. Most of them are basically three-dimensional in nature, and they may typically be reproduced using "high-end" 3D animation tools. It will therefore be appreciated that it may be generally considered difficult to reproduce such motions with the tools of 2D skeleton animation.

Accordingly, secondary motions may be reproduced with 2D skeleton animation tools by the following process: First, a desired "secondary motion" of an M3-model is produced by standard 3D animation tools. This motion may be automatically translated into a skeleton motion (animation) of the 2D model M. The resulting skeleton motion (animation) of M may then be applied to the character cut out from a photo by the model M, in order to produce the visual effect of its desired "secondary motion".

Figure 34A:
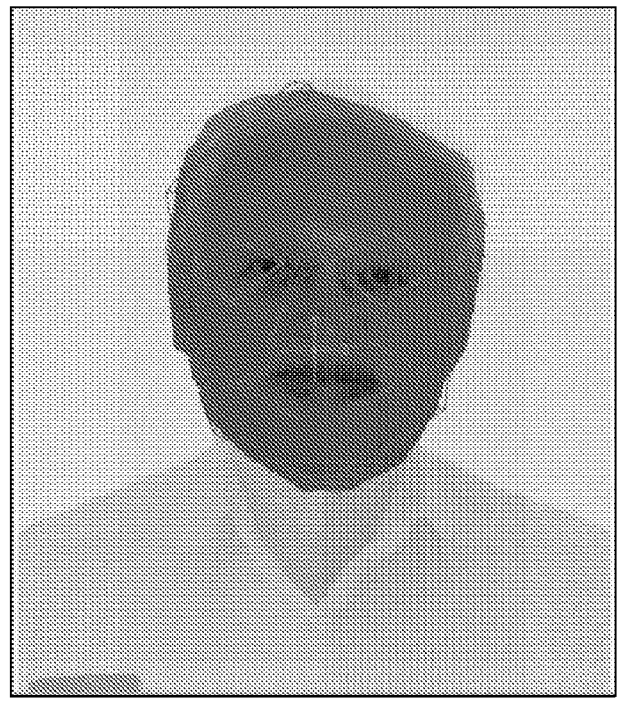
Figure 34B:
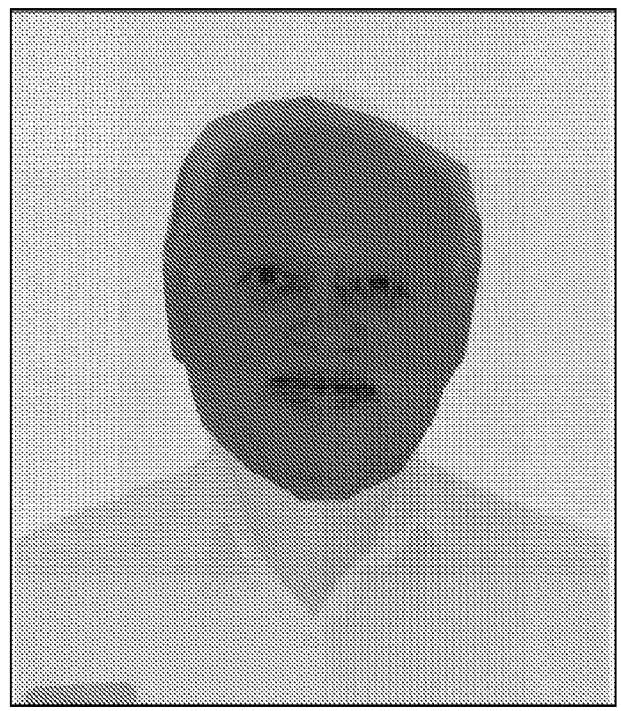
Figure 35A:
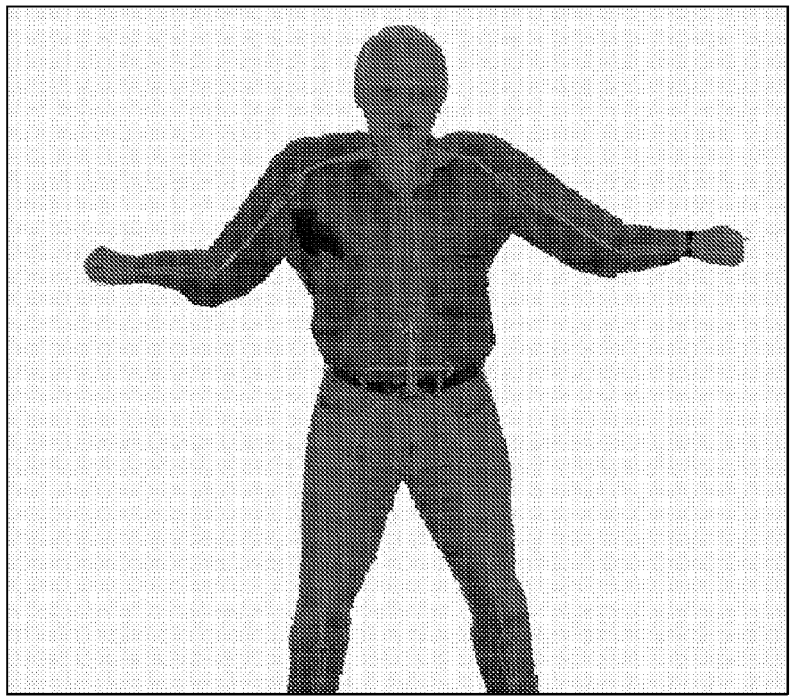
Figure 35B:
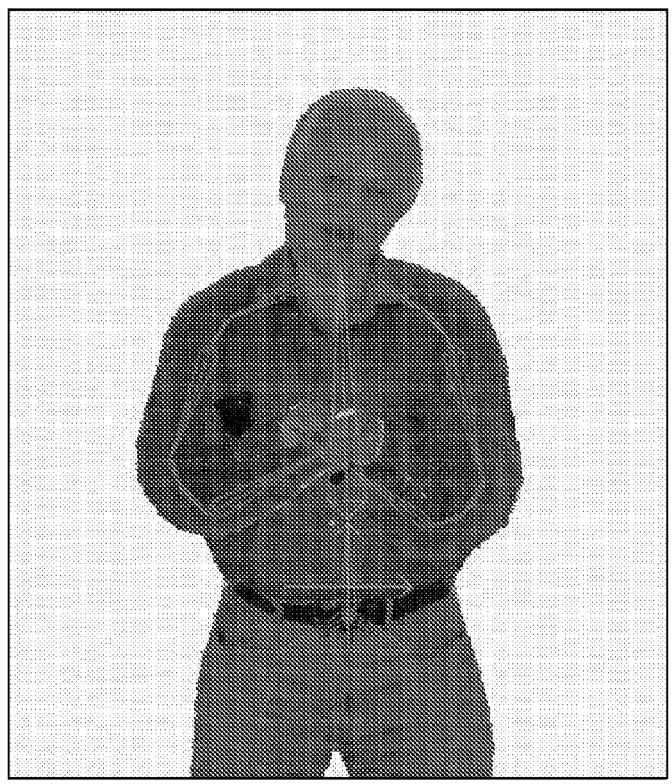

FIGS. 34 and 35, to which reference is now made, show exemplary results of this process. FIGS. 34A and 34B together illustrate a "mimics effect" produced on a face of a photo-character by an appropriate motion of the skeleton of the face model FM. FIGS. 35A and 35B together illustrate "body gestures" produced on an enface character by an enface model M.

Figure 36:
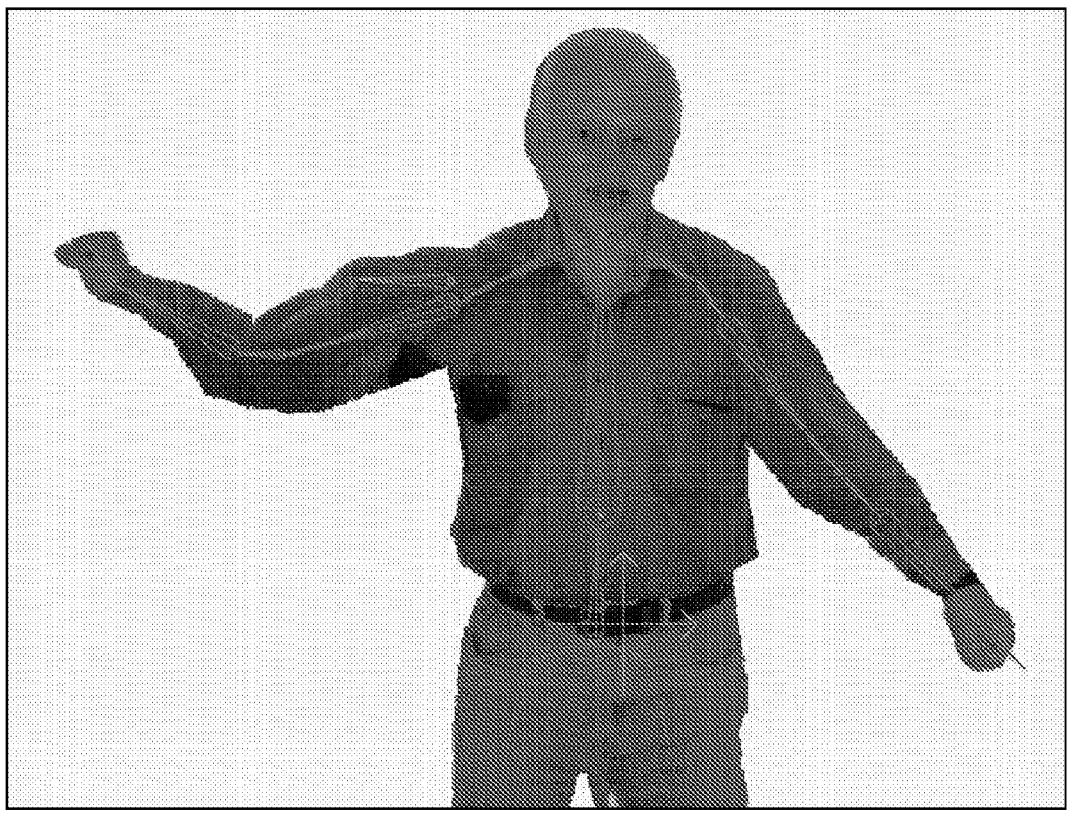

Applicants have realized that in order to reproduce some "secondary motions", such as respiration or muscles animation, additional bones may be introduced into the model skeleton. FIG. 36, to which reference is now made, shows an enface animation model equipped with added "muscles bones" along with a sample result of muscles animation.

In accordance with an alternate embodiment of the present invention, an animator may produce the secondary motion effects as described hereinabove "manually". The animator may use a few "prototype" "secondary motion" skeleton animation patterns produced as described hereinabove, in order to directly construct the required skeleton motions, thus producing the desired visual effects. The resulting skeleton animations may be then used as "animation scripts". It will, however, be appreciated that it may be preferable to use M3 models as described hereinabove, at least initially.

An important step in working with photo-animation tools may be the choice of a correct fitting model to be fitted to the image object or character. It will be appreciated that the chosen model must generally correspond to the character to be fitted. But it also must correspond to the intended animation. This last requirement may be difficult for a user to satisfy since it may usually be of a technical nature: it may concern the kinematical structure of the model's skeleton and layers, and accordingly may not be known to the user. Moreover, it may be desirable not to force the user to deal with this technical information.

Figure 37:
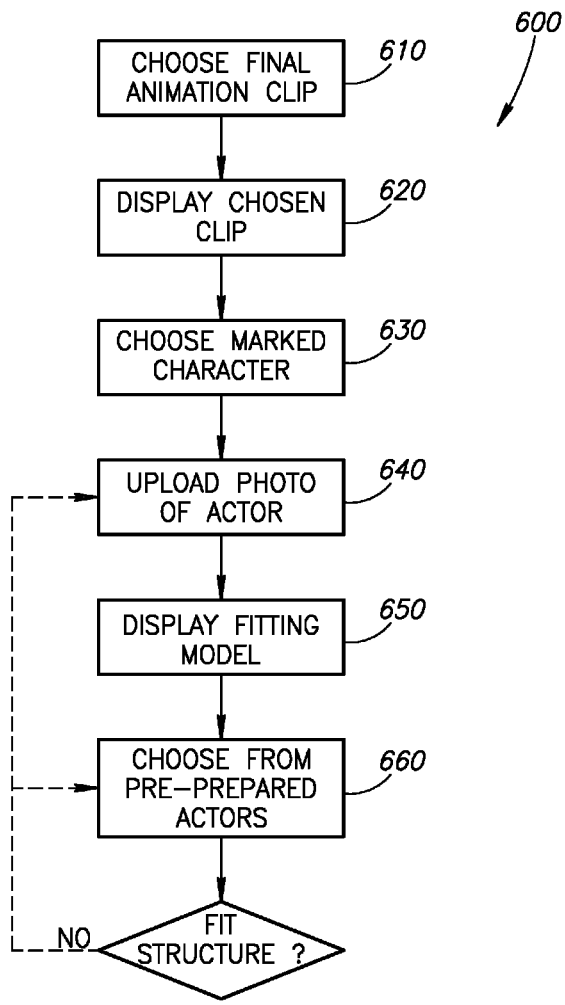

In accordance with a preferred embodiment of the present invention, the user may not have to choose a model, per se. Instead, the user's choices may be presented in a step-by-step process designed to guide in such manner that minimal technical knowledge may be required to make the selection. FIG. 37, to which reference is now made, illustrates a novel process 600 for user fitting model selection.

Figure 38A:
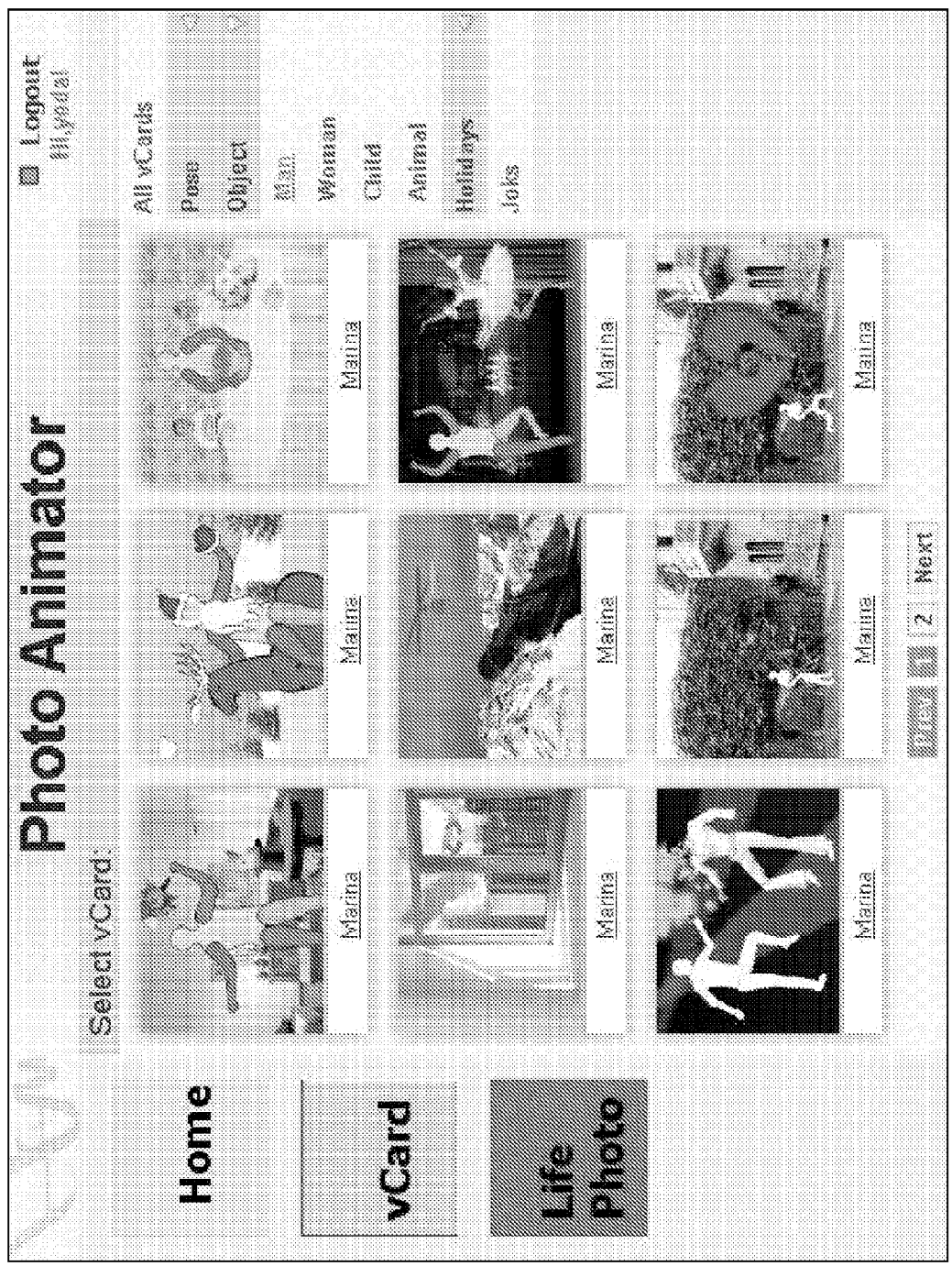

The user may choose (step 610) the final animation clip (greeting video-card, game, comics, "moving photo", etc.) that he wants to produce. A relatively few basic frames may be shown to the user for this initial choice. FIG. 38A, to which reference is now briefly made, illustrates an exemplary clip as shown to the user.

Figure 38B:
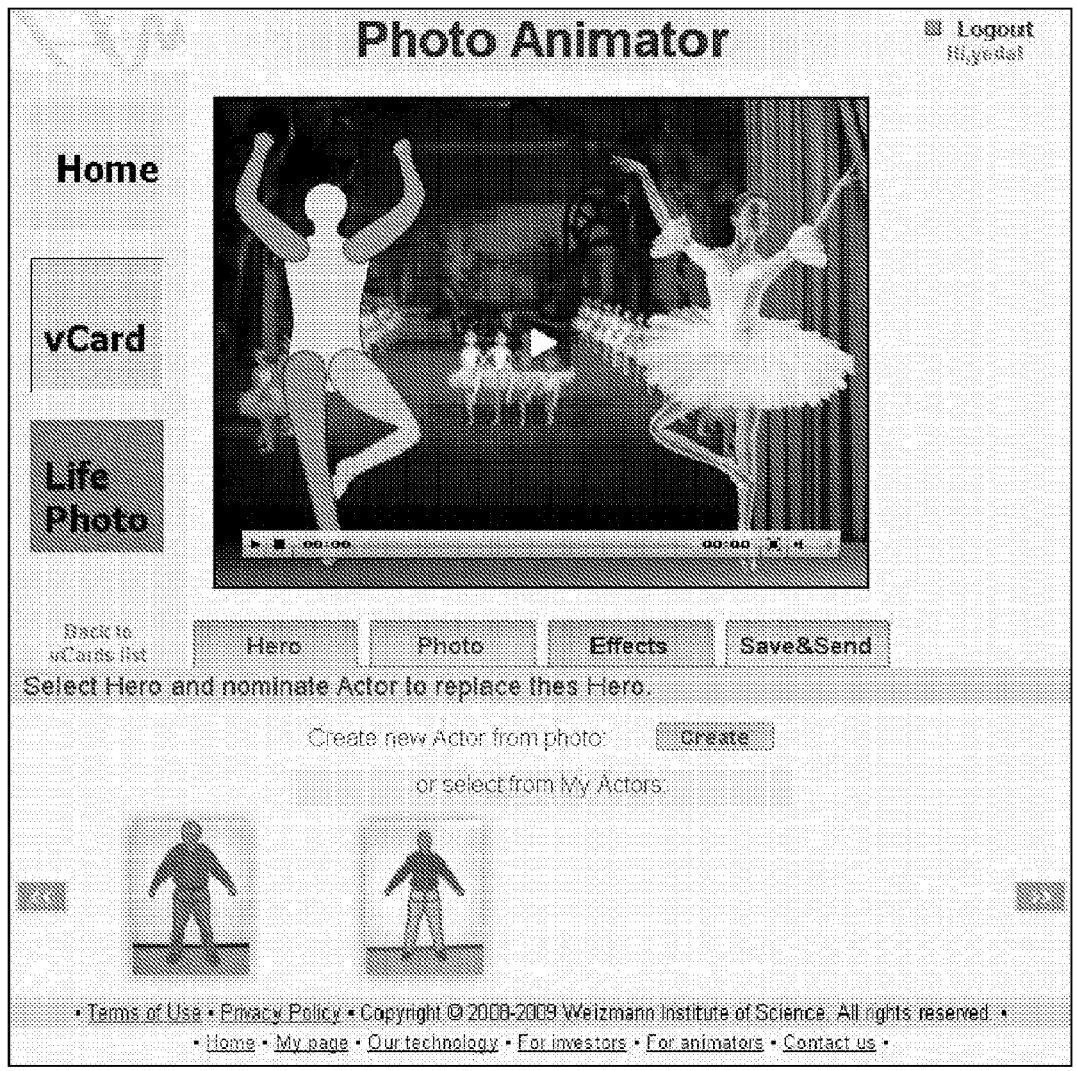

The chosen animation clip may be displayed (step 620) to the user in more detail. In particular, the characters that may be replaced by the user's customized actors may be stressed at this time. The user may choose (step 630) one of these marked characters. FIG. 38B, to which reference is now briefly made, illustrates an exemplary selection of a marked character.

Figure 38C:
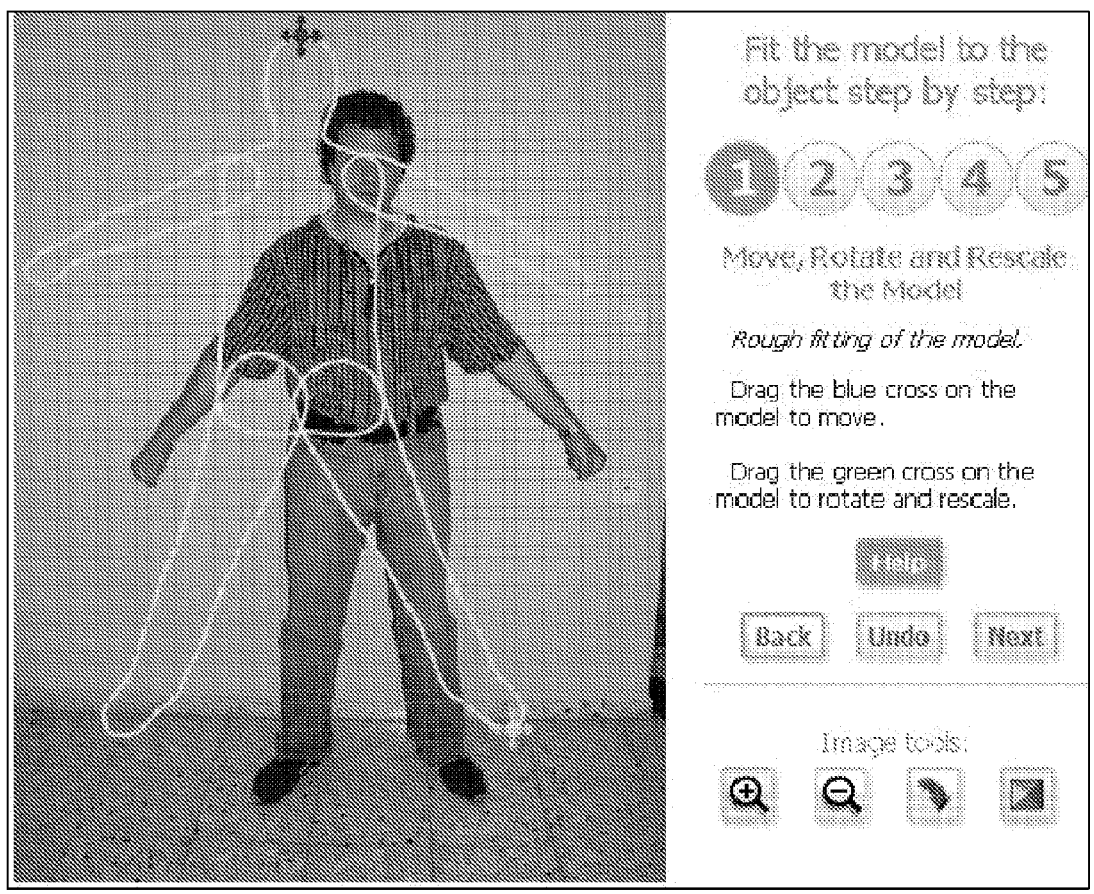

The user may upload (step 640) a photo of the intended actor. The fitting model corresponding to the role performed by the chosen clip's character may then be displayed (step 650) for fitting. FIG. 38C, to which reference is now briefly made, illustrates the display of an exemplary fitting model that may be associated with the character chosen in step 630.

Figure 38D:
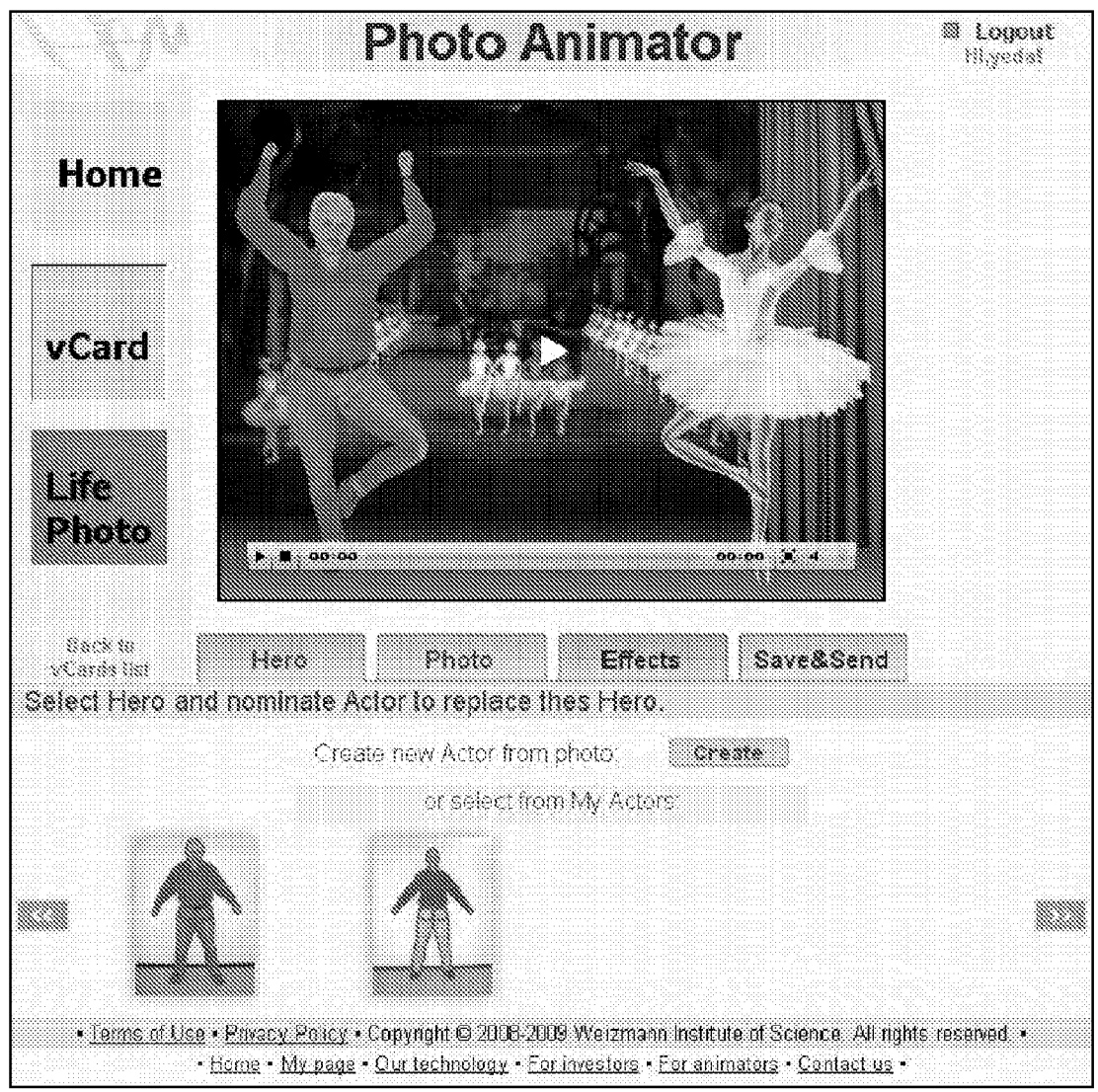
Figure 39:
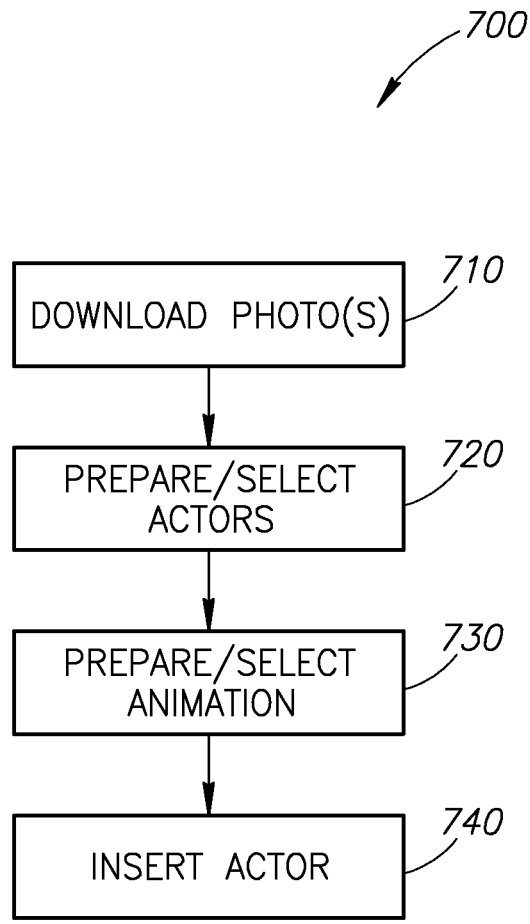

Alternatively, the user may choose (step 660) from among a list of pre-prepared actors and upload it into the animation, just by pressing a corresponding icon. FIG. 38D, to which reference is now briefly made, illustrates an exemplary result of pressing such an icon.

If the uploaded photo may not fit (step 670) the model's structure, the user may upload (steps 640 or 660) another photo. In accordance with an alternative embodiment, the fitting model may be shown to the user before step 640, in order to help the user to choose an appropriate photo-character for the chosen role.

There may be various ways to create personalized virtual actors (avatars) known in the art. However, avatars that may be relatively easily created from a photo may typically include only the face of the photo-character. In accordance with a preferred embodiment of the present invention, a virtual actor may be generated which may be entirely personalized, including its face, body and clothing. Accordingly, it may now be possible to produce new type of animation clips, which contain and stress, in particular, the following features: articulated body motions (dance, sport exercises, etc), control and modification of body proportions, realistic representation of clothing, realistically dressing, undressing, and redressing the actors, and representing "secondary body motions" (body gestures, respiration, muscles motion, etc.).

It will be appreciated that these new options may allow an animator to express stronger and more sophisticated relationships between the virtual actors and to ultimately make animations more expressive, emotional, and attractive.

It has recently become very popular to put a user's photo (or series of photos) into an artificial environment. In particular, sites like "Slide.com" and "PicJoke.com" allow the user to put his photo onto a TV screen, onto a building's wall, or into the hands of a popular person, as shown on pre-prepared images. Some simple animated artifacts (a flying butterfly, etc.) can be added to the photo. Alternatively, a still human character (a "paparazzi", for instance) can be added to the photo.

In accordance with a preferred embodiment of the present invention, "Slide Show" functionality may be provided to significantly extend these prior art applications. In particular, complicated animated characters (human, pets, etc.) may be inserted to the photo. FIG. 38, to which reference is now made, illustrates a process 700 for this functionality.

A photo (or several photos) may be downloaded (step 610) by the user. An "actor" (or "actors") may be prepared or selected (step 620) from a library, as described hereinabove. This may be, for example, based on the user's actual or preferred image, a popular person, etc. An animation of this actor (actors) is prepared or selected step 630) from the library. The user may interactively insert (step 640) the actor together with the animation into the downloaded photo (photos). This may be accomplished via simple interfaces, as described hereinbelow.

The "insertion interface" may depend on the actor and the animation, but it may typically require the user to just mark several points on the image. For example, the human actor may be inserted, together with its animation consisting of walking and knocking the shoulders of the characters on the photo. The interface may present a symbolic representation of the actor and his/her trajectory placed on the photo. The user may just position the trajectory points and mark the shoulders to be knocked.

In another example the user may choose several actors sitting in a boat. The animation may consist of a motion of the boat (for example, rowing). So the interface as described herein above may just require the user to mark the initial and the final position of the boat on the water surface of the photo, and to choose the size of the boat. In yet another example the inserted actor may just join the group shown on the photo, and a "paparazzi" (also inserted) makes a "photo inside photo".

It will be appreciated that the "Live Photo" (animation of large images) method, as described in the PCT application IL2008/001205 may be combined with the animation method as described hereinabove. Using the "live Photo" method the user may animate some of the characters and objects on the photo. These characters may interact with the actors inserted as above. In particular, the inserted actor may shake hands with the characters on the photo.

It will be appreciated that these methods may also be applied to a sequence of photos, thus creating a "slide show". The inserted actors or objects may move from one photo to another, interacting in various ways with the characters and objects on the photos.

It will be appreciated that even when virtual actors, virtual environment, and fairly easy control tools may be available, animation may remain a highly nontrivial creative task. A non-professional user may typically be incapable of producing anything beyond short isolated actor motions. Furthermore, the typical animation tools, such as, for example, time-line, key frames and motion interpolation require significant training of the user, as well as an understanding of the time structure of animations. Accordingly, the average Internet user cannot be expected to produce more than the most rudimentary animations.

Figure 40:
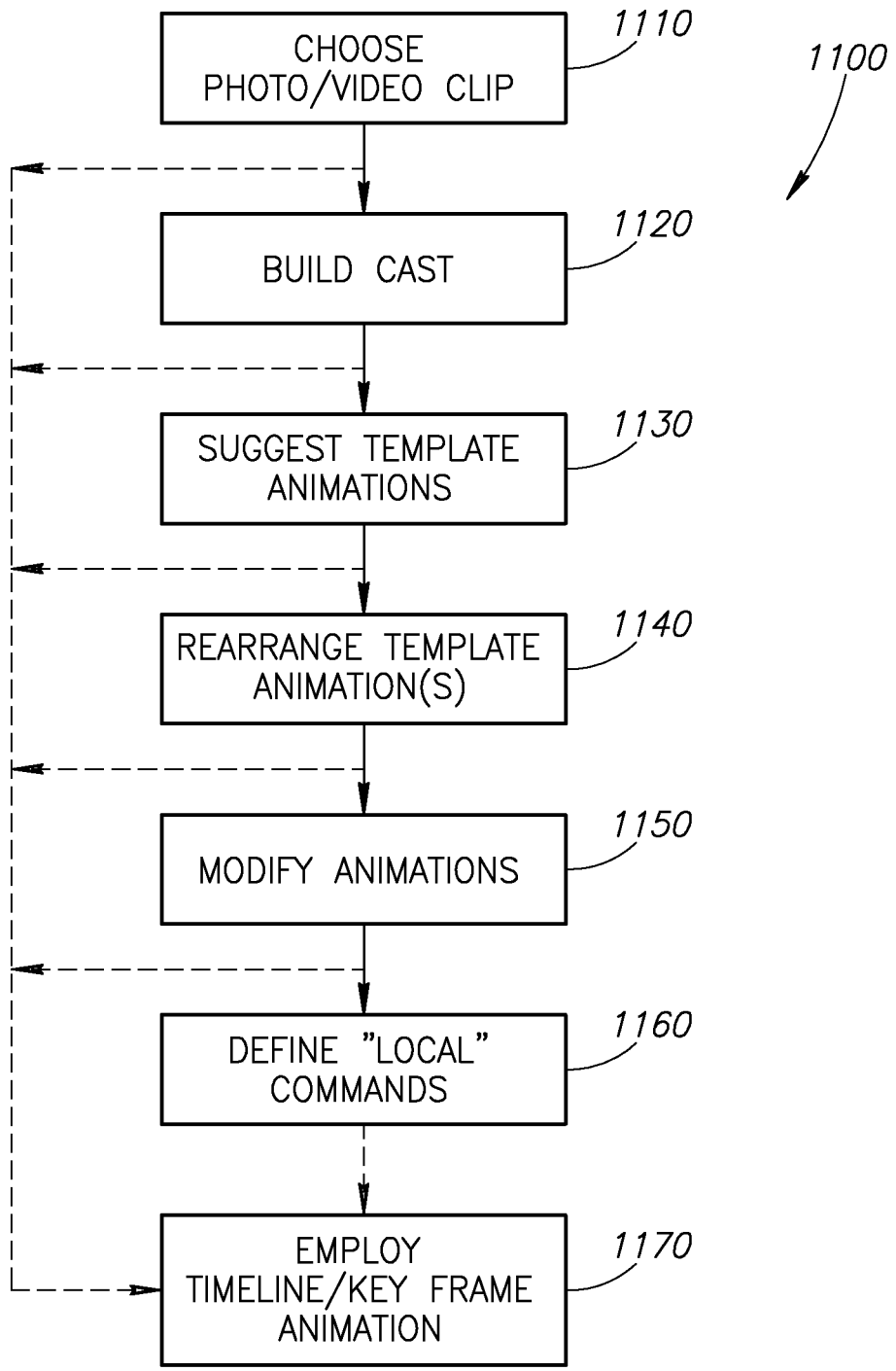

In accordance with a preferred embodiment of the present invention, an animator utility may be provided to employ a menu-based approach to enable an unsophisticated user produce quality animations. In such an approach the user may not need time-line and/or key frames animation tools. Instead, the user selects from among various options for the action development and\or gives the actors "verbal" commands (as will be described hereinbelow). The time in such a menu-based animation may be determined by the sequence of actions selected and their duration. FIG. 40, to which reference is now made, illustrates an exemplary novel menu-based animation process 1100 for non-sophisticated users to use the animator utility to produce quality animations.

The process may begin with a menu option for a user to choose (step 1110) the main photo or video-clip for the base environment of the animation to be produced. It will be appreciated that, if necessary, this environment may be changed in the course of animation.

The user may then use a menu option to build (step 1120) the "cast". The cast may include "actors", cut out from the main photo (or from another photo or clip) as described hereinabove. If automatic model fitting and cutout may be used, the user may just indicate the model types and the place on the main photo where the model(s) may be fitted. "Hand", "leg", and "head" actors may be particularly suited for this task (their cut-out is especially simple).

Figure 41:
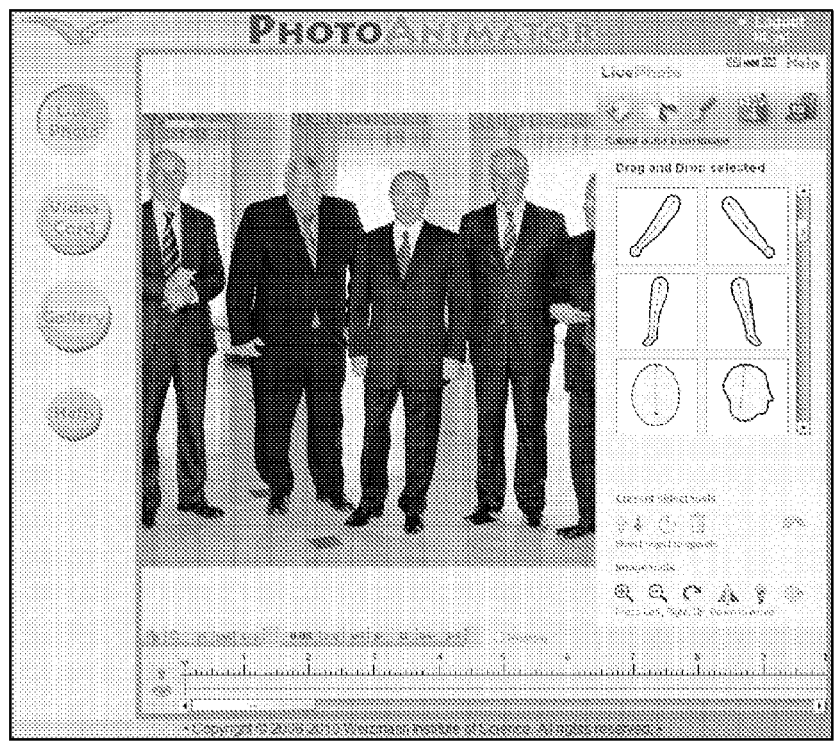

Reference is now made to FIG. 41 which depicts an exemplary photo to be processed along with its corresponding models (on the right panel). Some actors may be added from a pre-prepared library. The library may include, for example, still images, simple animations, video-clips, as well as photo-realistic actors and their combinations that may be built as described hereinabove. If necessary, the cast may also be changed in the course of animation.

Once the cast has been fixed, the animator utility may suggest (step 1130) a library of possible template animations which may be "played" with the selected cast. These template animations may have been prepared in advance for a set of possible "casts types" of a reasonable size, built as described hereinabove. Cast type may be defined by the models used in the cast, as well as by the types of the other library objects used. Accordingly, each of the animations may be played immediately upon selection by the user.

Figure 42A:
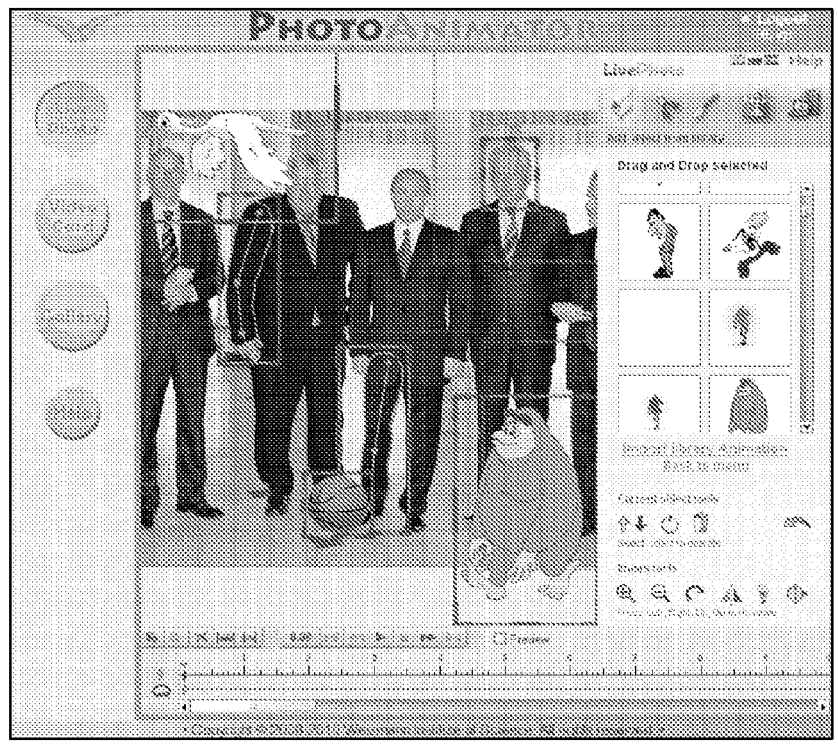

Reference is now made to FIG. 42A, which illustrates an exemplary cast selected by a user for the image presented on FIG. 41. The cast types may consist of a hand, a leg, a head, a ball, an animated bird, and an animated cartoon actor (a "cartoon"). It will be appreciated that the positions of the actors cut out from the main photo, and their size and proportions may depend on the main photo, and can therefore not be known in advance. Accordingly, the animator utility may enable the user to automatically rearrange (step 1140) the pre-prepared template animations for each given cast type for the actual positions of the cut out actors, and their size and proportions. The method used for this rearrangement may be described hereinbelow.

Figure 42B:
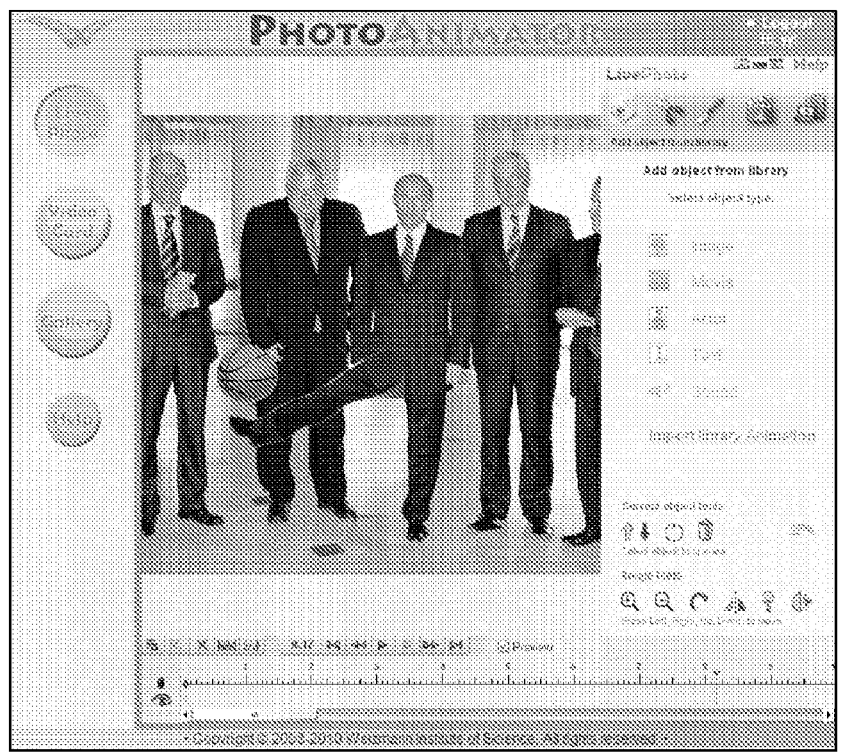
Figure 42C:
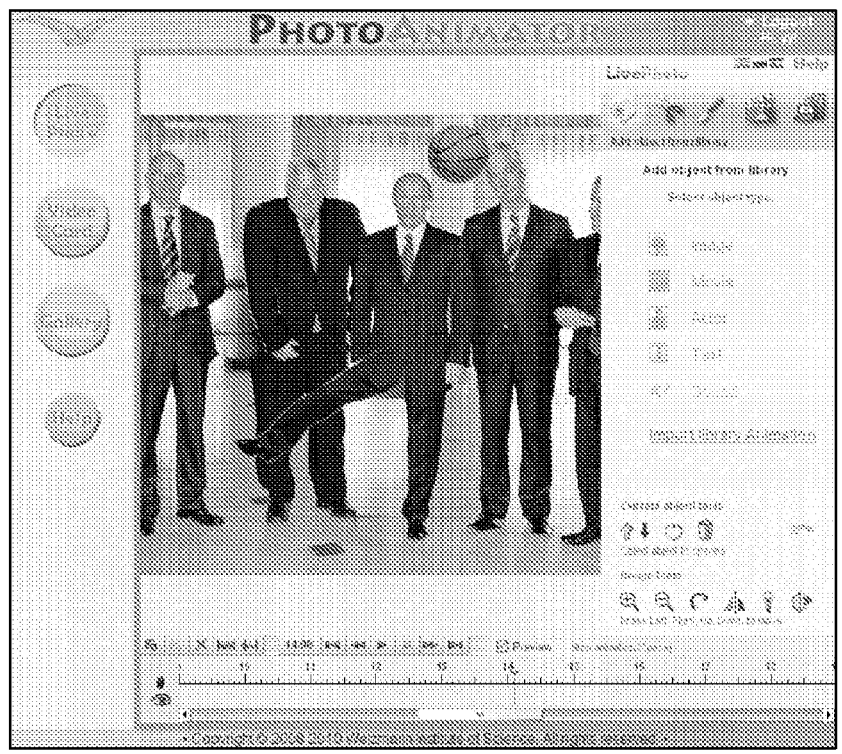
Figure 42D:
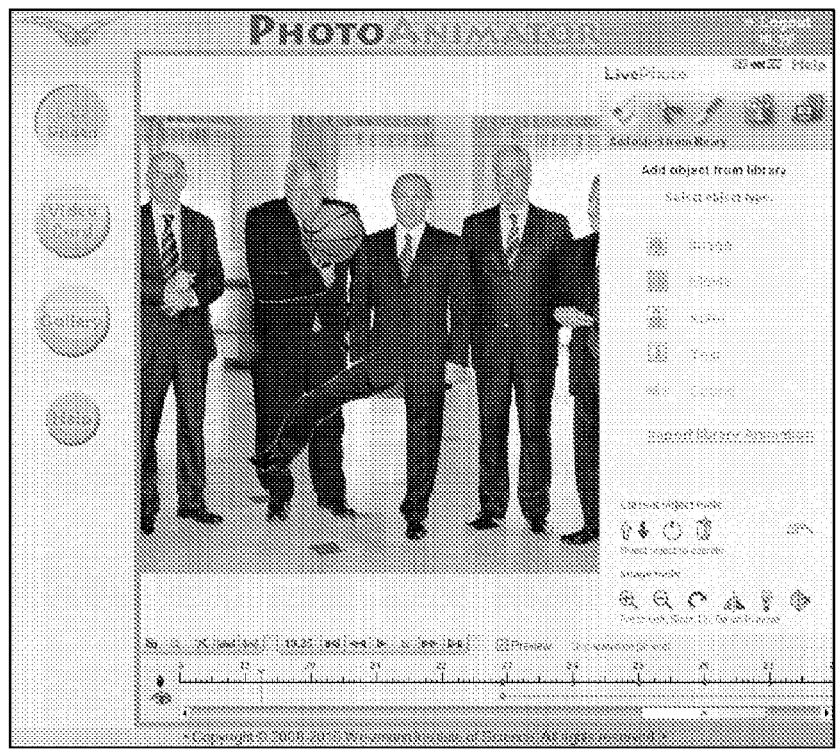
Figure 42E:
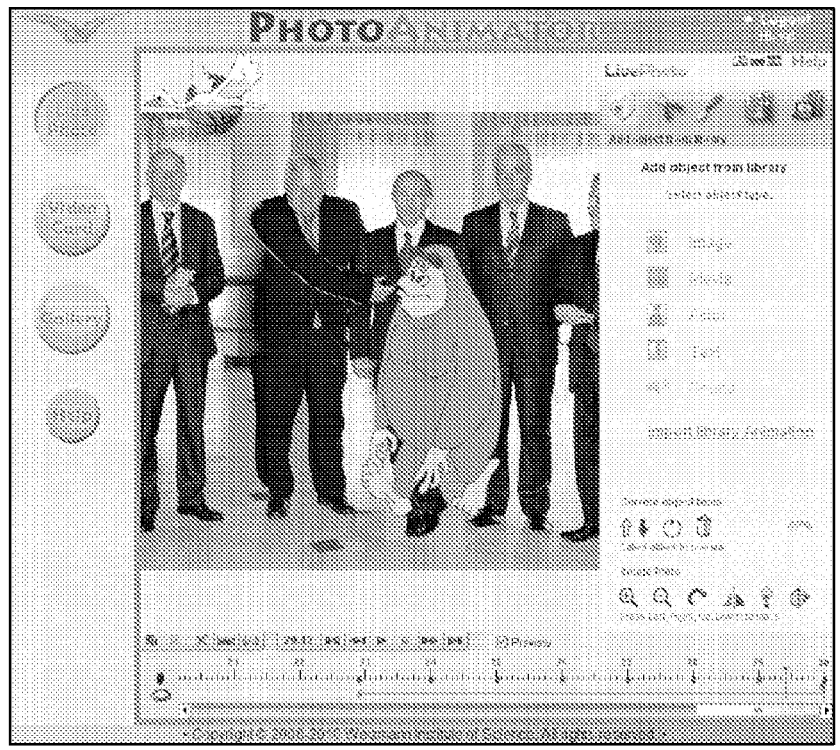

Reference is now made to FIGS. 42B-41E, which illustrate a few images from an exemplary animation generated for the image of FIG. 41. It will be appreciated that using the template animations may provide a high quality which cannot be achieved by an average user. For example, for the cast as above, consisting of one hand, one leg, one head, a ball, an animated bird, and a "star", the animation may present a ball playing, with the ball flying from the moving hand (of one person) to the moving leg (of the second person) to the moving head (of the third person), while the bird may fly across the scene. Next the "cartoon" may enter the scene, and may approach the hand of the first person. It may be accompanied by an appropriate music and other sound effects, etc. In such manner, the user may expend minimal effort while generating a large variety of high quality professional level animations with his cast and in his environment.

The user may modify (step 1150) animations via a menu option that may provide possible alteration choices. For example, if the animation contains an inserted Video Card (as may be described hereinbelow) the user may select another Video Card instead of the current one. The user may also request that the animation run faster or slower, the actors to move sharper or smoother, etc. The method for easy menu-based alteration of the existing animations may be described in detail hereinbelow.

The user may also define (step 1160) "local" commands at any point of the generated animation, as long as such commands do not interfere with the general action scenario. Examples of such commands may include, for example, "raise the right hand", "touch with the right hand the head of the second actor", etc.

It will be appreciated that the animator utility may be used in parallel with existing prior art tools. Accordingly, at all stages of process 1100, users who wish to have full control of the actors and animation can employ (1170) tools such as the time-line and key-frame animation.

It will be appreciated that the menu based animator utility may be of particular benefit when implemented for applications on cellular phones and other wireless devices, where interactive possibilities are strongly limited by the size of the screen and of the control panel. It may also be particularly important in the context of "multiplayer animation games" as described hereinbelow. There may be a need for fast and simple controls in such an application to enable each participant to control the actor's motion, as well as to form the animation episodes and scenario.

In accordance with an alternative preferred embodiment, after the cast may be fixed in step 1120, the user may generate his/her own animation, by producing a sequence of the "episodes", as follows: for each episode the user may select some of the cast actors which participate in the episode. Then the utility may suggest to the user a library of possible template animations which can be "played" with the chosen actors. This may be performed in generally the same manner as in step 1130. The user may choose one of these template animations to form a current episode, and then move on to the next episode. A smooth aggregation of the subsequent episodes may require a certain adjustment of the actors: indeed, at the end of a certain episode the actor may be in a position and motion which do not agree with the position and motion of the same actor in the beginning of the next episode. This adjustment may be performed automatically using a method described hereinbelow. As in the previous embodiment, at each step the user may request that the animation run faster or slower, the actors to move sharper or smoother, etc.

Motion data-bases, such as that of CMU mentioned hereinabove, may provide an important source of photo-realistic actor motions. However, direct application of such animations to models fitted to photo-characters may produce quality problems as discussed hereinabove since the anatomic proportions depicted in the data bases are mainly generic, while the initial poses may be quite arbitrary. Therefore the poses and proportions of the actors in a motion database almost certainly differ from that of a target photo-character. Another problem is that the motion in such data bases is usually given as a 3D animation of a 3D skeleton, and it is not restricted to "small 3D motions", but involves 3D body bending, free rotations and other "global 3D motions". To apply this motion to the target photo-character, it may be necessary to transform the motion into 2D animation formats.

Figure 43:
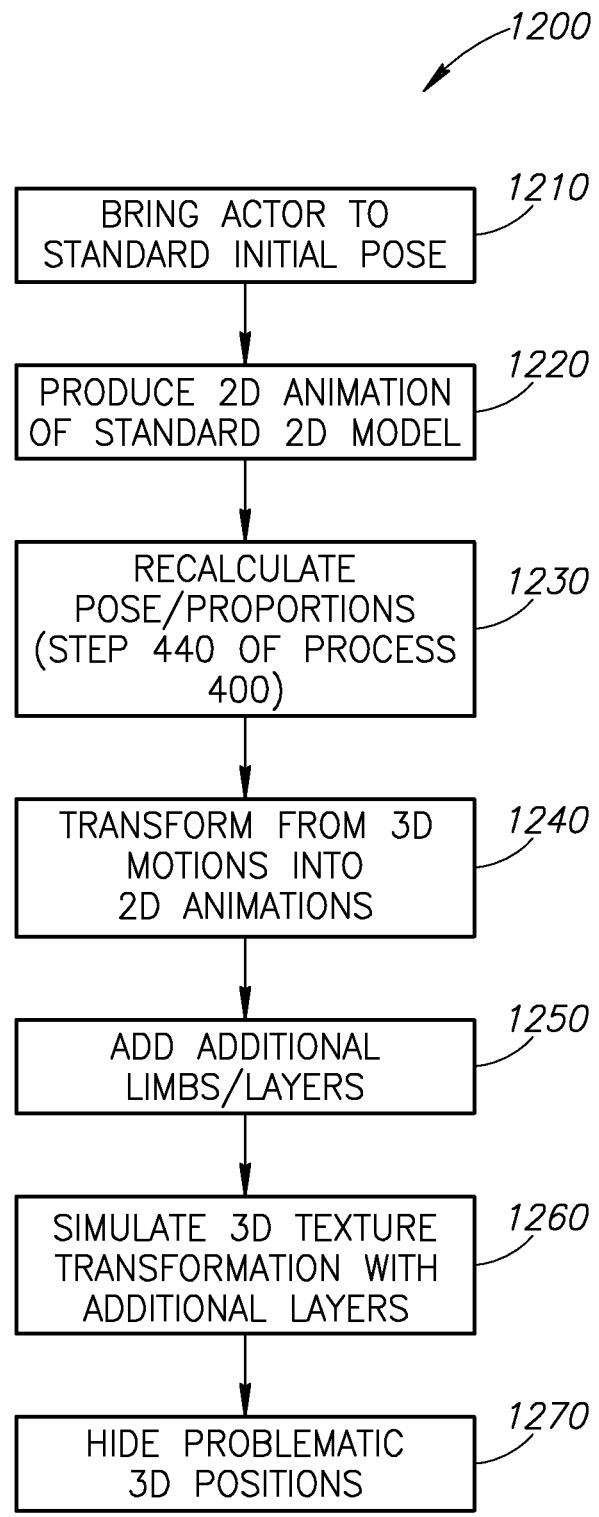

In accordance with another preferred embodiment of the present invention, these problems may be resolved by using motion databases motion data bases, such as that of CMU mentioned hereinabove, to produce high-quality 3D animations in 2D formats. Reference is now made to FIG. 43 which illustrates a novel process 1200 for a motion database animation utility to use motion databases to produce high-quality 3D animations in 2D formats.

The first step may be to bring (step 1210) an actor in the data-base animation to a standard initial pose, or to one of several such poses. A preferred method for performing this step may be described hereinbelow. From this position, the utility may produce (step 1220) a 2D animation of the standard 2D model. This animation may be recalculated (step 1230) to the pose and proportions of the photo-character, preserving the visual quality, as described above for step 440 of process 400.

Free 3D motions may now be transformed (step 1240) into 2D animation. As discussed hereinabove, small 3D motions may be transformed into 2D skeleton animation. Step 1240 may improve on the method discussed hereinabove, using a novel method for transforming a free 3D animation into 2D format. To implement this method, it may be more convenient to use a non-skeleton layer format, such as, for example, Flash. However, it will be appreciated that this method may be used in conjunction with any suitable skeleton format, including, for example, Anime Studio. This method can be used in two modes: to produce "template animation" and to produce animation of a specific photo-character. The method of step 1240 may be discussed in detailed hereinbelow.

Figure 44A:
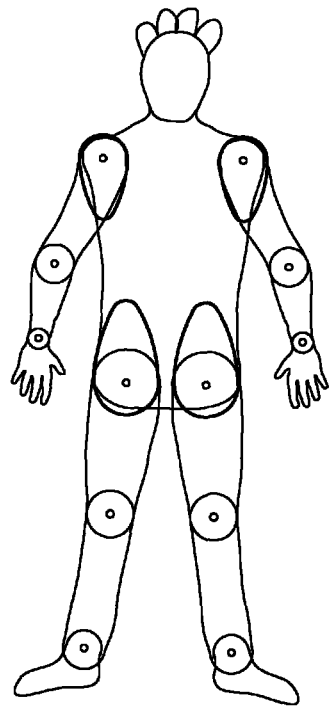
Figure 44B:
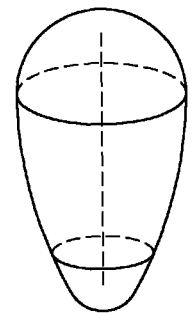

Reference is now made to FIGS. 44A-B. Additional limbs may be added (step 1250) in the M3 model; additional layers may be similarly added in the 2D model. High quality 3D skeleton animations may typically require more flexibility than is provided by standard 3D or 2D models. In particular, because the torso in the standard models tends to be too rigid, the shoulder joints and the hip joints may appear to pop "out of the body" in the course of the animation. In order to compensate for this effect, four additional limbs may be added to the M3-model, associated with the shoulder joints and the hip joints, respectively. Mathematically, the shape of these new limbs may be as described hereinabove. An exemplary representation of such added limbs is shown on FIG. 44B. The corresponding 2D layers may be illustrated on FIG. 44A. In the animation process the upper part of these added limbs may move with the shoulder joints and the hip joints, respectively, while the lower part may be associated with the corresponding points in the torso.

3D texture transformations may be simulated (step 1260) with additional layers. In transforming 3D animations into 2D ones the texture motion may look unnatural if truly three-dimensional body parts, such as the face, hands, legs and torso may be represented with only a few layers, similar to the model of FIG. 1. This may occur since the layers in all of the usual 2D animation formats, such as Flash and Anime Studio, are flat. To correct this effect an additional subdivision of the basic layers of the 2D model into layers may be performed.

Mathematically, these additional layers may be defined in such a way that their 3D configuration may approximate the 3D shape of the limbs of the M3-model. This approximation may resemble a polygonal one, but exact agreement of these 3D layers at their crossings, corners, etc may not be required. Many methods to produce such a subdivision are known in the art. However, 2D animation format does not support such 3D layers and their rendering. Accordingly, the new 3D positions of the 3D layers, as prescribed by a motion of the limbs of M3 model may be mathematically computed for the course of the chosen 3D animation. The appropriate projective (affine) transformations of the "flat layers" as seen on the screen may then be computed as described hereinabove. These computed transformations may then be use in the 2D animation format.

Figure 45A:
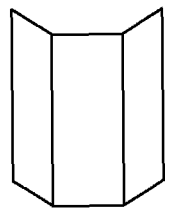
Figure 45B:
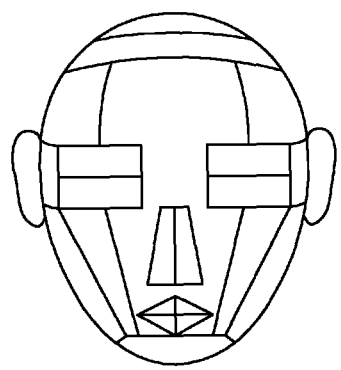

Experiments indicate that relatively few subdivision layers are enough to provide visually realistic texture motion in typical animations. For example, FIG. 45A, to which reference is now made, shows a possible subdivision for a cylinder shape; FIG. 45B, to which reference is now made, presents a possible subdivision for a human face shape. It will be appreciated that the layers representing the back view may also be added to the 2D model. Their visibility and position may be computed exactly in the same manner as described hereinabove. Typically, there may be no texture information from the photo for such layers. However, in many cases this texture may be naturally completed. For example, for the head model the hair texture may be extended to the "back layers", while for the body limbs, the clothing texture may be extended.

Problematic 3D positions may be "hidden" (step 1270). There may appear certain M3 model positions in the course of a 3D animation which may be difficult to represent in 2D animation, even using the methods described hereinabove. Prime examples of such problematic positions may involve motions of the head. For example, a profile photo of an actor may be selected for animation. In this situation it may be better not to try to simulate the enface view, since it is highly individual, and human visual perception is very sensitive to errors of this kind. However, relatively small 3D head motions may be treated as described hereinabove.

Accordingly, in the course of a 3D animation which contains, for example, a full rotation around the vertical axes, a relatively small head rotation may be allowed, followed closely by flipping the face in a similar position with an opposite orientation. This construction may be performed automatically, in the course of translation of a 3D animation into a 2D one. It may be applied also to other body parts. For example, it is difficult to correctly represent a hand pointing exactly to the camera in a 2D animation. Therefore, such positions may be passed very quickly (or completely avoided) in 2D animations.

Figure 46:
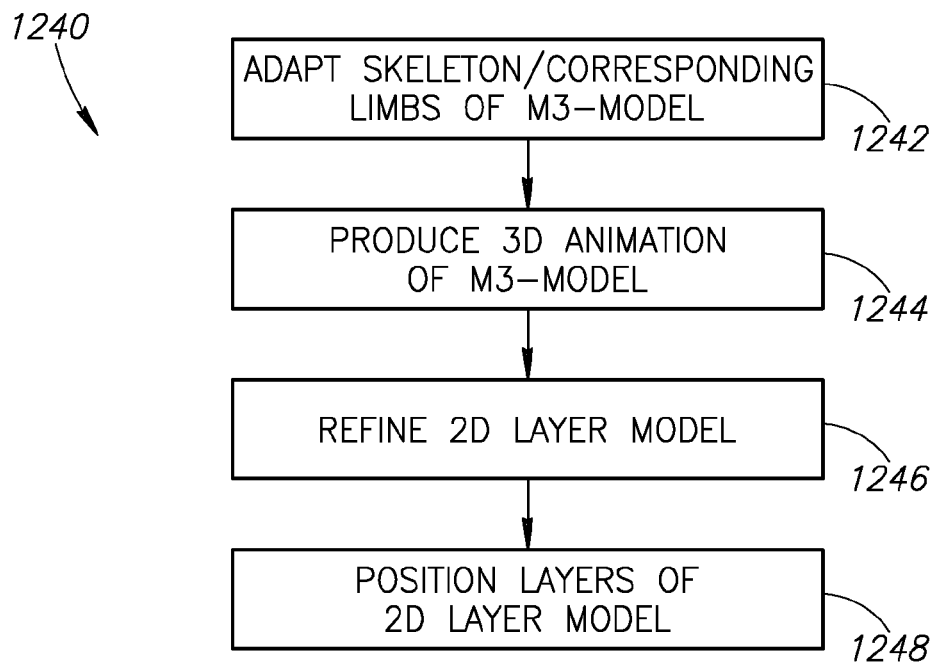

Reference is now made to FIG. 46 which illustrates the method of step 1240. A skeleton of the "standard proportions" M3-model and the corresponding limbs may be adapted (step 1242), if necessary, to the skeleton used in the motion data base. Then a 3D animation A of a M3-model may be produced (step 1244) as per the standard via the skeleton animation chosen in the data base. For each control frame F of A (or for each frame, if necessary) and for each limb L of the M3-model, the transformation T may be computed of the visible contour of L in the first frame to the visible contour of L in the frame F. Next T is approximated by a projective transformation TP (or by an affine one TA, if the 2D format is restricted to the affine transformations, like the older versions of Flash). In addition, in each frame F of A a z-buffering of the limbs may be performed, in order to determine their relative depth.

A 2D layer model may be refined (step 1246) according to the new skeleton, as described hereinabove. For each frame F, the layers of the 2D model may be positioned (step 1248) according to the transformation TP (TA) from their position in the first frame, and their relative depth may be dynamically updated according to the relative depth of the limbs of the M3-model. This may complete production of a template animation.

In order to produce animation of a specific photo-character the M3-model may first be fitted to the photo-character, as described hereinabove. In particular, this may define new anatomic proportions for the model and its limbs. Then the procedure may follow the steps as detailed hereinabove.

In accordance with another preferred embodiment of the present invention, any desired video-clip may be selected as an animation background to provide a "Live Photo" mode. The user may then insert a pre-prepared virtual actor into this clip. Using "motion tracking" as disclosed in patent application PCT/IL2008/001205, the actual actors in the clip may be captured with the models. The new actor may then be inserted into the clip in such a manner that it may occlude some of the original actors and may in turn be occluded by the others. Moreover, the motion of the traced actors can be altered using our usual tools (animation mode) in any desirable way. In particular, the "old" actors may interact with the new inserted actors. It will be appreciated that while legal reasons may prevent a website operator from proactively providing popular movies for this purpose, practically speaking, any movie accessible by a user on the web (on U-Tube, for example) may be used. Another important feature of this application may be that it enables the user to create an interesting new movie, by merely inserting a new "actor" into an existing movie. It will be appreciated, however, that the development of the action in the original clip may prescribe to a significant extent the actions of the inserted actor, which in combination with process 1100 may make the creative task of the user much easier.

In accordance with another preferred embodiment of the present invention, the process of building animations may be presented as a "game" in order to make the user's creative task easier. A game application may be implemented as an on-line game with multiple players, or adapted from popular applications for multi-threaded conversations and/or messaging.

"On-line blackboards" where multiple participants can draw their pictures are known in the art. There are also various on-line tools and packages allowing one to animate a photo. However, such tools and packages typically involve tedious processing and the application of complicated tools; they may also be restricted to a single user. It will therefore be appreciated that such prior art tools and packages may not be suitable to serve as the basis for an online game.

However, the animation methods described hereinabove may simplify the animation process to the extent that multiple users may be able to animate the same photo (for example, depicting the game participants) in a common session. This functionality may be implemented as a concurrent game, or even as a common animation project.

In accordance with another preferred embodiment of the present invention, the animator utility described hereinabove may be implemented with process 1200 to provide seamless access to existing human motion databases, as described hereinabove. It will be appreciated that the user may not have to make any adjustment or transformation of these complicated animations. This may enable the user to give "verbal-like" commands to the actors. This may be accomplished via clicks on the appropriate menus, printing the commands, or, where applicable in voice activated environments, by using a microphone and standard voice recognition tools. Alternatively, the user may click and drag the actor's limbs to provide their realistic motions, imposed from the motion databases. Joysticks and/or similar devices may also be used.

In accordance with another preferred embodiment of the present invention, various applications may be interconnected. For example, Video Cards and Live Photo, may be interconnected: actors created by either of the applications may form a personal actors library for the user, and they may be used by each of the applications. This may significantly simplify the user's creative task: it may be particularly beneficial to use the high quality template (library) animations of the Video Card application inside the Live Photo application.

For example, this may be performed as follows: the user may produce a "conversation" of the photo-characters on the image, with the help of "text balloons". This operation may be relatively easy and may not require much creativity. Some of these photo-characters may tell about their recent journey—and then they may appear in a high quality template (library) animation of the Video Card application presenting this journey.

It will be appreciated that experience shows that many users find it difficult to understand how to fit a model (like a human model) to a photo-character, particularly if this photo-character may not appear in a standard pose and/or clothing. It will also be appreciated that a photo-character may be partially occluded or only partly depicted on the photo. In these cases it may be difficult to fit it to a full human model. It may, however, still be desirable to insert this photo-character into an animation as a full-body (or torso only) human actor. In accordance with another preferred embodiment of the present invention, this issue may be resolved by using a hierarchy of fitting models, where the user may choose the appropriate one to fit.

Figure 47:
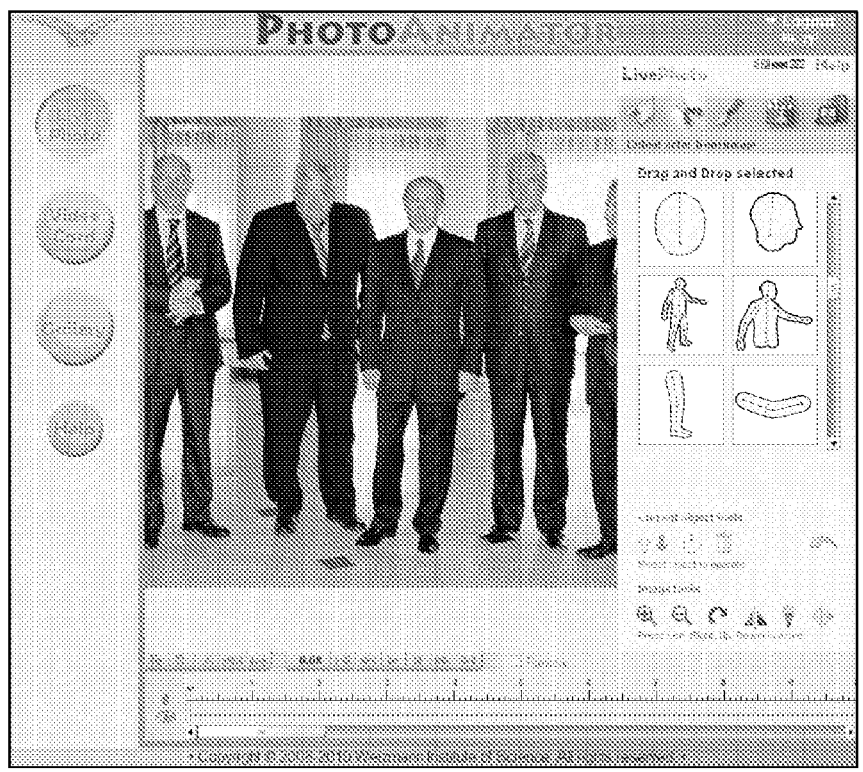

For example, the simplest model in the hierarchy may be a "head model". The next may be a "torso model", and the last is "full-body model". FIG. 47, to which reference is now made, may show examples of such models in the right panel. The user may select the model most appropriate for fitting as per the photo structure, in accordance to the level of effort he/she is willing to expend.

It will be appreciated that that fitting of a head model may typically be fairly easy and fast, and it may generally be assumed that the face of the intended photo-character may not be occluded. Fitting of the torso model may be somewhat more difficult, and a full-body model may require significantly more effort. In each case, the model actually cut out may be considered as a part of the larger, full model, and the texture may be extended to this full model as described hereinabove.

The new actor formed in this manner may be inserted into the intended animation. The same procedure may be performed when automatic fitting is applied, but only partial model fitting succeeds.

As discussed hereinabove, step 1140 of process 1100 may entail the rearrangement of the template animations. This procedure may be performed automatically, according to the positions, size and proportions of the cut-out actors and other library actors. For example, consider the animation which may present a ball flying between several actors. The procedure may include the following steps in order to take into account the actual positions of the actors:

The animation may be constructed in such a way that the ball and the palms of the actors may be organized in a "combined model" as described hereinabove. This aggregation may guarantee that the ball meets the palms at the appropriate frames of the animation.

The ball trajectories may be automatically resealed such a way that the ball meets the palms of the actors at their actual positions.

The timing of all the actions in the animation may be preserved (and accordingly, the velocity of the flying ball may be adjusted according to the new distances). This step may be necessary in order to guarantee that the original music and other sound effects may be coordinated with the actions in the new animation.

In more complicated examples where artist actions may be involved, the rearrangement of the animation may be performed essentially in the same way. However, where motion by the actors may be concerned, its resealing with preserved timing may require, for example, a faster walk of the actor, or even running instead of walking. These replacements may be performed using the proper arrangements of the motion data bases as discussed hereinabove.

Some actions may become impossible, for example, shaking hands between two "torso" actors which may be too far away from one another (and, being legless, may not "walk" towards each other). These situations may be analyzed automatically, and the corresponding template animation may be excluded from the library of available templates for the given cast.

As noted hereinabove, when the user may select multiple "episodes", it may be necessary to adjust the actor's ending/starting position and motion in order to bridge the episodes and preserve a semblance of continuity. Similar functionality may also be required for step 1210 of process 1200 when bringing an actor to an initial standard pose. To provide such adjustments, a number of standard poses may be defined, and at the end of each animation episode for an actor a short animation segment may be added to bring the actor to a stop at one of the standard poses (presumably, the one which is close to both the final pose of the first episode and the initial pose of the following episode). In the same general manner, we the beginning of the next episode may be "padded" with a short animation segment starting with the standard pose at the end of the previous one and bringing the actor to the beginning of the next animation episode.

As discussed hereinabove, the animator utility may provide the user with a menu suggesting possible alterations. This menu may be produced on the basis of an automatic analysis of the animation as follows:

Some alteration possibilities always present; for example, if the animation may contain an inserted Video Card the user may require another Video Card instead of the current one. The user may request that the animation run faster or slower, the actors to move sharper or smoother, etc. The corresponding changes may be performed using the properly arranged motion data-bases (where walk, fast walk, nm are associated as the variants of the same basic action, as well as sharper or smoother motions, etc.). Some other alterations may be limited by the action structure. For example, two actors shaking hand may perform other actions with their hands at any moment, other than the time of hand-shaking.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An image animation method comprising:
   fitting a fitting model to an object in an image;
   animating said fitted object using an animation model different from said fitting model, wherein said fitting model is at least as rigid as said animation model, and said animation model is no more rigid than said fitting model; and
   generating a flexible joint by adding at least one artificial joint to an existing joint of said fitting model wherein said generating is performed to reduce texture/contours distortion.

2. The method according to claim 1 and wherein at least one of said fitting model and said animation model is a rigid hierarchical model.

3. The method according to clam 1 and also comprising increasing rigidity of said fitting model by inserting artificial bones.

4. The method according to claim 1 and also comprising removing bones from said fitting model for said animation model to decrease rigidity.

5. The method according to claim 1 and wherein said generating comprises replacing at least one existing bone with at least two artificial bones, said artificial bones at least connected to each other by said at least one artificial joint.

6. The method according to claim 1 and also comprising replacing an existing joint with a compound joint formed by two said flexible joints, wherein said two flexible joints are parallel to each other.

7. The method according to claim 1 and also comprising replacing at least one layer attached at a joint with a combination of at least two layers to enable more complicated motion patterns.

8. The method according to claim 7 and wherein said at least two layers are positioned to overlap to provide a visually smooth banding.

9. The method according to claim 1 and also comprising refining said animating by transforming said animation model to a second, more complicated animation model.

10. The method according to claim 1 and also comprising transforming a skeleton animation into a layer animation.

11. The method according to claim 10 and wherein said transforming comprises:
    sub-dividing original layers at each skeleton joint; and
    approximating skeleton-induced layer motion with that allowed in the targeted format layer motion to transform a skeleton scenario into a layers motion scenario.

12. The method according claim 1 and also comprising employing 3D (three dimensional) enhancement to estimate anatomic proportions of a character and its 3D position in a 2D (two dimensional) image.

13. The method according to claim 12 and wherein said employing comprises:
fitting said fitting model to visible contours of said character;
constructing a 3D model corresponding to said fitting model to approximate an original 3D character depicted on said 2D image, wherein visible contours of said corresponding 3D model are inherited from an initial 2D model.

14. The method according to claim 13 and wherein said constructing comprises:
defining a skeleton S of said fitting model as three-dimensional object S', wherein S' possesses identical bones and joints as S while being positioned in a 3D space according to a 3D structure for said characters; and
associating a 3D-shape L_b to each bone b of skeleton S', wherein b is an axis for L_b, wherein L_b may be pre-defined in accordance with assumptions for said 3D structure for said characters.

15. The method according to claim 14 and also comprising:
determining initial assumptions regarding said character and adapting parameters of an initial corresponding 3D model in accordance with said assumptions;
computing a 3D depth for each bone of said corresponding 3D model as d =D(w\W), wherein d is a 3D depth of a point of said bone, D is a standard position depth, w is a visible width at each said point and W is a width of a visible said bone in a standard position;
recalculating visible lengths of all said bones b in said fitting model in accordance with said computing; and
repeating said determining, computing and recalculating until a required accuracy is achieved.

16. The method according to claim 12 and also comprising reconciling at least one of a pose and proportions of said animation model to an initial pose required for an animation.

17. The method according to claim 16 and wherein said reconciling comprises at least one of:
restoring at least some angles between skeleton bones as in said initial pose, and adapting their lengths and layer widths in accordance with known anatomic parameters;
transforming skeleton and texture layers of said fitting model in exact accordance to said initial pose;
adding a motion sequence to have said character move to said initial pose at the beginning of said animation; and
leaving said pose and proportions of said animation model as is.

18. The method according to claim 12 and also comprising re-computing a relative motion for different objects in accordance with changes in said anatomic proportions.

19. The method according to claim 12 and also comprising constructing a combined model, wherein a point in a texture layer associated with said object is connected with a bone of said character.

20. The method according to claim 19 and wherein said point is not visible in said fitting model and is visible in said animation model.

21. The method according to claim 12 and wherein multiple texture layers are prepared for said object and each is connected to a different said bone in said animation model.

22. The method according to claim 21 and wherein said different bones are associated with multiple said characters.

23. The method according to claim 1 and also comprising:
enabling interactive fitting by a user;
automatically completing said fitting by a user;
estimating a quality for a result of said automatic completing in terms of a discrepancy from a pre-defined quality threshold; and
repeating said automatically completing and estimating until said discrepancy is less than said quality threshold.

24. The method according to claim 23 and wherein said repeating also comprises performing said automatically completing and estimating up to one hierarchy level higher than a level at which said user initiated said automatic completion.

25. The method according to claim 23 and also comprising suggesting to said user that said automatically completing be performed instead of said interactive fitting for fine scale fitting of model contours.

26. The method according to claim 23 and wherein said enabling is performed after said automatic completing, estimating and repeating have been performed and said discrepancy is lower than said quality threshold.

27. The method according to claim 23 and also comprising:
requesting said user to confirm a result of said automatic fitting; and
if said user does not confirm said result, iteratively showing earlier results in order of next best said discrepancy until said user does confirm.

28. The method according to claim 1 and also comprising inscribing a body model (BM) into a character's clothing for fitting at least unseen portions of a photo-character's actual body, wherein said BM includes proportion parameters based on standard human body measurements.

29. The method according to claim 28 and also comprising assigning a penalty function for said fitting for situations where contours of said BM extend beyond contours of said clothing of said photo-character.

30. The method according to claim 28 and wherein said BM is at least one of generic and associated with said photo-character.

31. The method according to claim 28 and also comprising constructing a combined model, wherein a clothing model may be merged with a character model as at least one additional layer, and said additional layer is kinematically connected to an appropriate part of said character model.

32. The method according to claim 31 and also comprising:
specifying a clothing type for said photo-character;
selecting a combined clothing model CM in accordance with said clothing type;
fitting a simple model M to visible contours of said photo-character;
inscribing said BM into said model M;
positioning a selected said clothing model CM on said image in accordance with a position of said inscribed BM;
fitting clothing layers of said CM according to visible contours of said photo-character;
cutting clothing texture out from said image in accordance with said fitting clothing layers; and
automatically completing texture of at least partially occluded layers, wherein said texture is derived from at least one of:
generating a synthetic texture similar to said texture in areas adjacent to said at least partially occluded areas,
copying non-occluded texture on at least one other image of said photo-character, and
selecting a substitute texture from a pre-prepared library texture in accordance with non-occluded body parts on said image.

33. The method according to claim 1 and also comprising:
defining high resolution feature (HRF) sub-models for specific features of said object; and
kinematically subordinating said HRF sub-models to said animation model.

34. The method according to claim 33 and also comprising inserting said HRF sub-models and their associated texture from a pre-prepared HRF sub-model library, wherein said HRF sub-models represent features that require high resolution but are of generic nature.

35. The method according to claim 1 and also comprising:
enabling a user to choose a final animation clip;
displaying at least part of said chosen animation clip to said user for confirmation, wherein characters available for replacement are indicated;
enabling said user to choose one of said characters;
receiving a selected actor from said user, wherein said selected actor is at least one of uploaded or selected from an available library by said user;
displaying a fitting model for said selected actor; and
fitting said fitting model to said selected actor.

36. A non-transitory computer readable medium comprising an animation model transformer comprising:
a bone inserter to insert bones into an animation skeleton;
a skeleton refiner to invoke said bone inserter to replace a rotation joint in said animation skeleton with a combination of bones and multiple rotation joints;
a layers refiner to add/replace layers of an animation model to facilitate smoother motion;
and an animation refiner to transform an animation from an initial simple model to a more complex model, wherein said more complex model was produced by applying at least one of said bone inserter, skeleton refiner and layers refiner to said initial simple model.

37. The non-transitory computer readable medium according to claim 36 and also comprising an anatomic proportioner to employ 3D enhancement to estimate anatomic proportions of a character and its 3D position in a 2D image.

38. The non-transitory computer readable medium according to claim 37 and also comprising a pose transformer to transform a pose and proportions for said animation model to an initial pose required by said animation in accordance with said estimated anatomic proportions of said character and its 3D position.

39. A non-transitory computer readable medium comprising a menu based animation utility comprising:
a photo/video clip input option to enable a user to select a base environment for an animation to be produced;
a cast builder to assemble a cast of actors for said animation, said cast of actors including at least one of a character, character part, and object, wherein said actors are taken from at least one of said base environment and a pre-prepared library;
an animation template selector to enable said user to select an animation template from among a list of possible animation templates for use with said animation, said list based at least on a cast type of at least one of said cast of actors;
an animation template rearranger to enable said user to rearrange said template animations for each given said cast type in accordance with actual positions, sizes and proportions of said actors cut out from said base environment;
an animation modifier to enable said user to at least modify speed and sharpness of movements by said cast of actors using arrangements of motion databases;
a local commands definer to enable said user to enter local movement commands for said cast of actors, wherein said local commands do not conflict with a general scenario for said animation; and
an interface to enable said user to use other animation tools with said animation.

40. The non-transitory computer readable medium according to claim 39 and wherein said utility is implemented on a mobile communications device.

41. A method to produce high-quality 3D animations in 2D formats, the method comprising:
selecting an actor from an animation in a motion database;
bringing said actor in said animation to a standard, predetermined pose;
producing a standard 2D animation based on a 2D model for said actor;
recalculating pose/proportions according to visible lengths of all bones in a fitting model according to their 3D position;
transforming free 3D motions into 2D animation;
adding additional limbs to reduce rigidity of said 2D animation;
simulating 3D texture transformation with additional layers; and hiding problematic 3D positions.

42. The method according to claim 41 and wherein said transforming comprises:
if necessary, adapting a standard proportion skeleton of a 3D model corresponding to said fitting model, and its corresponding limbs to a skeleton used in said motion database;
producing a 3D animation A of said corresponding model as per a standard skeleton animation chosen from said motion database, wherein for each control frame F of A and for each limb L of said corresponding model, transformation T is computed for visible contour of L in a first frame to a visible contour of L in frame F;
approximating T by a projective transformation TP;
refining a 2D layer model according to a skeleton of said corresponding model;
positioning the layers of the 2D model for each frame F, according to the transformation TP from their position in said first frame, wherein their relative depth is dynamically updated according to a relative depth of limbs in said corresponding model.

* * * * *